United States Patent
Fathieh et al.

(10) Patent No.: US 12,484,794 B2
(45) Date of Patent: Dec. 2, 2025

(54) METHOD AND SYSTEM FOR SIGNAL QUALITY ASSESSMENT AND REJECTION USING HEART CYCLE VARIABILITY

(71) Applicant: Analytics for Life Inc., Toronto (CA)

(72) Inventors: Farhad Fathieh, North York (CA); Michael Garrett, Wilmette, IL (US); Timothy William Fawcett Burton, Ottawa (CA); Shyamlal Ramchandani, Kingston (CA); Abhinav Doomra, North York (CA)

(73) Assignee: Analytics for Life Inc., Toronto (CA)

( * ) Notice: Subject to any disclaimer, the term of this patent is extended or adjusted under 35 U.S.C. 154(b) by 522 days.

(21) Appl. No.: 17/132,869

(22) Filed: Dec. 23, 2020

(65) Prior Publication Data
US 2021/0212582 A1     Jul. 15, 2021

Related U.S. Application Data

(60) Provisional application No. 62/953,175, filed on Dec. 23, 2019.

(51) Int. Cl.
*A61B 5/024* (2006.01)
*A61B 5/00* (2006.01)

(52) U.S. Cl.
CPC ........ *A61B 5/02416* (2013.01); *A61B 5/0022* (2013.01); *A61B 5/02405* (2013.01);
(Continued)

(58) Field of Classification Search
CPC .............. A61B 5/02416; A61B 5/0022; A61B 5/02405; A61B 5/7207; A61B 5/7221;
(Continued)

(56) References Cited

U.S. PATENT DOCUMENTS

| 8,700,140 B2 | 4/2014 | Narayan et al. |
| 8,923,958 B2 | 12/2014 | Gupta et al. |

(Continued)

FOREIGN PATENT DOCUMENTS

| CN | 106412561 A | * | 2/2017 |
| EP | 3402402 | | 11/2018 |

(Continued)

OTHER PUBLICATIONS

Abboud, S., "High-Frequency Electrocardiogram Analysis of the Entire QRS in the Diagnosis and Assessment of Coronary Artery Disease," Progress in Cardiovascular Diseases, vol. 35, No. 5, 1993, pp. 311-328.

(Continued)

*Primary Examiner* — Joel Lamprecht
(74) *Attorney, Agent, or Firm* — Meunier Carlin & Curfman LLC

(57) ABSTRACT

The exemplified methods and systems facilitate the quantification of cardiac cycle-variability as a metric of signal quality of an acquired signal data set and the rejection, based on that quantification, of said acquired signal data set from one or more subsequent analyses that can predict and/or estimate a metric associated with the presence, non-presence, severity, and/or localization of abnormal cardiovascular conditions or disease, including, for example, but not limited to, coronary artery disease, abnormal left ventricular end-diastolic pressure disease (LVEDP), pulmonary hypertension and subcategories thereof, heart failure (HF), among others as discussed herein. The quantification of levels of cycle-variability assessed noise such as skeletal-muscle-related-signal contamination and muscle-artifact-noise contamination, and other asynchronous-noise contamination in an acquired signal can be subsequently used for the auto- (Continued)

mated rejection of such asynchronous noise from measurements of biophysical signals.

18 Claims, 37 Drawing Sheets

(52) U.S. Cl.
CPC .......... *A61B 5/7207* (2013.01); *A61B 5/7221* (2013.01); *A61B 5/7246* (2013.01); *A61B 5/7275* (2013.01); *A61B 5/7405* (2013.01); *A61B 5/742* (2013.01); *A61B 5/7455* (2013.01)

(58) Field of Classification Search
CPC ... A61B 5/7246; A61B 5/7275; A61B 5/7405; A61B 5/742; A61B 5/7455; A61B 5/0245; A61B 5/726; Y02A 90/10
See application file for complete search history.

(56) References Cited

U.S. PATENT DOCUMENTS

| | | | |
|---|---|---|---|
| 9,289,150 B1 | 3/2016 | Gupta et al. | |
| 9,408,543 B1 | 8/2016 | Gupta et al. | |
| 9,597,021 B1 | 3/2017 | Gupta et al. | |
| 9,655,536 B2 | 5/2017 | Gupta et al. | |
| 9,737,229 B1 | 8/2017 | Gupta et al. | |
| 9,910,964 B2 | 3/2018 | Burton et al. | |
| 9,955,883 B2 | 5/2018 | Gupta et al. | |
| 9,968,265 B2 | 5/2018 | Burton et al. | |
| 9,968,275 B2 | 5/2018 | Gupta et al. | |
| 10,039,468 B2 | 8/2018 | Gupta et al. | |
| 10,292,596 B2 | 5/2019 | Shadforth et al. | |
| D855,064 S | 7/2019 | Lei | |
| 10,362,950 B2 | 7/2019 | Gupta et al. | |
| 10,542,897 B2 | 1/2020 | Gupta et al. | |
| 10,566,091 B2 | 2/2020 | Burton et al. | |
| 10,566,092 B2 | 2/2020 | Burton et al. | |
| 10,672,518 B2 | 6/2020 | Burton et al. | |
| 10,806,349 B2 | 10/2020 | Shadforth et al. | |
| 2014/0249435 A1* | 9/2014 | Banet | A61B 5/0008 600/506 |
| 2017/0119272 A1 | 5/2017 | Gupta et al. | |
| 2017/0143272 A1* | 5/2017 | Brouse | A61B 5/0205 |
| 2017/0303799 A1* | 10/2017 | Grudic | G16H 50/30 |
| 2018/0249960 A1 | 9/2018 | Gupta et al. | |
| 2018/0303356 A1* | 10/2018 | Galeev | A61B 5/02405 |
| 2018/0310828 A1* | 11/2018 | DiMaio | A61B 5/0075 |
| 2019/0026430 A1 | 1/2019 | Grouchy et al. | |
| 2019/0026431 A1 | 1/2019 | Grouchy et al. | |
| 2019/0117164 A1 | 4/2019 | Gupta et al. | |
| 2019/0133468 A1 | 5/2019 | Aliamiri et al. | |
| 2019/0200893 A1 | 7/2019 | Grouchy et al. | |
| 2019/0214137 A1 | 7/2019 | Gupta et al. | |
| 2019/0365265 A1 | 12/2019 | Grouchy et al. | |
| 2019/0384757 A1* | 12/2019 | Garrett | A61B 5/7221 |
| 2020/0205739 A1 | 7/2020 | Garrett et al. | |
| 2020/0205745 A1 | 7/2020 | Khosousi et al. | |
| 2020/0211713 A1 | 7/2020 | Shadforth et al. | |
| 2020/0229724 A1 | 7/2020 | Gupta et al. | |
| 2020/0335217 A1 | 10/2020 | Burton et al. | |
| 2020/0397322 A1 | 12/2020 | Paak et al. | |
| 2020/0397324 A1 | 12/2020 | Paak et al. | |

FOREIGN PATENT DOCUMENTS

| | | | |
|---|---|---|---|
| WO | 2006023940 A2 | 3/2006 | |
| WO | 2017/033164 | 3/2017 | |
| WO | 2017/121834 | 7/2017 | |
| WO | 2017/221221 | 12/2017 | |
| WO | 2018/158749 | 9/2018 | |
| WO | 2019/077414 | 4/2019 | |
| WO | 2019/130272 | 7/2019 | |
| WO | 2019/130273 | 7/2019 | |
| WO | 2019/140155 | 7/2019 | |
| WO | WO-2019140155 A1 * | 7/2019 | .......... A61B 5/0064 |
| WO | 2019220012 A1 | 11/2019 | |
| WO | 2019/234587 | 12/2019 | |
| WO | 2019/244043 | 12/2019 | |
| WO | 2020/136570 | 7/2020 | |
| WO | 2020/136571 | 7/2020 | |
| WO | 2020/136569 | 8/2020 | |
| WO | 2020/254881 | 12/2020 | |
| WO | 2020/254882 | 12/2020 | |

OTHER PUBLICATIONS

Alimbaev, C. A., et al., "System of Non-Invasive Electrocardiac Diagnostics," $20^{th}$ International Conference on Micro/Nanotechnologies and Electron Devices, 2019, pp. 622-625.

Allen, J., "Photoplethysmography and its application in clinical physiological measurement," Physiological Measurement, vol. 28, No. 3, 2007, pp. R1-R39.

Chen, T., et al., "Xgboost: A Scalable Tree Boosting System," Proceedings of the $22^{nd}$ ACM SIGKDD International Conference on Knowledge Discovery and Data Mining, 2016, pp. 785-794.

Choi, J-O, et al., "Improved Detection of Ischemic Heart Disease by Combining High-Frequency Electrocardiogram Analysis with Exercise Stress Echocardiography," Korean Circulation Journal, vol. 43, No. 10, 2013, pp. 674-680.

Cooley, J. W., et al., "An Algorithm for the Machine Calculation of Complex Fourier Series," Mathematics of Computation, vol. 19, No. 90, 1965, pp. 297-301.

Das, S., et al., "Comparison of Power Spectral Density (PSD) of Normal and Abnormal ECGs," International Journal of Computational Application $2^{nd}$ National Conference on Computing, Communication and Sensor Network, vol. 2, No. 3, 2011, pp. 10-14.

Kim, J-H, "Detection of R-Peaks in ECG Signal by Adaptive Linear Neuron (ADALINE)," Artificial Neural Network, MATEC Web of Conferences, vol. 54, 2016, 4 pages.

Kligfield, P., et al., "Recommendations for the Standardization and Interpretation of the Electrocardiogram, Part I: The Electrocardiogram and Its Technology," Journal of the American College of Cardiology, vol. 49, No. 10, 2007, pp. 1109-1127.

Kohli, S. S., et al., "Hilbert Transform Based Adaptive ECG R-Peak Detection Technique," International Journal of Electrical and Computer Engineering, vol. 2, No. 5, 2012, pp. 639-643.

Lee, W. K., et al., "Smart ECG Monitoring Patch with Built-in R-Peak Detection for Long-Term HRV Analysis," Annals of Biomedical Engineering, vol. 44, No. 7, 2016, pp. 2292-3201.

Levkov, C., et al., "Removal of power-line interference from the ECG: a review of the subtraction procedure," Biomedical Engineering OnLine, vol. 4, No. 50, 2005, 18 pages.

Massey, Jr., F. J., "The Kolmogorov-Smirnov Test for Goodness of Fit," Journal of the American Statistical Association, vol. 46, No. 253, 1951, pp. 68-78.

Pan, J., et al., "A Real-Time QRS Detection Algorithm," IEEE Transactions on Biomedical Engineering, vol. BME-32, No. 3, 1985, pp. 230-236.

Parks, N. A., et al., "Bootstrap Signal-to-Noise Confidence Intervals: An Objective Method for Subject Exclusion and Quality Control in ERP Studies," Frontiers in Human Neuroscience, vol. 10, No. 50, 2016, 15 pages.

Pedregosa, F., et al., "Scikit-learn: Machine Learning in Python," Journal of Machine Learning Research, vol. 12, 2011, pp. 2825-2830.

Qayyum, H., et al., "Facial Expression Recognition Using Stationary Wavelet Transform Features," Mathematical Problems in Engineering, 2017, 10 pages.

Tereshchenko, L. G., et al., "Frequency Content and Characteristics of Ventricular Conduction," Journal of Electrocardiology, vol. 48, No. 6, 2015, pp. 933-937.

Thakor, N. V., "From Holter Monitors to Automatic Defibrillators: Developments in Ambulatory Arrhythmia Monitoring," IEEE Transactions on Biomedical Engineering, vol. BME-31, No. 12, 1984, pp. 770-778.

(56) References Cited

OTHER PUBLICATIONS

Thalkar, S., et al., "Various Techniques for Removal of Power Line Interference from ECG Signal," International Journal of Scientific & Engineering Research, vol. 4, Issue 12, 2013, pp. 12-23.

U.S. Food & Drug Administration (FDA), "Proposed Regulatory Framework for Modifications to Artificial Intelligence/Machine Learning (AI/ML)-Based Software as a Medical Device (SaMD)," 2019, 20 pages.

Zou, H., et al., "Regularization and variable selection via the elastic net," Journal of the Royal Statistical Society, Series B (Statistical Methodology), vol. 67, No. 2, 2005, pp. 301-320.

International Search Report and Written Opinion, dated Apr. 7, 2021, received in connection with corresponding International Patent Application No. PCT/IB2020/062416.

Extended European Search Report issued in corresponding European Application No. 20908348.4, mailed Jan. 2, 2024, 8 pages.

\* cited by examiner

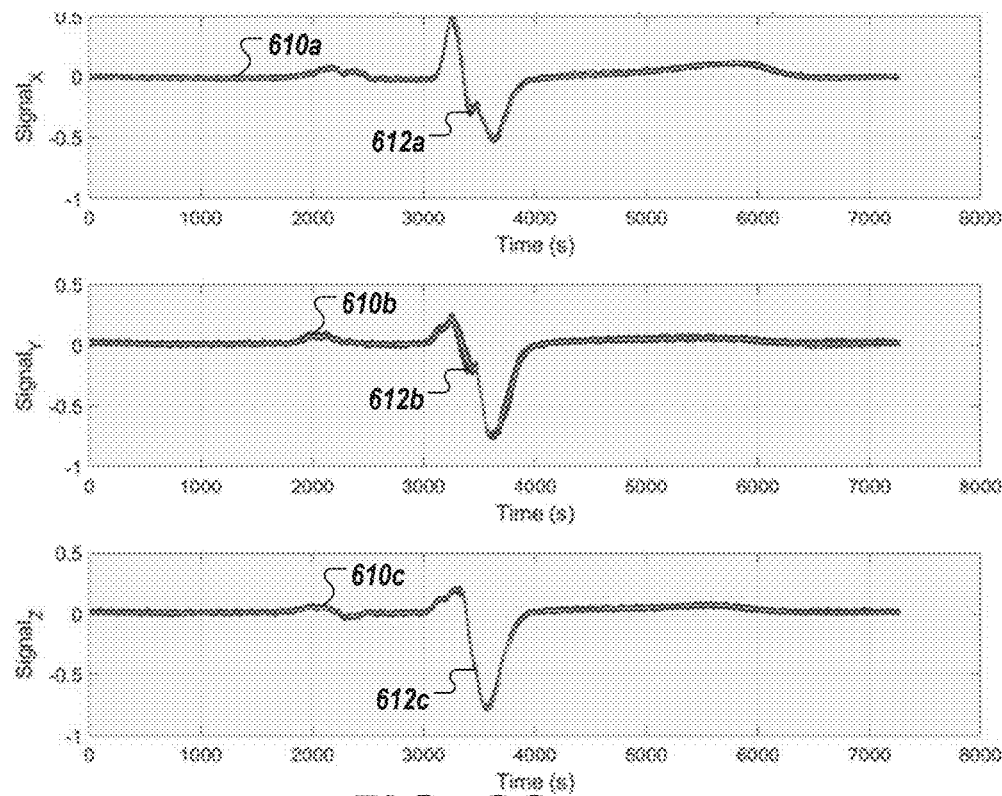
FIG. 6C
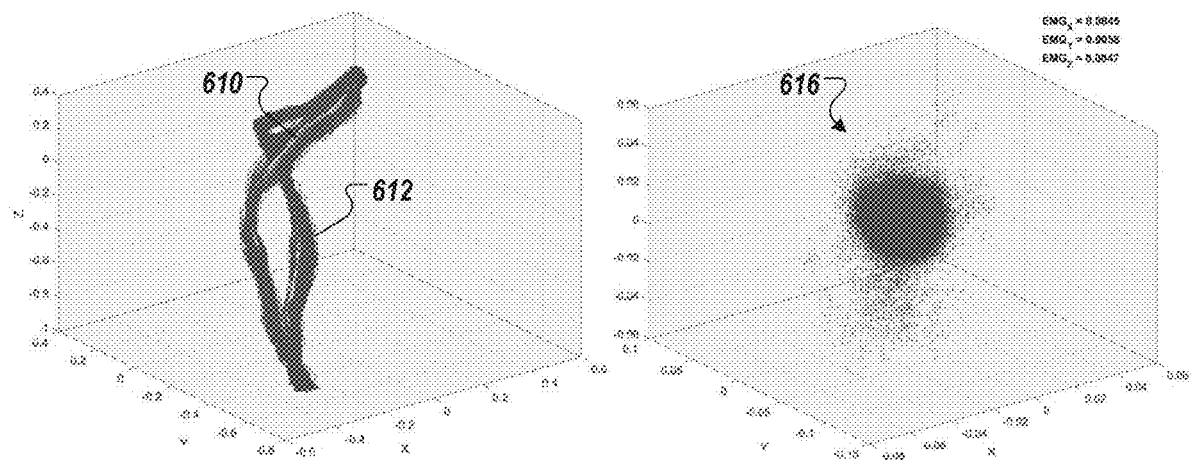
FIG. 6D   FIG. 6E

| Feature Name | Disease State | Gender | t-test p-value | Mutual Information | ROC-AUC |
|---|---|---|---|---|---|
| dAlphaL | CAD | Female | n/s | 1.043 | n/s |
| dAlphaU | CAD | Both Genders | n/s | 1.03 | n/s |
| dDmjL | CAD | Female | 0.035 | 1.104 | 0.502 |
| | LVEDP | Both Genders | 0.031 | n/s | n/s |
| dDmjLUXR | CAD | Both Genders | n/s | n/s | 0.501 |
| dDmjU | LVEDP | Both Genders | 0.007 | n/s | n/s |
| dDmnLUXR | LVEDP | Female | 0.02 | n/s | n/s |
| dDmnU | LVEDP | Both Genders | 0.038 | n/s | n/s |
| dKurtL | LVEDP | Both Genders | n/s | 1.171 | n/s |
| dMeanL | CAD | Female | n/s | 1.012 | 0.516 |
| | LVEDP | Male | 0.033 | n/s | n/s |
| dMeanLURP1 | LVEDP | Both Genders | 0.013 | n/s | n/s |
| dMeanLURP2 | LVEDP | Male | 0.02 | n/s | n/s |
| dMeanU | CAD | Female | n/s | 1.091 | n/s |
| | LVEDP | Both Genders | 0.003 | n/s | n/s |
| dModeLP | CAD | Both Genders | n/s | n/s | 0.507 |
| | LVEDP | Both Genders | 0.024 | n/s | n/s |
| dModeLURP1 | LVEDP | Both Genders | 0.013 | n/s | n/s |
| dModeLURP2 | LVEDP | Male | 0.028 | n/s | n/s |

FIG. 9

| Feature Name | Disease State | Gender | t-test p-value | Mutual Information | ROC-AUC |
|---|---|---|---|---|---|
| dModeUP | LVEDP | Both Genders | 0.004 | n/s | n/s |
| dPhiDiffXL1Med | CAD | Both Genders | 0.015 | n/s | n/s |
| dPhiDiffXL2Std | CAD | Male | n/s | n/s | 0.502 |
| dPhiDiffXLMean | CAD | Both Genders | 0.026 | n/s | n/s |
| dPTT | LVEDP | Female | 0.045 | n/s | n/s |
| dRelMeanMedDiffLURP1 | CAD | Both Genders | n/s | n/s | 0.5 |
| dSkewLURP1 | CAD | Both Genders | 0.034 | n/s | n/s |
| dStdLURP2 | CAD | Both Genders | n/s | 1.486 | 0.541 |
| dStdU | CAD | Female | n/s | n/s | 0.511 |
| dXDmj | LVEDP | Female | 0.012 | n/s | n/s |
| dXDmn | LVEDP | Female | 0.003 | n/s | n/s |
| dXMean1 | CAD | Female | 0.00064 | n/s | 0.548 |
| | CAD | Female | 0.013 | n/s | 0.518 |
| dXStd1 | LVEDP | Female | 0.037 | n/s | n/s |

*FIG. 9 (cont. 1)*

| Feature Name | Disease State | Gender | t-test p-value | Mutual Information | ROC-AUC |
|---|---|---|---|---|---|
| dXStd2 | LVEDP | Both Genders | 0.042 | n/s | n/s |
| dYAlpha | CAD | Both Genders | 0.049 | n/s | n/s |
| dYKurt2 | CAD | Male | n/s | 1.061 | n/s |
| dYMode2 | CAD | Both Genders | n/s | 1.104 | n/s |
| dYRelStdMAD2 | CAD | Male | 0.042 | 1.048 | n/s |
| dYStd2 | CAD | Male | n/s | 1.143 | n/s |
| dZAlpha | LVEDP | Male | 0.039 | n/s | n/s |
| dZDmn | LVEDP | Both Genders | 0.037 | n/s | n/s |
| dZKurt2 | LVEDP | Both Genders | n/s | 1.076 | n/s |
| | CAD | Female | n/s | 1.192 | n/s |
| dZMode2 | CAD | Male | n/s | 1.036 | n/s |
| dZRelStdMAD1 | LVEDP | Female | 0.041 | n/s | n/s |
| dZSkew1 | CAD | Female | n/s | 1.094 | n/s |
| dZSkew2 | CAD | Both Genders | n/s | 1.058 | n/s |

*FIG. 9 (cont. 2)*

METHOD AND SYSTEM FOR SIGNAL QUALITY ASSESSMENT AND REJECTION USING HEART CYCLE VARIABILITY

RELATED APPLICATIONS

This application claims priority to, and the benefit of, U.S. Provisional Patent Application No. 62/953,175, filed Dec. 23, 2019, entitled "Method and System for Signal Quality Assessment of Biophysical Signals," which is hereby incorporated by reference herein in its entirety.

FIELD OF THE INVENTION

The present disclosure generally relates to non-invasive methods and systems for characterizing one or more physiological systems and their associated functions, activities, and abnormalities. More specifically, in an aspect, the present disclosure relates to quality assessment of signals acquired via non-invasive methods that utilize cardiac measurements and PPG-related measurements, alone or in conjunction with other types of measurements of physiological phenomena and systems, to predict and/or detect the presence, non-presence, severity, and/or localization, of cardiovascular, pulmonary and cardiopulmonary disease, processes or conditions, among others.

BACKGROUND

The term "biophysical signal", as described in greater detail below, encompasses any physiological signal from which information may be obtained. Without wishing to be limiting, biophysical signals may be in part characterized by the form of energy (for example electrical, acoustic, chemical, thermal, magnetic, optical, etc.) taken by one or more physiological systems from which they may originate and/or be associated (e.g., circulatory/cardiovascular, nervous, respiratory, and the like), by associated organ systems, by tissue type, by cellular type, by cellular components such as organelles, etc., including combinations thereof. Biophysical signals may be acquired passively or actively, or both.

Often, biophysical signals are acquired in connection with or via invasive or minimally invasive techniques (e.g., via a catherization) and/or the use of radiation (e.g., nuclear imaging), exercise/stress (e.g., treadmill or nuclear stress test) and/or the administration of pharmacological and/or other agents (e.g., vasodilators, contrast agents). These various modalities can modestly or even significantly increase the cost of acquiring such signals, as they may need to be administered in specialized settings, often via expensive equipment that often requires the patient travel to use, and even sometimes requiring an overnight stay in, e.g., a hospital or hotel. Some of these modalities can increase the risk to the patient for adverse effects such as, e.g., infection or an allergic reaction. Some expose the patient to doses of undesirable radiation. And in the case of, e.g., exercise or treadmill tests, some can trigger modest or even serious adverse events (e.g., myocardial infarction) that would otherwise not have happened. Moreover, these various modalities generally increase the amount of time required to ascertain the state of health, disease, or condition of the patient whose biophysical signals are being characterized, sometimes on the order of weeks or months-often for a patient who is or may be suffering from a modest or even serious health condition. This results in lost work productivity and higher overall healthcare costs for society. Such delays can also exact an emotional toll on the patient (which itself can be deleterious to the patient's health), their family, friends and other caregivers tending to the needs of the patient.

Signal quality of acquired biophysical signals, whether cardiac signals, neurological signals, or other biophysical signals, can be affected by noise. Such noise, which can originate from a variety of sources, can affect the assessment of the patient, including the clinical assessment of the patient's biological system or systems associated with such signals and any associated conditions or pathologies. In the case of cardiac signals, such noise may affect some or all of the acquired signals, reducing the efficacy of the assessment for CAD, arrythmia, pulmonary hypertension, heart failure—e.g., any condition or symptom associated with, related to, or affected by (directly or indirectly) cardiac signals and thus putting the patient at risk of an incorrect assessment and/or diagnosis.

In addition, if a problem such as poor signal quality is present, some or all of the acquired signals may have to be disregarded and new signals acquired from the patient, causing inconvenience to the patient who must return to the physician's office, hospital, or other clinical setting to provide these new signals, and additional cost to the healthcare system.

SUMMARY

The exemplified methods and systems facilitate the quantification of cardiac cycle-variability as a metric of signal quality of an acquired signal data set and the rejection, based on that quantification of said acquired signal data set, from one or more subsequent analyses that can predict and/or estimate a metric associated with the presence, non-presence, severity, and/or localization (where applicable) of abnormal cardiovascular conditions or disease, including, for example, but not limited to, coronary artery disease, abnormal left ventricular end-diastolic pressure disease (LVEDP), pulmonary hypertension and subcategories thereof, heart failure (HF), among others as discussed herein. The assessed cardiac cycle-variability properties can be extracted from directly acquired cardiac signals or indirectly acquired cardiac signals, e.g., from photoplethysmographic signals, among others.

The quantification of levels of cycle-variability assessed noise such as skeletal-muscle-related-signal contamination, muscle-artifact-noise contamination and other asynchronous-noise contamination present in an acquired signal can be subsequently used for the automated rejection of such asynchronous noise from measurements of biophysical signals, such as cardiac signals, brain signals, etc., to which the presence of such asynchronous noise could have a negative impact to subsequent analyses of the cardiac signals and/or biophysical signals and/or to the clinical prediction/estimation of disease state that assess for various quasi-periodic features of such quasi-periodic biophysical signal.

In an aspect, a method is disclosed for rejecting an acquired measurement used for non-invasively assessing a disease state or abnormal condition of a mammalian subject, the method comprising: obtaining, by one or more processors, a biophysical signal data set of a subject associated with a photoplethysmographic signal or a cardiac signal, wherein the biophysical signal data set was acquired from the mammalian subject with a cardiac measurement equipment; determining, by the one or more processors and/or remotely by one or more cloud-based services or systems, one or more values associated with a heart cycle variability parameter using the obtained biophysical-signal data sets;

and rejecting, by the one or more processors and/or remotely by one or more cloud-based services or systems, the biophysical signal data set in determining the one or more values associated with a heart cycle variability exceeds a predefined variability threshold (e.g., outside, above, and/or below a pre-defined range or value), wherein the rejection generates a notification to be presented cardiac measurement equipment or a remote terminal (e.g., to trigger the re-acquisition or second acquisition of the biophysical signal data set from the mammalian subject).

A "cardiac signal" as used herein refers to one or more signals directly or indirectly associated with the structure, function and/or activity of the cardiovascular system—including aspects of that signal's electrical/electrochemical conduction—that, e.g., cause contraction of the myocardium. A cardiac signal may include, in some embodiments, electrocardiographic signals such as, e.g., those acquired via an electrocardiogram (ECG) or other modalities.

A "photoplethysmographic signal(s)" as used herein refers to signal waveforms acquired from optical sensors that corresponds to measured changes in light absorption by oxygenated and deoxygenated hemoglobin, such as light having wavelengths in, e.g., the red and infrared spectra. Photoplethysmographic signal(s), in some embodiments, include raw signal(s) acquired via a pulse oximeter or a photoplethysmogram (PPG). In some embodiments, photoplethysmographic signal(s) are acquired from off-the-shelf, custom and/or dedicated equipment or circuitries that are configured to acquire such signal waveforms for the purpose of monitoring health and/or diagnosing disease or abnormal conditions. The photoplethysmographic signal(s) typically include a red photoplethysmographic signal (e.g., an electromagnetic signal in the visible light spectrum most dominantly having a wavelength of approximately 625 to 740 nanometers) and an infrared photoplethysmographic signal (e.g., an electromagnetic signal extending from the nominal red edge of the visible spectrum up to about 1 mm), though other spectra such as near infrared, blue and green may be used in different combinations, depending on the type and/or mode of PPG being employed.

A "biophysical signal" includes but is not limited to a cardiac signal, a neurological signal, ballistocardiographic signal, or a photoplethysmographic signal, but encompasses any physiological signal from which information may be obtained. Not intending to be limited by example, one may classify biophysical signals into types or categories that can include, for example, electrical (e.g., certain cardiac and neurological system-related signals that can be observed, identified and/or quantified by techniques such as the measurement of voltage/potential (e.g., biopotential), impedance, resistivity, conductivity, current, etc. in various domains such as time and/or frequency), magnetic, electromagnetic, optical (e.g. signals that can be observed, identified and/or quantified by techniques such as reflectance, interferometry, spectroscopy, absorbance, transmissivity, visual observation, photoplethysmography, and the like), acoustic, chemical, mechanical (e.g., signals related to fluid flow, pressure, motion, vibration, displacement, strain), thermal, and electrochemical (e.g. signals that can be correlated to the presence of certain analytes, such as glucose). Biophysical signals may in some cases be described in the context of a physiological system (e.g., respiratory, circulatory (cardiovascular, pulmonary), nervous, lymphatic, endocrine, digestive, excretory, muscular, skeletal, renal/urinary/excretory, immune, integumentary/exocrine and reproductive systems), one or more organ system(s) (e.g., signals that may be unique to the heart and lungs as they work together), or in the context of tissue (e.g., muscle, fat, nerves, connective tissue, bone), cells, organelles, molecules (e.g., water, proteins, fats, carbohydrates, gases, free radicals, inorganic ions, minerals, acids, and other compounds, elements and their subatomic components. Unless stated otherwise, the term "biophysical signal acquisition" generally refers to any passive or active means of acquiring a biophysical signal from a physiological system, such as a mammalian or non-mammalian organism. Passive and active biophysical signal acquisition generally refers to the observation of natural or induced electrical, magnetic, optical, and/or acoustics emittance of the body tissue. Non-limiting examples of passive and active biophysical signal acquisition means include, e.g., voltage/potential, current, magnetic, optical, acoustic and other non-active ways of observing the natural emittance of the body tissue, and in some instances, inducing such emittance. Non-limiting examples of passive and active biophysical signal acquisition means include, e.g., ultrasound, radio waves, microwaves, infrared and/or visible light (e.g., for use in pulse oximetry or photoplethysmography), visible light, ultraviolet light and other ways of actively interrogating the body tissue that does not involve ionizing energy or radiation (e.g., X-ray). Active biophysical signal acquisition may involve excitation-emission spectroscopy (including, e.g., excitation-emission fluorescence). Active biophysical signal acquisition may also involve transmitting ionizing energy or radiation (e.g., X-ray) (also referred to as "ionizing biophysical signal") to the body tissue. Passive and active biophysical signal acquisition means can be performed with conjunction with invasive procedures (e.g., via surgery or invasive radiologic intervention protocols) or non-invasively (e.g., via imaging, ablation, heart contraction regulation (e.g., via pacemakers), catherization, etc.).

A "ballistocardiographic signals" as used herein refers to a measure that reflects the flow of blood through the entire body, e.g., as acquired using a wearable device. One subgroup of ballistocardiogram sensors is referred to as seismocardiogram (SCG) sensors, which is more directed to a measure of vibrations as recorded by sensors mounted close to the heart. As used herein, the terms ballistocardiogram and seismocardiogram are used interchangeably. In other embodiments, ballistocardiogram signals may be acquired by external equipment, e.g., bed or surface-based equipment that measures phenomena such as a change in body weight, e.g., as blood moves back and forth in the longitudinal direction between head and feet. In such embodiments, the volume of blood in each location may change dynamically and be reflected in the weight measured at each location on the bed as well as the rate of change of that weight.

The methods and systems described in the various embodiments herein are not so limited and may be utilized in any context of another physiological system or systems, organs, tissue, cells, etc. of a living body. By way of example only, two biophysical signal types that may be useful in the cardiovascular context include cardiac signals that may be acquired via conventional electrocardiogram (ECG/EKG) equipment, bipolar wide-band biopotential (cardiac) signals that may be acquired from other equipment such as those described herein, and signals that may be acquired by various plethysmographic techniques, such as, e.g., photoplethysmography. In another example, the two biophysical signal types are further augmented by ballistocardiographic techniques.

In the context of the present disclosure, techniques for acquiring and analyzing biophysical signals are described in particular for use in diagnosing the presence, non-presence, localization (where applicable), and/or severity of certain disease states or conditions in, associated with, or affecting, the cardiovascular (or cardiac) system, including for example pulmonary hypertension, coronary artery disease, and heart failure (e.g., left-side or right-side heart failure).

Pulmonary hypertension, heart failure, and coronary artery disease are three diseases/conditions affiliated with the cardiovascular or cardiac system. Pulmonary hypertension (PH) generally refers to high blood pressure in the arteries of the lungs and can include a spectrum of conditions. PH typically has a complex and multifactorial etiology and an insidious clinical onset with varying severity. PH may progress to complications such as right heart failure and in many cases is fatal. The World Health Organization (WHO) has classified PH into five groups or types. The first PH group classified by the WHO is pulmonary arterial hypertension (PAH). PAH is a chronic and currently incurable disease that, among other things, causes the walls of the arteries of the lungs to tighten and stiffen. PAH requires at a minimum a heart catheterization for diagnosis. PAH is characterized by vasculopathy of the pulmonary arteries and defined, at cardiac catheterization, as a mean pulmonary artery pressure of 25 mm Hg or more. One form of pulmonary arterial hypertension is known as idiopathic pulmonary arterial hypertension—PAH that occurs without a clear cause. Among others, subcategories of PAH include heritable PAH, drug and toxin induced PAH, and PAH associated with other systemic diseases such as, e.g., connective tissue disease, HIV infection, portal hypertension, and congenital heart disease. PAH includes all causes that lead to the structural narrowing of the pulmonary vessels. With PAH, progressive narrowing of the pulmonary arterial bed results from an imbalance of vasoactive mediators, including prostacyclin, nitric oxide, and endothelin-1. This leads to an increased right ventricular afterload, right heart failure, and premature death. The second PH group as classified by the WHO is pulmonary hypertension due to left heart disease. This group of disorders is generally characterized by problems with the left side of the heart. Such problems can, over time, lead to changes within the pulmonary arteries. Specific subgroups include left ventricular systolic dysfunction, left ventricular diastolic dysfunction, valvular disease and, finally, congenital cardiomyopathies and obstructions not due to valvular disease. Treatments of this second PH group tends to focus on the underlying problems (e.g., surgery to replace a heart valve, various medications, etc.). The third PH group as classified by the WHO is large and diverse, generally relating to lung disease or hypoxia. Subgroups include chronic obstructive pulmonary disease, interstitial lung disease, sleep breathing disorders, alveolar hypoventilation disorders, chronic high-altitude exposure, and developmental lung disease. The fourth PH group is classified by the WHO as chronic thromboembolic pulmonary hypertension, caused when blood clots enter or form within the lungs, blocking the flow of blood through the pulmonary arteries. The fifth PH group is classified by the WHO as including rare disorders that lead to PH, such as hematologic disorders, systemic disorders such as sarcoidosis that have lung involvement, metabolic disorders, and a subgroup of other diseases. The mechanisms of PH in this fifth group are poorly understood.

PH in all of its forms can be difficult to diagnose in a routine medical examination because the most common symptoms of PH (shortness of breath, fatigue, chest pain, edema, heart palpitations, dizziness) are associated with so many other conditions. Blood tests, chest x-rays, electro- and echocardiograms, pulmonary function tests, exercise tolerance tests, and nuclear scans are all used variously to help a physician to diagnose PH in its specific form. As noted above, the "gold standard" for diagnosing PH, and for PAH in particular, is a cardiac catherization of the right side of the heart by directly measuring the pressure in the pulmonary arteries. If PAH is suspected in a subject, one of several investigations may be performed to confirm the condition, such as electrocardiography, chest radiography, B-type natriuretic peptide (BNP) based blood test, and pulmonary function tests, among others. Evidence of right heart strain on electrocardiography and prominent pulmonary arteries or cardiomegaly on chest radiography is typically seen. However, a normal electrocardiography and chest radiograph cannot necessarily exclude a diagnosis of PAH. Further tests may be needed to confirm the diagnosis and to establish cause and severity. For example, blood tests, exercise tests, and overnight oximetry tests may be performed. Yet further, imaging testing may also be performed. Imaging testing examples include isotope perfusion lung scanning, high resolution computed tomography, computed tomography pulmonary angiography, and magnetic resonance pulmonary angiography. If these (and possibly other) non-invasive investigations support a diagnosis of PAH, right heart catheterization typically is needed to confirm the diagnosis by directly measuring pulmonary pressure. It also allows measurement of cardiac output and estimation of left atrial pressure using pulmonary arterial wedge pressure. While non-invasive techniques exist to determine whether PAH may exist in a subject, these techniques cannot reliably confirm a diagnosis of PAH unless an invasive right heart catherization is performed. Aspects and embodiments of methods and systems for assessing PH are disclosed in commonly-owned U.S. patent application Ser. No. 16/429,593, the entirety of which is hereby incorporated herein by reference.

Heart failure affects almost 6 million people in the United States alone, and more than 870,000 people are diagnosed with heart failure each year. The term "heart failure" (sometimes referred to as congestive heart failure or CHF) generally refers to a chronic, progressive condition or process in which the heart muscle is unable to pump enough blood to meet the needs of the body, either because the heart muscle is weakened or stiff or because a defect is present that prevents proper circulation. This results in, e.g., blood and fluid backup into the lungs, edema, fatigue, dizziness, fainting, rapid and/or irregular heartbeat, dry cough, nausea and shortness of breath. Common causes of heart failure are coronary artery disease (CAD), high blood pressure, cardiomyopathy, arrhythmia, kidney disease, heart defects, obesity, tobacco use and diabetes. Diastolic heart failure (DHF), left- or left-sided heart failure/disease (also referred to as left ventricular heart failure), right- or right-sided heart failure/disease (also referred to as right ventricular heart failure) and systolic heart failure (SHF) are common types of heart failure.

Left-sided heart failure is further classified into two main types: systolic failure (or heart failure with reduced ejection fraction or reduced left ventricular function) and diastolic failure/dysfunction (or heart failure with preserved ejection fraction or preserved left ventricular function). Procedures and technologies commonly used to determine if a patient has left-sided heart failure include cardiac catheterization, x-ray, echocardiogram, electrocardiogram (EKG), electrophysiology study, radionucleotide imaging, and various treadmill tests, including a test that measures peak $VO_2$. Ejection fraction (EF), which is a measurement expressed as a percentage of how much blood a ventricle pumps out with each contraction (and in the case of left-sided heart failure the left ventricle), is most often obtained non-invasively via an echocardiogram. A normal left ventricular ejection fraction (LVEF) ranges from about 55% to about 70%.

When systolic failure occurs, the left ventricle cannot contract forcefully enough to keep blood circulating normally throughout the body, which deprives the body of a normal supply of blood. As the left ventricle pumps harder to compensate, it grows weaker and thinner. As a result, blood flows backwards into organs, causing fluid buildup in the lungs and/or swelling in other parts of the body. Echocardiograms, magnetic resonance imaging, and nuclear medicine scans (e.g., multiple gated acquisition) are techniques used to noninvasively measure ejection fraction (EF), expressed as a percentage of the volume of blood pumped by the left ventricle relative to its filling volume to aid in the diagnosis of systolic failure. In particular, left ventricular ejection fraction (LVEF) values below 55% indicate the pumping ability of the heart is below normal, and can in severe cases be measured at less than about 35%. In general, a diagnosis of systolic failure can be made or aided when these LVEF values are below normal.

When diastolic heart failure occurs, the left ventricle has grown stiff or thick, losing its ability to relax normally, which in turn means that the lower left chamber of the heart is unable to properly fill with blood. This reduces the amount of blood pumped out to the body. Over time, this causes blood to build up inside the left atrium, and then in the lungs, leading to fluid congestion and symptoms of heart failure. In this case, LVEF values tend to be preserved within the normal range. As such, other tests, such as an invasive catheterization may be used to measure the left ventricular end diastolic pressure (LVEDP) to aid in the diagnosis of diastolic heart failure as well as other forms of heart failure with preserved EF. Typically, LVEDP is measured either directly by the placement of a catheter in the left ventricle or indirectly by placing a catheter in the pulmonary artery to measure the pulmonary capillary wedge pressure. Such catheterization techniques, by their nature, increase the risk of infection and other complications to the patient and tend to be costly. As such, non-invasive methods and systems for determining or estimating LVEDP in diagnosing the presence or non-presence and/or severity of diastolic heart failure as well as myriad other forms of heart failure with preserved EF are desirable. In addition, non-invasive methods and systems for diagnosing the presence or non-presence and/or severity of diastolic heart failure as well as myriad other forms of heart failure with preserved EF, without necessarily including a determination or estimate of an abnormal LVEDP, are desirable. Embodiments of the present disclosure address all of these needs.

Right-sided heart failure often occurs due to left-sided heart failure, when the weakened and/or stiff left ventricle loses power to efficiently pump blood to the rest of the body. As a result, fluid is forced back through the lungs, weakening the heart's right side, causing right-sided heart failure. This backward flow backs up in the veins, causing fluid to swell in the legs, ankles, GI tract and liver. In other cases, certain lung diseases such as chronic obstructive pulmonary disease and pulmonary fibrosis can cause right-sided heart failure, despite the left side of the heart functioning normally. Procedures and technologies commonly used to determine if a patient has left-sided heart failure include a blood test, cardiac CT scan, cardiac catheterization, x-ray, coronary angiography, echocardiogram, electrocardiogram (EKG), myocardial biopsy, pulmonary function studies, and various forms of stress tests such as a treadmill test.

Pulmonary hypertension is closely associated with heart failure. As noted above, PAH (the first WHO PH group) can lead to an increased right ventricular afterload, right heart failure, and premature death. PH due to left heart failure (the second WHO PH group) is believed to be the most common cause of PH.

Ischemic heart disease, also known as cardiac ischemia or myocardial ischemia, and related condition or pathologies may also be estimated or diagnosed with the techniques disclosed herein. Ischemic heart disease is a disease or group of diseases characterized by a reduced blood supply to the heart muscle, usually due to coronary artery disease (CAD). CAD is closely related to heart failure and is its most common cause. CAD typically occurs when the lining inside the coronary arteries that supply blood to the myocardium, or heart muscle, develops atherosclerosis (the hardening or stiffening of the lining and the accumulation of plaque therein, often accompanied by abnormal inflammation). Over time, CAD can also weaken the heart muscle and contribute to, e.g., angina, myocardial infarction (cardiac arrest), heart failure, and arrhythmia. An arrhythmia is an abnormal heart rhythm and can include any change from the normal sequence of electrical conduction of the heart and in some cases can lead to cardiac arrest. The evaluation of PH, heart failure, CAD and other diseases and/or conditions can be complex, and many invasive techniques and tools are used to assess the presence and severity of the conditions as noted above. In addition, the commonalities among symptoms of these diseases and/or conditions as well as the fundamental connection between the respiratory and cardiovascular systems-due to the fact that they work together to oxygenate the cells and tissues of the body-point to a complex physiological interrelatedness that may be exploited to improve the detection and ultimate treatment of such diseases and/or conditions. Conventional methodologies to assess these biophysical signals in this context still pose significant challenges in giving healthcare providers tools for accurately detecting/diagnosing the presence or non-presence of such diseases and conditions.

For example, in electrocardiography—a field of cardiology in which the heart's electrical activity is analyzed to obtain information about its structure and function—it has been observed that significant ischemic heart disease can alter ventricular conduction properties of the myocardium in the perfusion bed downstream of a coronary artery narrowing or occlusion, the pathology can express itself at different locations of the heart and at different stages of severity, making an accurate diagnosis challenging. Further, the electrical conduction characteristics of the myocardium may vary from person to person, and other factors such as measurement variability associated with the placement of measurement probes and parasitic losses associated with such probes and their related components can also affect the biophysical signals that are captured during electrophysiologic tests of the heart. Further still, when conduction properties of the myocardium are captured as relatively long cardiac signals, they may exhibit complex nonlinear variability that cannot be efficiently captured by traditional modeling techniques.

The exemplified methods and systems facilitate the quantification of cardiac cycle-variability as a metric of signal quality of an acquired signal data set and the rejection, based on that quantification, of said acquired signal data set from one or more subsequent analyses that can predict and/or estimate a metric associated with the presence, non-presence, severity, and/or localization (where applicable) of abnormal cardiovascular conditions or disease, including, for example, but not limited to, coronary artery disease, abnormal left ventricular end-diastolic pressure disease (LVEDP), pulmonary hypertension and subcategories thereof, heart failure (HF), among others as discussed herein.

In some embodiments, the biophysical-signal data sets are used to assess feature values in a model (e.g., regression/classifier model, e.g., linear model (e.g., Elastic Net), a decision tree model (XGB Classifier), a random forest model, a support vector machine model, a neural network model) configured to non-invasively estimate presence of an expected disease state or condition, wherein the estimated value is subsequently outputted for use in a diagnosis of the expected disease state or condition or to direct treatment of the expected disease state or condition.

In some embodiments, the rejection of the biophysical signal data set triggers the reacquisition of a replacement or supplemental biophysical signal data set from the mammalian subject with the cardiac measurement equipment.

In some embodiments, the step to determining the one or more values associated with a heart cycle variability comprises: determining, by the one or more processors, a template-signal vector data set representing quasi-periodic signal pattern of the subject from a plurality of detected quasiperiodic cycles detected in the first biophysical-signal data set; and applying, by the one or more processors, the template-signal vector data set to two or more of the plurality of detected quasiperiodic cycles to determine a residue, the one or more values (e.g., as a cycle variability feature value) associated with a heart cycle variability being generated from the determined residue.

In some embodiments, the one or more values associated with a heart cycle variability, and predefined variability threshold, is each a cycle variability score defined as an average of the difference between the template-signal vector data set and the two or more of the plurality of detected quasiperiodic cycles (e.g., CV_score_x, CV_score_y, CV_score z) (e.g., wherein the predefined variability threshold is associated with a CV_score_x, CV_score_y, CV_score z).

In some embodiments, the biophysical signal data set comprises two or more channels of an acquired biopotential signal data set or two or more channels of an acquired optical signal data set associated with a photoplethysmographic signal, and wherein the one or more values associated with a heart cycle variability are generated as a respective score for a given channel normalized by a sum of scores of the two or more channels (e.g., CV_relativeX, CV_relativeY, CV_relativeZ, CV_relative_RedPPG, CV_relative_IrPPG).

In some embodiments, the biophysical signal data set comprises three or more channels of acquired biopotential signals, and wherein the one or more values associated with a heart cycle variability are generated as a respective score for a given channel normalized by a sum of scores of the two or more channels of acquired biopotential signals (e.g., CV_ratio_XY, CV_ratio_XZ, CV_ratio_YZ).

In some embodiments, the biophysical signal data set comprises two or more channels of an acquired biopotential signal data set or two or more channels of an acquired optical signal data set associated with a photoplethysmographic signal, including a first signal and a second signal, wherein the one or more values associated with a heart cycle variability are determined as a volume-associated value (e.g., volume, void volume, porosity, surface area, perimeter along the XY, YZ, or XZ axis) of a phase space model (e.g., 2D or 3D alpha shape model) of a residue generated between the template-signal vector data set and respective first and second signals (e.g., wherein the predefined variability threshold is associated with a volume-associated metric of a phase space model).

In some embodiments, the phase space model is a triangulation point-cloud model generated from a difference between template-signal vector data set and, at least, the respective first and second signals.

In some embodiments, the one or more values associated with a heart cycle variability is a distribution-associated value(s) (e.g., mean of CV of channel x, y, and/or z; median of CV of channel x, y, and/or z; standard deviation of CV of channel x, y, and/or z; skewness of CV of channel x, y, and/or z; kurtosis of CV of channel X, Y, Z) of a difference between the template-signal vector data set and two or more of the plurality of detected quasiperiodic cycles (e.g., wherein the predefined variability threshold is associated with a distribution-associated metric).

In some embodiments, the biophysical signal data set comprises two or more channels of the acquired biopotential signals, and wherein the one or more values associated with a heart cycle variability are generated for each of the two or more channels of the acquired biopotential signals.

In some embodiments, the biophysical signal data set comprises two or more channels of the acquired optical signal data set associated with the photoplethysmographic signal, and wherein the one or more values associated with a heart cycle variability are generated for each of the two or more channels of acquired biopotential signals.

In some embodiments, the method further includes causing, by the one or more processors and/or remotely by one or more cloud-based services or systems, a notification message associated with the rejection to be transmitted to the cardiac measurement equipment or the remote terminal.

In some embodiments, the method further includes determining, by the one or more processors and/or remotely by one or more cloud-based services or systems, one or more synchronicity dynamical propert(ies) between the first biophysical signal data set associated with the saturation of oxygenated and/or deoxygenated hemoglobin and the second biophysical signal data set associated with the cardiac signal; and determining, by the one or more processors and/or remotely by one or more cloud-based services or systems, the estimated value for presence of a disease state based on the determined one or more synchronicity dynamical propert(ies).

In some embodiments, the method further includes determining, by the one or more processors and/or remotely by one or more cloud-based services or systems, one or more signal quality parameters of the obtained first and second biophysical-signal data sets, wherein at least one of the one or more signal quality parameters is selected from group consisting of powerline interference parameter associated with powerline noise contamination, a high-frequency noise parameter associated with high frequency noise contamination, a noise burst parameter associated with high frequency noise burst contamination, an abrupt movement parameter associated with abrupt movement contamination, and an asynchronous noise parameter associated with skeletal muscle contamination.

In some embodiments, the step to determine the one or more signal quality parameters comprises calculating one or more biopotential noise scores of the biophysical signal data set.

In some embodiments, the one or more biopotential noise scores comprises a score value associated with biopotential powerline interference or a score value associated with biopotential high-frequency noise.

In some embodiments, the score value associated with biopotential powerline interference determines noise introduced by a pre-dominant powerline frequency for a given region.

In some embodiments, the score value associated with biopotential high-frequency noise determines excessive signal frequency content greater than 170 Hz.

In some embodiments, the step to determine the one or more signal quality parameters comprises calculating one or more PPG noise scores of the biophysical signal data set.

In some embodiments, the one or more PPG noise scores comprises at least one of: a score value associated with a frequency of PPG signal jumps and dropouts; a score value associated with a frequency of PPG signal that is clipped or railing, and a score value associated with a duration of the PPG signal that is clipped or railing.

In some embodiments, the step to determine the one or more signal quality parameters further comprises removing, by the one or more processors and/or remotely by one or more cloud-based services or systems, a pre-defined transient window from the first biophysical signal data set (e.g., 10 seconds from the beginning and/or 2 seconds from the end of the acquired raw signal) and/or the second biophysical signal data set (e.g., 30 seconds from the beginning of the acquired raw signal).

In some embodiments, the step to determine the one or more signal quality parameters further comprises determining, by the one or more processors and/or remotely by one or more cloud-based services or systems, a mean for each of acquired channels of the first biophysical signal data set and/or the second biophysical signal data set; and subtracting, by the one or more processors and/or remotely by one or more cloud-based services or systems, the determined mean from each respective channel (e.g., to remove direct current offset (DC)).

In some embodiments, the step to determine the one or more signal quality parameters further comprises determining, by the one or more processors and/or remotely by one or more cloud-based services or systems, a low-frequency baseline for each of acquired channels of the first biophysical signal data set and/or the second biophysical signal data set; and subtracting, by the one or more processors and/or remotely by one or more cloud-based services or systems, the determined low-frequency baseline from each respective channel (e.g., to remove baseline wander).

In some embodiments, the step of calculating the one or more biopotential noise scores of the score value associated with biopotential powerline interference comprises determining, by the one or more processors and/or remotely by one or more cloud-based services or systems, a maximum powerline energy of a portion of the second biophysical signal data set at a frequency window that is centered around a powerline frequency of interest (e.g., wherein the frequency window is defined as a pre-defined frequency positive and negative offset from the powerline frequency of interest).

In some embodiments, the step of calculating the one or more biopotential noise scores of the score value associated with biopotential powerline interference comprises:

determining, by the one or more processors and/or remotely by one or more cloud-based services or systems, one or more powerline coefficient values for each acquired channel of the second biophysical signal data set.

In some embodiments, the step of calculating the score value associated with biopotential high-frequency noise comprises computing, by the one or more processors and/or remotely by one or more cloud-based services or systems, a stationary wavelet transform signal (e.g., via orthogonal Daubechies wavelet operations) of the second biophysical signal data set, wherein energy at levels corresponding to contents greater than 170 Hz are preserved; applying, by the one or more processors and/or remotely by one or more cloud-based services or systems, an inverse SWT result to convert the stationary wavelet transform signal to a time-domain signal with high-frequency content removed; calculating, by the one or more processors and/or remotely by one or more cloud-based services or systems, signal-to-noise ratio (SNR) signal of the time-domain signal with high-frequency content removed; and calculating, by the one or more processors and/or remotely by one or more cloud-based services or systems, the score value associated with biopotential high-frequency noise based on a median operation of the calculated signal-to-noise ratio signal.

In some embodiments, the step to determine the one or more signal quality parameters of the first biophysical data set comprises: determining, by the one or more processors and/or remotely by one or more cloud-based services or systems, a baseline using 0.3 Hz as a high pass cut-off frequency; and removing, by the one or more processors and/or remotely by one or more cloud-based services or systems, the baseline.

In some embodiments, the step to determine the one or more signal quality parameters of the first biophysical data set further comprises: applying, by the one or more processors and/or remotely by one or more cloud-based services or systems, a low-pass digital filter to generate a low-pass digital signal, wherein the low-pass digital filter (e.g., a $2^{nd}$ order Chebyshev filter) has at least one of: a 30-hz pass band frequency; a 35-hz stop band frequency; a passband ripple of 1 dB; and a stopband attenuation of 80 dB.

In some embodiments, the step to determine the one or more signal quality parameters of the first biophysical data set further comprises smoothing, by the one or more processors and/or remotely by one or more cloud-based services or systems, the low-pass digital signal.

In some embodiments, the score value associated with a frequency (e.g., in percentage) of PPG signal jumps and dropouts is calculated as: $MAD=\{X(t)-median[X(t)]\}/median(|X(t)-median[X(t)]|)$, where $X(t)$ is the signal of interest.

In some embodiments, the method further includes determining, by the one or more processors and/or remotely by one or more cloud-based services or systems, if any acquired channels of the first biophysical signal data set and second biophysical data set fails a powerline interference score assessment; and rejecting, by the one or more processors and/or remotely by one or more cloud-based services or systems, the first biophysical signal data set and second biophysical data set based on the determination.

In some embodiments, the method further includes determining, by the one or more processors and/or remotely by one or more cloud-based services or systems, if any acquired channels of the first biophysical signal data set and second biophysical data set fails a high-frequency noise score assessment; and rejecting, by the one or more processors and/or remotely by one or more cloud-based services or systems, the first biophysical signal data set and second biophysical data set based on the determination.

In some embodiments, the method further includes determining, by the one or more processors and/or remotely by one or more cloud-based services or systems, if an acquired channel of first biophysical signal data set fails a percentage outlier assessment; and rejecting, by the one or more processors and/or remotely by one or more cloud-based services or systems, the first biophysical signal data set and second biophysical data set based on the determination.

In some embodiments, the method further includes determining, by the one or more processors and/or remotely by one or more cloud-based services or systems, if an acquired channel of first biophysical signal data set fails a percentage railed assessment; and rejecting, by the one or more processors and/or remotely by one or more cloud-based services or systems, the first biophysical signal data set and second biophysical data set based on the determination.

In some embodiments, the method further includes determining, by the one or more processors and/or remotely by one or more cloud-based services or systems, if an acquired channel of first biophysical signal data set fails a maximum railed window assessment; and rejecting, by the one or more processors and/or remotely by one or more cloud-based services or systems, the first biophysical signal data set and second biophysical data set based on the determination.

In some embodiments, the disease state includes significant coronary artery disease or abnormal or elevated left ventricular end-diastolic pressure.

In some embodiments, a synchronicity dynamical property of the first and second biophysical signal data sets comprises a statistical assessment of time intervals between i) a first set of landmarks defined between the red photoplethysmographic signal and the infrared photoplethysmographic signal and ii) a second set of landmarks defined in the cardiac signal.

In some embodiments, a synchronicity dynamical property of the first and second biophysical signal data sets comprises a statistical assessment of phase relations between periods of one of red or infrared photoplethysmographic signals and periods of a cardiac signal.

In some embodiments, the method further includes causing, by the one or more processors, generation of a visualization of the estimated value for the presence of the disease state, wherein the generated visualization is rendered and displayed at a display of a computing device (e.g., computing workstation; a surgical, diagnostic, or instrumentation equipment) and/or presented in a report (e.g., an electronic report).

In some embodiments, the method further includes determining, by the one or more processors, a Poincaré map of the synchronicity of the first and second biophysical signal data sets; and extracting a second statistical parameter of the Poincaré map, wherein the second statistical parameter of the histogram is selected from the group consisting of mean, mode, median, skew, kurtosis, wherein the extracted second statistical parameter is used in the determining of the estimated value for the presence of the disease state.

In another aspect, a cardiac measurement equipment is disclosed comprising a processor; and a memory having instructions stored therein, wherein execution of the instructions by the processor, cause the processor to perform any of the above-discussed method.

In another aspect, a system is disclosed comprising a processor; and a memory having instructions stored therein, wherein execution of the instructions by the processor, cause the processor to perform any of the above-discussed method.

In another aspect, a computer readable medium is disclosed having instructions stored therein, wherein execution of the instructions by a processor, cause the processor to perform any of the above-discussed method.

BRIEF DESCRIPTION OF THE DRAWINGS

The accompanying drawings, which are incorporated in and constitute a part of this specification, illustrate embodiments and together with the description, serve to explain the principles of the methods and systems.

Embodiments of the present invention may be better understood from the following detailed description when read in conjunction with the accompanying drawings. Such embodiments, which are for illustrative purposes only, depict novel and non-obvious aspects of the invention. The drawings include the following figures:

FIGS. 6C, 6D, and 6E respectively show a residue model used to generate cycle-variability based score in accordance with an illustrative embodiment.

FIG. 9 shows experimental results from a study that indicates clinical predictive value of certain dynamical features extracted from Poincaré and phase analyses of photoplethysmographic and cardiac signals that indicate the presence and non-presence of a disease or abnormal condition in accordance with an illustrative embodiment.

DETAILED SPECIFICATION

Figure 1A:
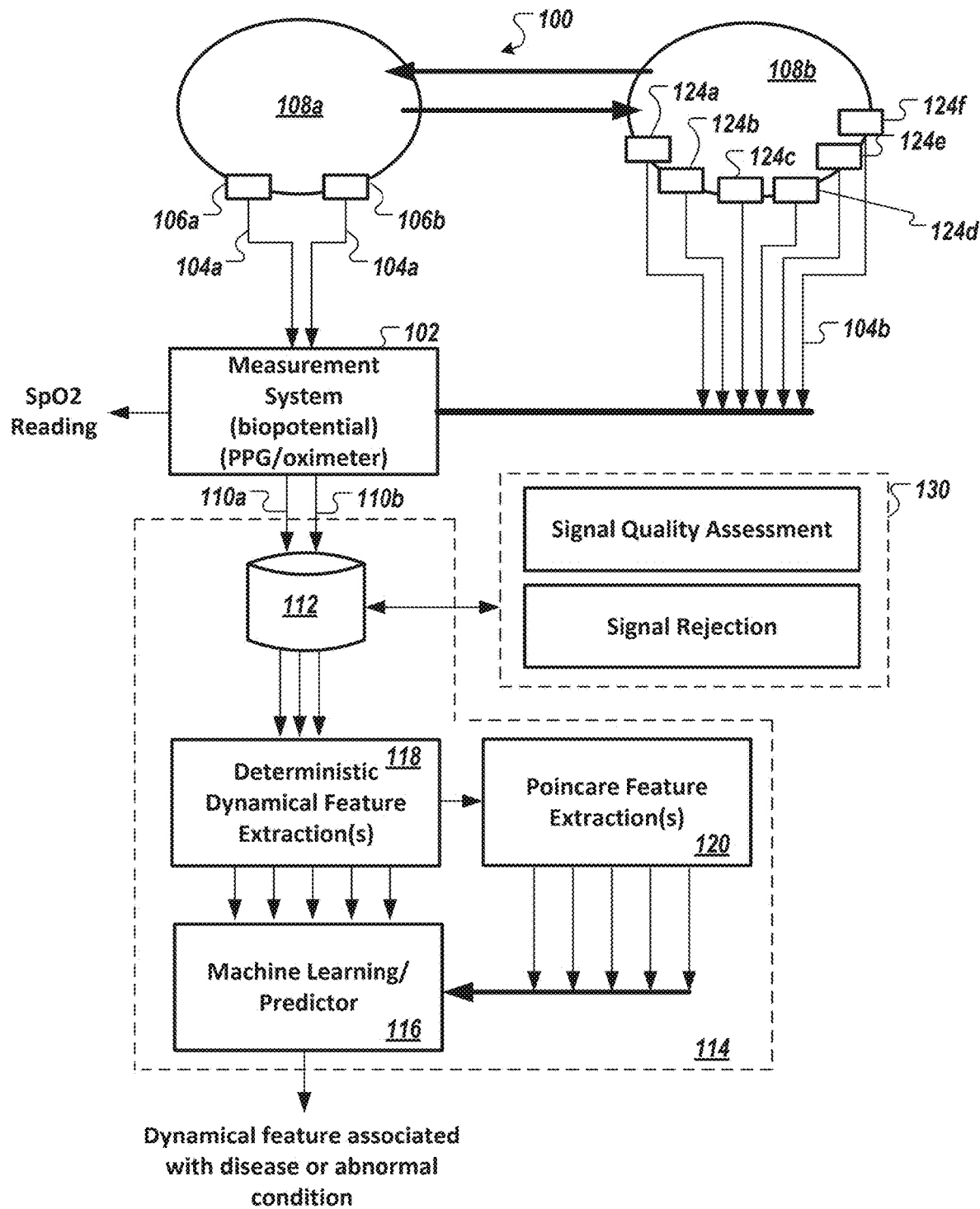
FIG. 1A is a diagram of an exemplary system configured to non-invasively assess predict and/or estimate presence, non-presence, severity, and/or localization (where applicable) of disease in such physiological system, in accordance with an illustrative embodiment.

Each and every feature described herein, and each and every combination of two or more of such features, is included within the scope of the present invention provided that the features included in such a combination are not mutually inconsistent.

While the present disclosure is directed to the beneficial assessment of biophysical signals, e.g., raw or pre-processed photoplethysmographic signals, cardiac signals, etc., in the diagnosis and treatment of cardiac-related pathologies and conditions, such assessment can be applied to the diagnosis and treatment (including without limitation surgical, minimally invasive, lifestyle, nutritional, and/or pharmacologic treatment, etc.) of any pathologies or conditions in which a biophysical signal is involved in any relevant system of a living body. In the cardiac (or cardiovascular) context, the assessment can be applied to the diagnosis and treatment of coronary artery disease (CAD) and diseases and/or conditions associated with an abnormal left ventricular end-diastolic pressure (LVEDP). The assessment can be applied for the diagnosis and treatment of any number of therapies, alone or in combination, such as the placement of a stent in a coronary artery, performance of an atherectomy, angioplasty, prescription of drug therapy, and/or the prescription of exercise, nutritional and other lifestyle changes, etc. Other cardiac-related pathologies or conditions that may be diagnosed include, e.g., arrhythmia, congestive heart failure, valve failure, pulmonary hypertension (e.g., pulmonary arterial hypertension, pulmonary hypertension due to left heart disease, pulmonary hypertension due to lung disease, pulmonary hypertension due to chronic blood clots, and pulmonary hypertension due to other disease such as blood or other disorders), as well as other cardiac-related pathologies, conditions and/or diseases. In some embodiments, the assessment may be applied to neurological-related pathologies and conditions. Non-limiting examples of neurological-related diseases, pathologies or conditions that may be diagnosed include, e.g., epilepsy, schizophrenia, Parkinson's Disease, Alzheimer's Disease (and all other forms of dementia), autism spectrum (including Asperger syndrome), attention deficit hyperactivity disorder, Huntington's Disease, muscular dystrophy, depression, bipolar disorder, brain/spinal cord tumors (malignant and benign), movement disorders, cognitive impairment, speech impairment, various psychoses, brain/spinal cord/nerve injury, chronic traumatic encephalopathy, cluster headaches, migraine headaches, neuropathy (in its various forms, including peripheral neuropathy), phantom limb/pain, chronic fatigue syndrome, acute and/or chronic pain (including back pain, failed back surgery syndrome, etc.), dyskinesia, anxiety disorders, conditions caused by infections or foreign agents (e.g., Lyme disease, encephalitis, rabies), narcolepsy and other sleep disorders, post-traumatic stress disorder, neurological conditions/effects related to stroke, aneurysms, hemorrhagic injury, etc., tinnitus and other hearing-related diseases/conditions and vision-related diseases/conditions.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the list. All references cited and discussed in this specification are hereby incorporated herein by reference in their entireties and to the same extent as if each reference was individually incorporated by reference.

Example System

FIG. 1A is a diagram of an exemplary system 100 configured to non-invasively predict and/or estimate (e.g., determine) presence, non-presence, localization, and/or severity of a metric/measure associated with a disease or condition in such physiological system, in accordance with an illustrative embodiment. Indeed, as used herein, the term "predicting" refers to forecasting a future event (e.g., potential development of a disease or condition), while the term "estimating" can refer to a quantification of some metric based on available information, e.g., for the presence, non-presence, localization, and/or severity of a disease or condition, or an indicator of one. The operations of predicting and estimating can be generally referred to as determining. In some embodiments, the system 100 is configured to assess dynamical properties of a physiological system. In other embodiments, the system may perform other types of analysis as described or referenced herein.

As used herein, "metric associated with a disease" refers to an estimated or predicted physical measure of the body, such as a pressure, blockage, flow, to which a diagnostic for a disease or abnormal condition can be performed. An example of an estimated metric associated with a disease includes presence or non-presence (or severity) abnormal or elevated blood pressure in specific chambers of the heart (e.g., abnormal or elevated left ventricular end diastolic pressure), which is an indicator of the subject having high-risk of left-heart failure. Another example of an estimated metric associated with a disease includes presence or non-presence (or severity) of blockages in coronary arteries or of abnormal flow in the coronary arteries, which is an indicator of the subject having or possessing a high-risk of having coronary arterial disease. The estimated metric serves as a proxy for actual physical measure via non-invasively acquired measurements to augment or substitute for such physical measure, which often are acquired invasively and/or that can involve application of radiation, administration of pharmacologic or other agents, involve exercise, and combinations thereof. Notably, the sensors in some embodiments are positioned at external locations on the body that are more readily available for observation (e.g., at the chest and back region or at the finger). Because elevated LVEDP is an indicator of HF, but often does not itself necessarily provide enough information for a clinician to make a definitive HF diagnosis without other information about the patient and their condition, the clinician can use the assessed metric along with other measurements and analysis within their standard of care protocols to make an appropriate diagnosis of, e.g., HF and/or other conditions that may be present. With that said, in some embodiments, however, and in some use cases, the system discussed herein may be useful for a healthcare professional directly to aid in their assessment and/or diagnosis of disease in ways heretofore unknown.

As noted herein, "physiological systems" can refer to the cardiovascular system, the pulmonary system, the renal system, the nervous system, and other functional systems and sub-systems of a mammalian body. In the context of the cardiovascular system, system 100 facilitates the investigation of complex, nonlinear dynamical properties of the heart over many heart cycles.

Figure 1B:
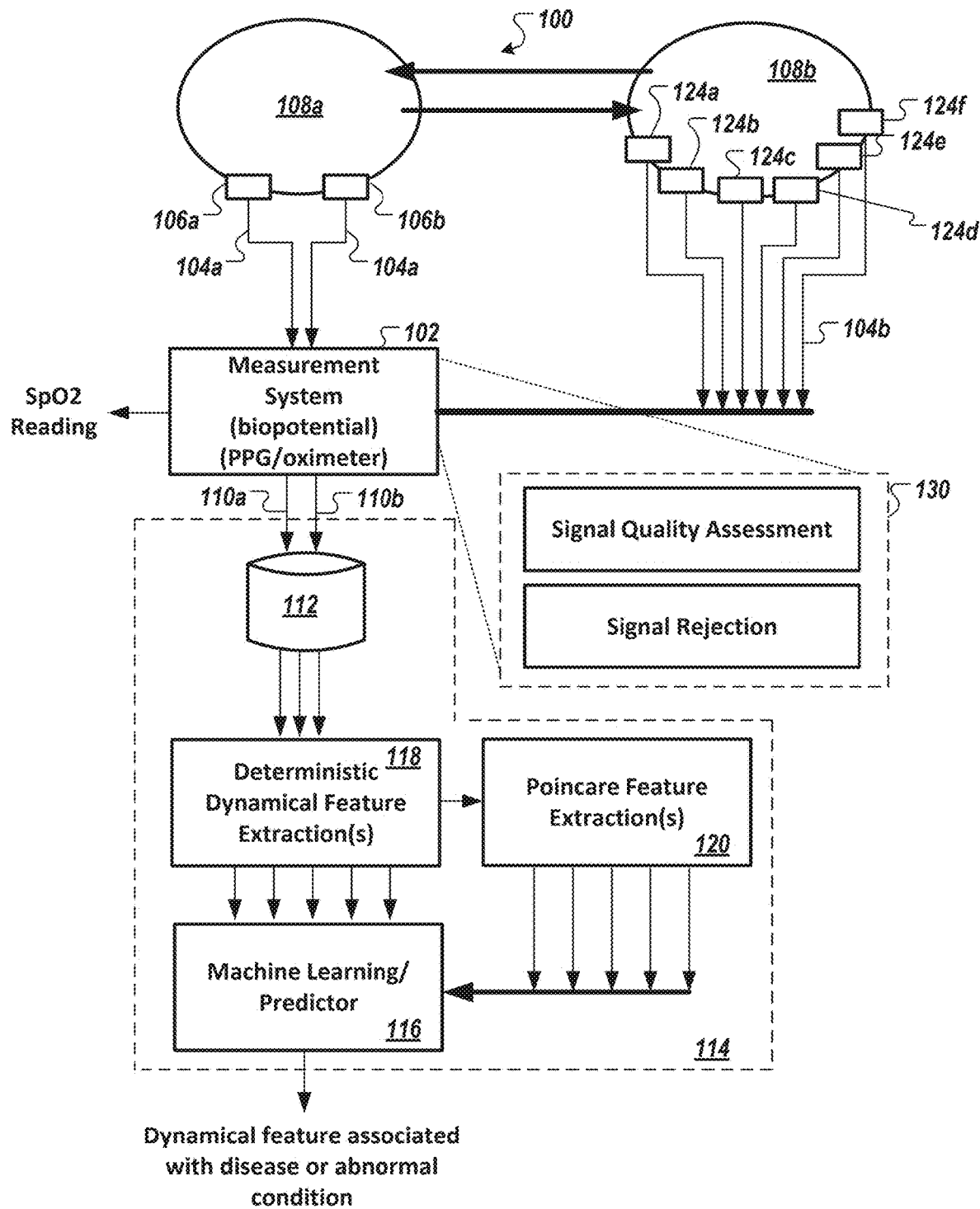
FIG. 1B is a diagram of another exemplary system configured to non-invasively predict and/or estimate presence, non-presence, severity, and/or localization (where applicable) of disease in such physiological system, in accordance with an illustrative embodiment.

In FIG. 1A and FIG. 1B, non-invasive measurement system 102 (shown as "Measurement System" 102) acquires two or more sets of biophysical signals 104 (shown as sets 104a and 104b) via measurement probes 106 (shown as probes 106a, 106b and probes 124a-124f) from a subject 108 (shown at location 108a and 108b) to produce a biophysical-signal data set 110, including a first type and a second type (shown as 110a and 110b).

The first type is acquired via probes 106a. 106b from the subject at location 108a (e.g., a finger of the subject) to generate a raw photoplethysmographic signal data set 110a from photoplethysmographic signal(s) 104a. In some embodiments, the raw photoplethysmographic signal data set 110a includes one or more photoplethysmographic signal(s) associated with measured changes in light absorption of oxygenated and/or deoxygenated hemoglobin.

The second type is acquired via probes 124a-124f from subject at a location 108b to generate a cardiac signal data set 110b from cardiac signals 104b. In some embodiments, cardiac signal data set 110b includes data associated with biopotential signals acquired across a plurality of channels. In some embodiments, cardiac signal data set 110b includes wide-band biopotential signals, e.g., acquired via a cardiac and photoplethysmographic waveform capture or recorder device (also as may be referred to herein as cardiac and photoplethysmographic waveform or signal capture or recording instrument or as a phase signal recorder ("PSR"), as described in U.S. Patent Publication No. 2017/0119272, entitled "Method and Apparatus for Wide-Band Phase Gradient Signal Acquisition," which is hereby incorporated by reference herein in its entirety. In some embodiments, the cardiac signal data set includes bipolar wide-band biopotential signals, e.g., acquired via a cardiac and photoplethysmographic waveform recorder, as described in U.S. Patent Publication No. 2018/0249960, entitled "Method and Apparatus for Wide-Band Phase Gradient Signal Acquisition," which is hereby incorporated by reference herein in its entirety. In other embodiments, the cardiac signal data set 110b includes one or more biopotential signals acquired from conventional electrocardiogram (ECG/EKG) equipment (e.g., Holter device, 12 lead ECG, etc.).

FIG. 1A and FIG. 1B further show a module 130 configured to quantify and/or reject an acquired signal based on a signal quality assessment analysis.

Because a clinical analysis of the acquired biophysical signals 110a, 110b can be performed, in some embodiments, on a system that is separate (e.g., non-invasive biophysical-signal assessment system 114) from the measurement system 102, a signal quality check ensures that the acquired biophysical-signal data set 110a, 110b is suitable for subsequent clinical analysis. The operation may facilitate the prompting of the re-acquisition of the biophysical-signal data set by the non-invasive measurement system 102, thus ensuring that the acquired biophysical-signal data set is not contaminated by asynchronous noise (such as skeletalmuscle-related noise) prior to the biophysical-signal data set being subjected, or made available, to further processing and analysis for a clinical assessment.

In some embodiments, the signal quality assessment operation that is part of module 130 is performed in near real-time, e.g., in less than about 1 minute or less than about 5 minutes, in response to which system 102 can prompt for the re-acquisition of the biophysical-signal data set. This near real-time assessment allows the re-acquisition of the biophysical-signal data set, if desired, prior to the patient leaving the testing room or other location where the biophysical signal is being acquired. The analysis performed by assessment system 114 to determine a clinical output, in some embodiments, takes about 10-15 minutes to be performed. In other embodiments, this analysis takes less than about 5 minutes to be performed. In yet other embodiments, this analysis takes about 5-10 minutes to be performed. In still other embodiments this analysis takes more than about 15 minutes to be performed.

In some embodiments, the signal assessment is performed entirely in the same physical location as that of the patient (e.g., on one or more computing and/or storage devices located in the patient's bedroom or a clinician examination room). In some embodiments, the signal assessment is performed entirely in a different physical location from that of the patient (e.g., on one or more computing and/or storage devices located in another room, another building, another state, another country, etc.). In some embodiments, the signal assessment is performed in a networked environment involving multiple physical locations and multiple computing and/or storage devices (e.g., in the local area or in a cloud infrastructure). Such a networked environment can be secured to protect the privacy of the patient whose signals are being assessed in order to, e.g., comply with various privacy requirements.

In some embodiments, the signal assessment is performed as the signals are being acquired from the patient—e.g., as quickly or nearly as quickly as the signal assessment system is capable of operating (e.g., in real time or near-real time, depending on the signal assessment system configuration, network constraints, etc.). In FIG. 1B, the signal assessment is shown being performed locally at the acquisition device 102.

In other embodiments, the signal assessment is performed partially as the signals are acquired (e.g., at the acquisition device 102) and partially after they have been acquired from the patient and stored (e.g., at the assessment system 114, e.g., located in a cloud or remote computing infrastructure). In still other embodiments, none of the signals are assessed as they are being acquired from the patient and instead are stored for assessment at a later time relative to the time they are acquired from the patient. Of course, all signals, regardless of the time they may be assessed, may be stored after being acquired for later assessment or reassessment.

One or more clinicians may perform a clinical assessment of the patient based in whole or in part on that patient's signal assessment performed by the systems and via methods described herein. Such clinicians may physically be with the patient and/or at a location physically removed from the patient. The signal assessment systems described herein can also perform, in whole or in part, a clinical assessment of the patient, by way, e.g., of a clinical output of an operation or operations performed by a signal assessment system. Alternatively, the signal assessment system may simply provide information that falls short of a clinical assessment for use by clinicians in performing their own clinical assessment of the patient. And in the case where the signal assessment system does provide a clinical output, the clinician may, as well, choose to accept or reject such clinical output in performing their own ultimate clinical assessment of the patient, in cases, for example, where such clinician involvement and ultimate decision making is desired or even required (by, e.g., law, protocol, insurance requirements, etc.).

In some embodiments, the signal quality assessment operation of module 130 causes the assessment system 114, or a house-keeping module, to reject the biophysical signal data set via a signal rejection operation of module 130 as shown in FIGS. 1A and 1B. The signal quality assessment operation of module 130 may compare a given cycle-variability based metric to a predefined variability threshold. The comparison may be based on whether the cycle-variability based metric is outside, above, or below a pre-defined range or value. The threshold is determined, in some embodiments, based on a quantification, e.g., as described in U.S. Patent Publication No. 2019/0384757, entitled "Methods and Systems to Quantify and Remove Asynchronous Noise in Biophysical Signals." For example, the cycle-variability threshold values for skeletal-muscle-related-signal contamination and muscle-artifact-noise contamination may be quantified, using this analytical framework, on signal data set having skeletal-muscle-related-signal contamination and muscle-artifact-noise contamination. In some embodiments, clustering analysis is used as a basis for the quantification. Various asynchronous-noise contamination in an acquired signal may be quantified in this manner to determine a threshold that can be used for the rejection of a signal.

In some embodiments, non-invasive measurement system 102 is configured to generate a notification of a failed or unsuitable acquisition of biophysical-signal data set, wherein the notification may also prompt the re-acquisition of biophysical-signals. The notification may be in any form, e.g., a visual output (e.g., one or more indicator lights or indicator on a screen), an audio output, a tactile/vibrational output (or any combination thereof) that is provided to a technician or clinician and/or to the patient. Non-limiting examples of a user interface (e.g., graphical user interface) of the measurement system 102, for example, at which the notification can be presented is provided in U.S. Publication No. 2017/0119272, filed Aug. 26, 2016, title "Method and Apparatus for Wide-Band Phase Gradient Signal Acquisition"; U.S. Design application Ser. No. 29/578,421, title "Display with Graphical User Interface, each of which is hereby incorporated by reference herein in its entirety. To this end, all or a portion of the rejected biophysical-signal data set may not be used in subsequent analysis (e.g., 114) to yield the clinical output.

In some embodiments, the rejected biophysical-signal data set optionally may be stored into any suitable memory (112) for further (troubleshooting) analysis of defects and/or other reasons that led to the rejection of the acquired signal. To this end, all or a portion of the rejected biophysical-signal data set may not be used in subsequent analysis (e.g., 114) to yield the clinical output depending on the outcome of any such analysis.

In some embodiments, system may use all or a portion of the rejected biophysical-signal data set in subsequent analysis (e.g., 114) to yield the clinical output or, e.g., to improve system operational capability, etc.

In other embodiments, a clinician or other operator may control, alone or in connection with or as aided by system, whether and how all or a portion of the rejected biophysical signal data set may or may not be used.

Example Photoplethysmographic Signals

Figure 2A:
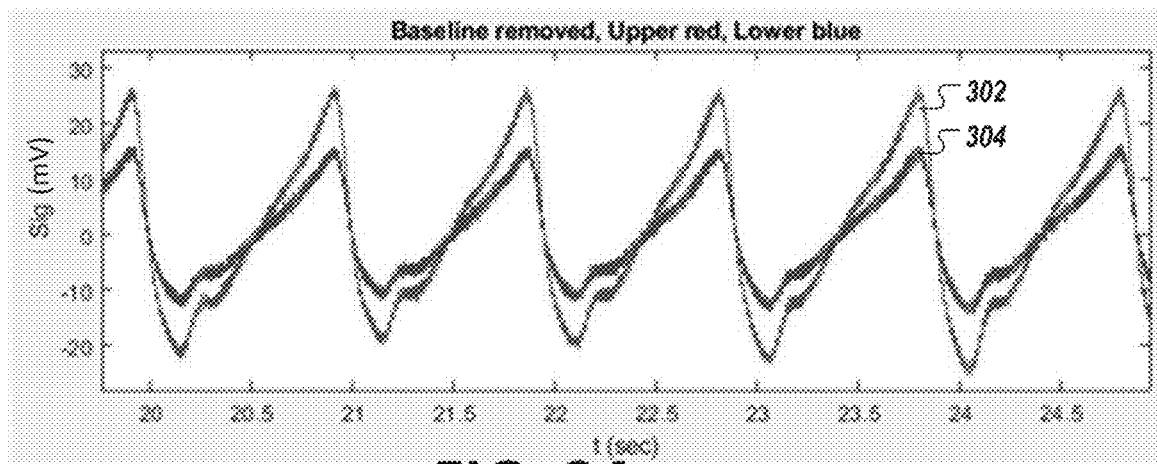
FIGS. 2A and 2B show examples of photoplethysmographic signal(s) acquired via measurement system of FIG. 1A in accordance with an illustrative embodiment.
Figure 2B:
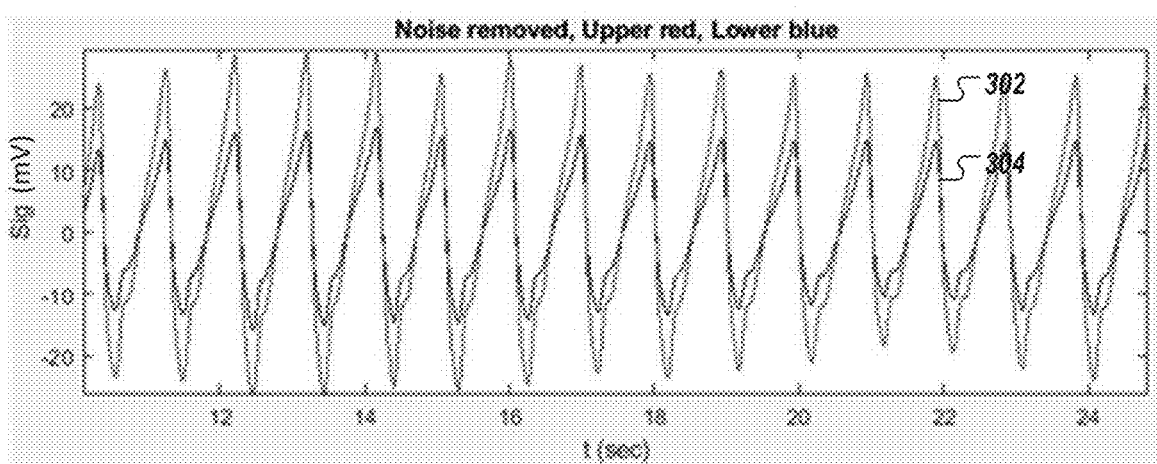
Figure 2C:
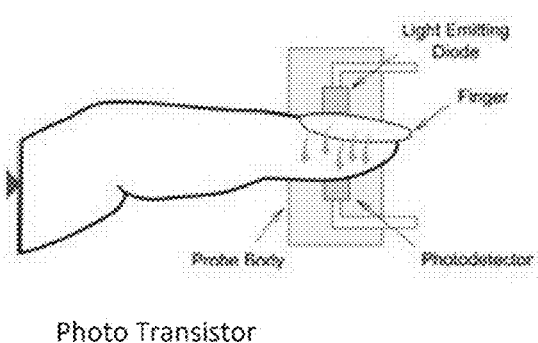
FIG. 2C shows an example sensor configuration to acquire photoplethysmographic signal(s) of FIG. 2A in accordance with an illustrative embodiment.

FIGS. 2A and 2B show examples of photoplethysmographic signal(s) 104a (also referred to herein as a PPG signal) acquired via measurement system 102 in accordance with an illustrative embodiment. Specifically, FIG. 2A shows a first signal waveform 302 comprising a red photoplethysmographic signal associated with the absorption level of the red spectrum of light by the deoxygenated hemoglobin from a finger of a patient. In some embodiments, the red photoplethysmographic signal has an associated wavelength that spans over 660 nm. FIG. 2A also shows a second signal waveform 304 (also referred to herein as an infrared photoplethysmographic signal) of the absorption level of the infrared spectrum light (e.g., having wavelength that spans over 940 nm) by the oxygenated hemoglobin from a finger of a patient. Other spectra may be acquired as desired. In addition, measurements may be performed at other parts of the body. In FIG. 2A, the x-axis shows time (in seconds) and the y-axis shows the signal amplitude in millivolts (mv). FIG. 2B shows the signals of FIG. 2A over a larger time scale (x-axis) to include additional data in the waveform. FIG. 2C shows an example sensor configuration to acquire photoplethysmographic signal(s) 104a in accordance with an illustrative embodiment; other configurations are possible. In FIG. 2C, the transmissive system includes a light source (e.g., a red LED and an infrared LED) and a phototransistor (e.g., red detector and infrared detector); the phototransistor is distally located from the light source.

Figure 2D:
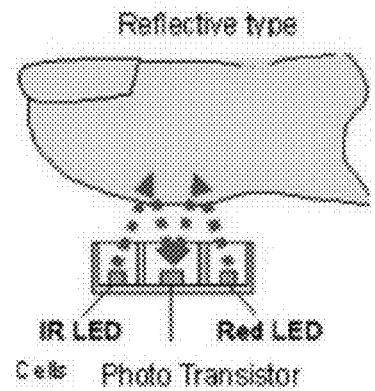
FIG. 2D shows another example sensor configuration to acquire photoplethysmographic signal(s) of FIG. 2A in accordance with another illustrative embodiment.

FIG. 2D shows another example sensor configuration to acquire photoplethysmographic signal(s) 104 in accordance with another illustrative embodiment. In FIG. 2D, the system also includes a light source (e.g., a red LED and an infrared LED) and a phototransistor (e.g., red detector and infrared detector); however, the phototransistor is proximally located to the light source to measure reflectance. Reflectance based acquisition may be applied to other locations, e.g., along the torso, head, neck, etc.

Photoplethysmography is used to optically measure variations of the volume of blood perfusing tissue (e.g., cutaneous, subcutaneous, cartilage) into which light is emitted, typically at a specific wavelength, from a LED or other source. The intensity of this light after passing through the tissue (e.g., fingertip, earlobe, etc.) is then registered by a photodetector to provide the photoplethysmographic signals. The amount of light absorbed depends on the volume of the blood perfusing the interrogated tissue. The variation in light absorbed is observable in the photoplethysmographic signal and can provide valuable information with regard to cardiac activity, pulmonary function, their interactions, and other physiological system functions.

In some embodiments, measurement system 102 comprises custom or dedicated equipment or circuitry (including off-the-shelf devices) that are configured to acquire such signal waveforms for the purpose diagnosing disease or abnormal conditions. In other embodiments, measurement system 102 comprises pulse oximeter or optical photoplethysmographic device that can output acquired raw signals for analysis. Indeed, in some embodiments, two or more of the acquired waveforms 104 may be analyzed to calculate the level of oxygen saturation of the blood; shown in FIG. 1A and FIG. 1B as an "SpO2 reading". For the exemplified analysis application however, only the waveform is processed and utilized.

Photoplethysmographic signal(s) 104 may be considered measurements of the state of a dynamical system in the body, similar to cardiac signals. The behavior of the dynamical system may be influenced by the actions of the cardiac and respiratory systems. It is postulated that any system aberrations (due, e.g., to a disease or abnormal condition) may manifest itself in the dynamics of photoplethysmographic signal(s) 104 via some interaction mechanism or mechanisms.

In some embodiments, the acquired photoplethysmographic signal(s) 104 are down-sampled (e.g., to 250 Hz or other frequency). Other frequency ranges may be used. In some embodiments, the acquired photoplethysmographic signal(s) 104 are processed to remove baseline wander and/or to filter for noise and/or mains frequencies.

Example Cardiac Signals

Electrocardiographic signals measure the action potentials of cardiac tissue (i.e., cardiomyocytes). There are various configurations of leads that can be used in a mammalian body, and in particular humans, to obtain these signals in the context of the present disclosure. In an example configuration, seven leads are used. This configuration results in three orthogonal channels/signals, e.g., X, Y and Z, corresponding to the coronal, sagittal and transverse planes, respectively.

As discussed above, in some embodiments, cardiac signal data set 110b includes data associated with biopotential signals acquired across a plurality of channels. In some embodiments, cardiac signal data set 110b includes wideband biopotential signals (e.g., unipolar or bi-polar) acquired via the cardiac and photoplethysmographic waveform recorder discussed above. In other embodiments, the cardiac signal data set 110b includes one or more biopotential signals acquired from conventional electrocardiogram (ECG/EKG) equipment (e.g., Holter device, 12 lead ECG, etc.).

The cardiac and photoplethysmographic waveform recorder is configured to concurrently acquire photoplethysmographic signals 104a along with cardiac signal 104b (e.g., synchronized within 100 milliseconds of one another). Thus, in some embodiments, measurement system 102b is configured to acquire two types of biophysical signals.

Figure 3A:
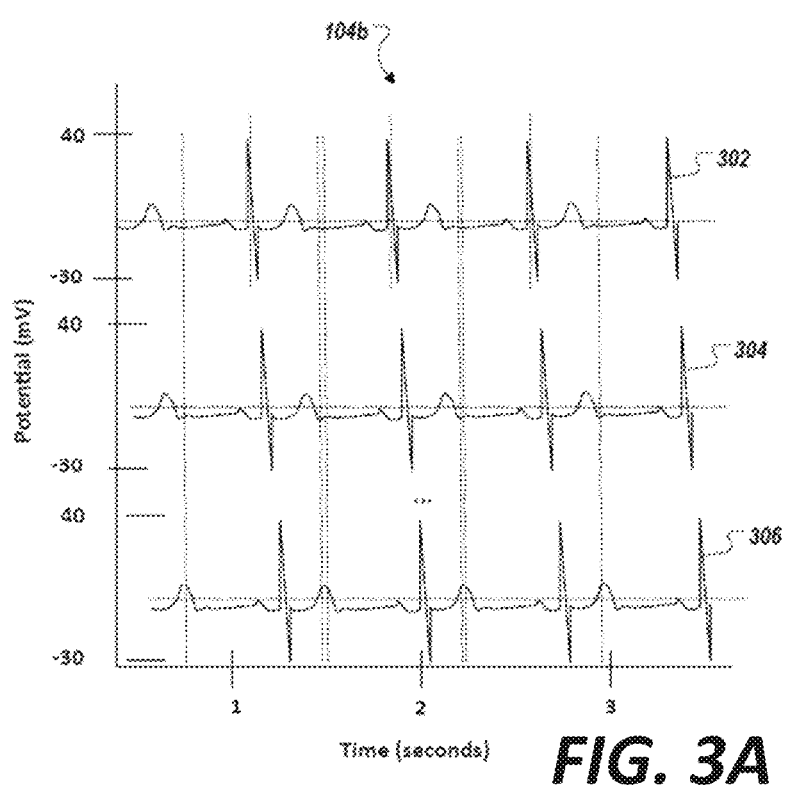
FIG. 3A shows example cardiac signals (e.g., biopotential signals) as example biophysical signals acquired via the measurement system of FIG. 1A, in accordance with an illustrative embodiment.

FIG. 3A shows example cardiac signals (e.g., biopotential signals) as example biophysical signals acquired via the measurement system of FIG. 1A or FIG. 1B, in accordance with an illustrative embodiment. The signals are shown with baseline wander and high-frequency noise removed. In some embodiments, the cardiac signals 104b are acquired using a cardiac and photoplethysmographic waveform recorder device, e.g., such as described in U.S. Patent Publication No. 2017/0119272. The signals 104b includes bipolar biopotential measurements acquired over three channels to provide three signals 302, 304, 306 (also referred to channel "x", channel "y", and channel "z"). In FIG. 3A, the x-axis shows time (in seconds) and the y-axis shows the signal amplitude in millivolts (mv).

Figure 3B:
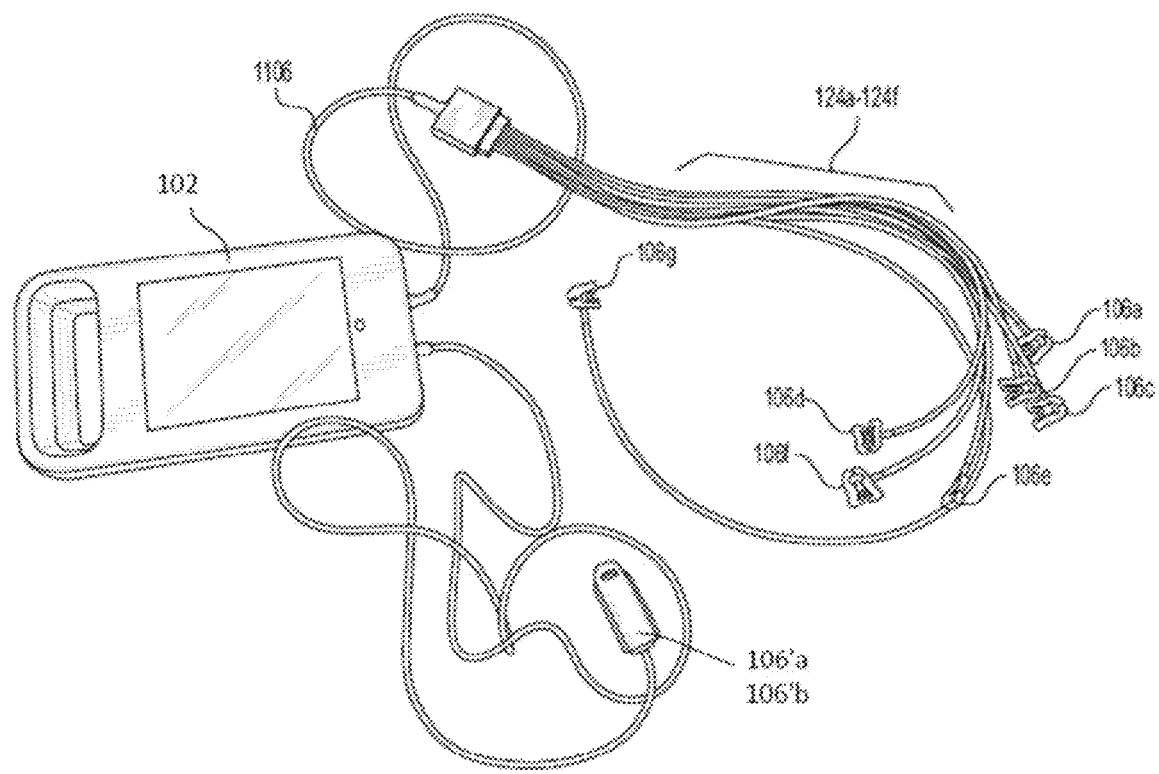
FIG. 3B is a measurement system configured to acquire the cardiac signals of FIG. 3A.

FIG. 3B is a diagram of a cardiac and photoplethysmographic waveform recorder device, e.g., as described in U.S. Patent Publication No. 2017/0119272, configured to acquire cardiac signals 104b. The cardiac and photoplethysmographic waveform recorder device is further configured to also acquire photoplethysmographic signals 104a.

Referring still to FIG. 1A or 1B, non-invasive measurement system 102 is configured to transmit, e.g., over a communication system and/or network, or over direct connection, the acquired data sets 110a, 110b, or a data set derived or processed therefrom, to repository 112 (e.g., a storage area network) that is accessible to a non-invasive biophysical-signal assessment system. The non-invasive biophysical-signal assessment system 114 (shown as analytic engine 114) is configured to analyzed dynamical properties of the acquired signal(s).

In the cardiac and/or electrocardiography contexts, measurement system 102 is configured to capture cardiac-related biopotential or electrophysiological signals of a mammalian subject (such as a human) as a biopotential cardiac signal data set. In some embodiments, measurement system 102 is configured to acquire a wide-band cardiac phase gradient signals as a biopotential signal, a current signal, an impedance signal, a magnetic signal, an ultrasound or acoustic signal, etc. The term "wide-band" in reference to an acquired signal, and its corresponding data set, refers to the signal having a frequency range that is substantially greater than the Nyquist sampling rate of the highest dominant frequency of a physiological system of interest. For cardiac signals, which typically has a dominant frequency components between about 0.5 Hz and about 80 Hz, the wide-band cardiac phase gradient signals or wide-band cardiac biophysical signals comprise cardiac frequency information at a frequency selected from the group consisting between about 0.1 Hz and 1 KHz, between about 0.1 Hz and about 2 KHZ, between about 0.1 Hz and about 3 KHz, between about 0.1 Hz and about 4 KHz, between about 0.1 Hz and about 5 KHz, between about 0.1 Hz and about 6 KHz, between about 0.1 Hz and about 7 KHz, between about 0.1 Hz and about 8 KHz, between about 0.1 Hz and about 9 KHz, between about 0.1 Hz and about 10 KHz, and between about 0.1 Hz and greater than 10 KHz (e.g., 0.1 Hz to 50 KHz or 0.1 Hz to 500 KHz). In addition to capturing the dominant frequency components, the wide-band acquisition also facilitates capture of other frequencies of interest. Examples of such frequencies of interest can include QRS frequency profiles (which can have frequency ranges up to 250 Hz), among others. The term "phase gradient" in reference to an acquired signal, and corresponding data set, refers to the signal being acquired at different vantage points of the body to observe phase information for a set of distinct events/functions of the physiological system of interest. Following the signal acquisition, the term "phase gradient" refers to the preservation of phase information via use of non-distorting signal processing and pre-processing hardware, software, and techniques (e.g., phase-linear filters and signal-processing operators and/or algorithms).

In some embodiments, cardiac signal data set 110*b* includes wide-band biopotential signals, such as, e.g., those acquired via a cardiac and photoplethysmographic waveform recorder as described in U.S. Patent Publication No. 2017/0119272, entitled "Method and Apparatus for Wide-Band Phase Gradient Signal Acquisition," which is hereby incorporated by reference herein in its entirety. In some embodiments, the cardiac signal data set includes bipolar wide-band biopotential signals, e.g., acquired via a cardiac and photoplethysmographic waveform recorder such as described in U.S. Patent Publication No. 2018/0249960, entitled "Method and Apparatus for Wide-Band Phase Gradient Signal Acquisition," which is hereby incorporated by reference herein in its entirety. In other embodiments, the cardiac signal data set 110*b* includes one or more biopotential signals acquired from conventional electrocardiogram (ECG/EKG) equipment (e.g., Holter device, 12 lead ECG, etc.).

The cardiac and photoplethysmographic waveform recorder, in some embodiments, is configured to concurrently acquire photoplethysmographic signals 104*a* along with cardiac signal 104*b* (e.g., within 100 milliseconds of each other). Thus, in some embodiments, measurement system 102*b* is configured to acquire two types of biophysical signals. In other embodiments, measurement system 102 is configured to acquire three or more types of biophysical signals (e.g., including ballistocardiographic-type signals).

In the neurological context, measurement system 102 is configured to capture neurological-related biopotential or electrophysiological signals of a mammalian subject (such as a human) as a neurological biophysical-signal data set. In some embodiments, measurement system 102 is configured to acquire wide-band neurological phase gradient signals as a biopotential signal, a current signal, an impedance signal, a magnetic signal, an ultrasound or acoustic signal, an optical signal, combinations thereof, etc. An example of measurement system 102 is described in U.S. Patent Publication No. 2017/0119272 and in U.S. Patent Publication No. 2018/0249960, each of which is hereby incorporated by reference herein in its entirety.

In some embodiments, the measurement system 102 is configured to capture wide-band biopotential biophysical phase gradient signals as unfiltered mammalian electrophysiological signals such that the spectral component(s) of the signals are not altered. Indeed, in such embodiments, the wide-band biopotential biophysical phase gradient signals are captured, converted, and even analyzed without having been filtered (via, e.g., hardware circuitry and/or digital signal processing techniques, etc.) (e.g., prior to digitization) that otherwise can affect the phase linearity of the biophysical signal of interest. In some embodiments, the wide-band biopotential biophysical phase gradient signals are captured in microvolt or sub-microvolt resolutions that are at, below, or significantly below, the noise floor of conventional electrocardiographic, encephalographic, and other biophysical-signal acquisition instruments. In some embodiments, the wide-band biopotential biophysical signals are simultaneously sampled having a temporal skew or "lag" of less than about 1 microsecond, and in other embodiments, having a temporal skew or lag of not more than about 10 femtoseconds. Notably, the exemplified embodiments minimize non-linear distortions (e.g., those that can be introduced via certain filters) in the acquired wide-band phase gradient signal to not affect the information therein.

Figure 3C:
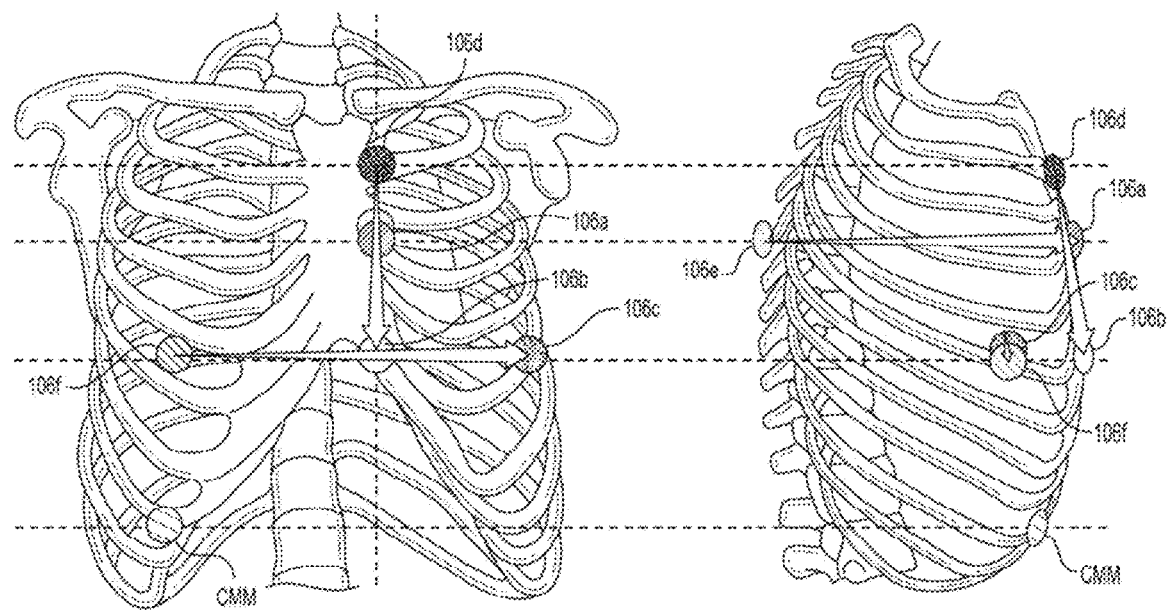
FIG. 3C is a diagram of an example placement of the surface electrodes of the measurement system of FIG. 3B at the chest and back of a patient to acquire the cardiac signals of FIG. 3A in accordance with an illustrative embodiment.

FIG. 3C is a diagram of an example placement of the surface electrodes 106*a*-106*g* at a patient to noninvasively acquire the cardiac signals of FIG. 3A in accordance with an illustrative embodiment. Specifically, FIG. 3C shows example placement of the surface electrodes 106*a*-106*g* at the chest and back of a patient to acquire bio-potential signals associated with wide-band cardiac phase gradient signals in accordance with an illustrative embodiment. In the left pane of FIG. 3C, surface electrodes 106*a*-106*g* are shown placed at the chest and back area of the patient. In the right pane of FIG. 3C, side view of placement of the surface electrodes 106*a*-106*g* is shown.

In the exemplary configuration shown in FIG. 3C, surface electrodes 106*a*-106*g* are positioned on the patient's skin at i) a first location proximal to a right anterior axillary line corresponding to a 5th intercostal space; ii) a second location proximal to a left anterior axillary line corresponding to the 5th intercostal space; iii) a third location proximal to a left sternal border corresponding to a 1st intercostal space; iv) a fourth location proximal to the left sternal border below the sternum and lateral to the patient's xiphoid process; v) a fifth location proximal to the left sternal border corresponding to a 3rd intercostal space; vi) a sixth location proximal to the patient's back directly opposite of the fifth location and left of the patient's spine; and viii) a seventh location proximal to a right upper quadrant corresponding to a 2nd intercostal space along a left axillary line. A common lead (shown as "CMM") is also shown. Locations of individual surface electrodes may vary in other embodiments of the present disclosure as other electrode configurations may be useful.

Referring to FIG. 1A and FIG. 1B, non-invasive measurement system 102 is configured with circuitry and computing hardware, software, firmware, middleware, etc. to acquire both the cardiac signal and the photoplethysmographic signal to generate the biophysical-signal data set 110. In other embodiments, non-invasive measurement system 102 includes a first equipment (not shown) to acquire the cardiac signal and includes a second equipment (not shown) to acquire the photoplethysmographic signal.

Referring still to FIG. 1A and FIG. 1B, non-invasive measurement system 102 is configured to transmit, e.g., over a communication system and/or network, or over direct connection, the acquired biophysical-signal data set 110, or a data set derived or processed therefrom, to a repository 112 (e.g., a storage area network) (not shown) that is accessible to a non-invasive biophysical-signal assessment system. The non-invasive biophysical-signal assessment system 114, e.g., an analytic engine 114) is configured to, e.g., analyze dynamical properties of the acquired photoplethysmographic signal(s).

In some embodiments, analytic engine 114 includes a machine learning/predictor module 116 configured to assess a set of features determined via one or more feature extraction modules (e.g., modules 118, 120) from the acquired biophysical signal(s) to determine one or more features of clinical significance. Once the features have been extracted from the PPG signal(s) or cardiac signal(s), then any type of machine learning can be used. Examples of embodiments that machine learning module 116 can be configured to implement, include but are not limited to decision trees, random forests, SVMs, neural networks, linear models, Gaussian processes, nearest neighbor, SVMs, Naïve Bayes, etc. In some embodiments, machine learning module 116 may be implemented, e.g., as described in U.S. patent application Ser. No. 15/653,433, entitled "Discovering Novel Features to Use in Machine Learning Techniques, such as Machine Learning Techniques for Diagnosing Medical Conditions"; and U.S. patent application Ser. No. 15/653,431, entitled "Discovering Genomes to Use in Machine Learning Techniques"; each of which is hereby incorporated by reference herein in its entirety. The photoplethysmographic signal(s) may be combined with other acquired photoplethysmographic signal(s) to be used in a training data set or validation data set for the machine learning module 116 in the evaluation of a set of assessed dynamical features. The photoplethysmographic signal(s) may have an associated label 122 for a given disease state or abnormal condition. If determined to be of clinical significance, one or more assessed dynamical feature(s) (e.g., from modules 118 or 120) may be subsequently used as a predictor for the given disease or abnormal condition.

In some embodiments, analytic engine 114 includes a pre-processing module, e.g., a module configured to normalize and/or remove baseline wander from the acquired photoplethysmographic signal(s).

In FIG. 1, the analytic engine 114 includes a machine learning/predictor module 116. comprising, e.g., a classifier/regression model, configured to use values from feature assessment modules (e.g., modules 118, 120) to generate an output score or value associated with a metric associate with the presence, non-presence, severity, localization, etc. of an abnormal condition or disease state.

During the training and/or development stage, in some embodiments, one or more features are developed using the PPG signal(s) or cardiac signal(s) and assessed in machine learning algorithms in an infrastructure, e.g., as described in relation to FIGS. 1A and 1B. Examples of embodiments of classifier/regression models include, but are not limited to, decision trees, random forests, SVMs, neural networks, linear models, Gaussian processes, nearest neighbor, SVMs, Naïve Bayes, etc.

In some embodiments, analytic engine 114 includes a pre-processing module, e.g., a module configured to normalize and/or remove baseline wander from the acquired biophysical signal.

Machine learning techniques predict or estimate outcomes based on sets of input data. For example, machine learning techniques are used to recognize patterns and images, supplement medical diagnoses, and so forth. Some machine learning techniques rely on a set of features generated using a training set of data (i.e., a data set of observations, in each of which an outcome to be predicted is known), each of which represents some measurable aspect of observed data, to generate and tune one or more predictive models. For example, observed signals (e.g., cardiac, plethysmographic, or other biophysical signals from a number of subjects, alone or in any number of combinations) may be analyzed to collect frequency, average values, and other statistical information about these signals. A machine learning technique may use these features to generate and tune a model that classifies or relates these features to one or more conditions, such as some form of cardiovascular disease or condition, including, e.g., coronary artery disease, heart failure, pulmonary hypertension, etc., and then apply that model to data, such biophysical data of one or more humans, to detect and/or to gain an understanding of the presence, non-presence, severity of one or more diseases or conditions (such as described herein) that might otherwise not be detectable or understandable to the same degree. Conventionally, in the context of cardiovascular disease, these features are manually selected from conventional electrocardiographic signals and combined by data scientists working with domain experts.

Examples of embodiments of machine learning include, but are not limited to, decision trees, random forests, SVMs, neural networks, linear models, Gaussian processes, nearest neighbor, SVMs and Naïve Bayes, etc. Other examples of machine learning models and algorithms are provided in Table 1.

TABLE 1

| | |
|---|---|
| 1 | Gradient tree boosting (XGBClassifier) |
| 2 | K nearest neighbors classifier (KNeighborsClassifier |
| 3 | support vector classifier (SVC) |
| 4 | Random forest classifier |
| 5 | Logistic regression |
| 6 | Elastic net (ElasticNet) |

In some embodiments of the present disclosure, machine learning techniques may be implemented using any of the techniques described herein.

In some embodiments, a training data set is split into a training-validation set and a test set. The training-validation set is used to train and fine-tune candidate machine learning models using a multi-fold cross validation. The pipeline for data scaling, model training, grid search and model evaluation may be implemented, e.g., in Python using the Scikit-learn package, e.g., as described in F. Pedregosa et al. "Scikit-learn: Machine learning in python," Journal of machine learning research 12, 2825-2830 (October 2011), which is hereby incorporated by reference herein in its entirety. Further description of the Gradient tree boosting classifier is described in T. Chen et al., "Xgboost: A scalable tree boosting system," Proceedings of the 22nd acm-sigkdd international conference on knowledge discovery and data mining, ACM, pp. 785-794 (2016), which is hereby incorporated by reference herein in its entirety. Further description of the Elastic Net classifier is described in H. Zou et al. "Regularization and variable selection via the elastic net," Journal of the royal statistical society: series B (statistical methodology) 67 (2) 301-320 (2005), which is hereby incorporated by reference herein in its entirety.

To find an optimal set of hyperparameters for each model, the study performed a grid search over a pre-defined range of hyperparameters. Using average AUC as the performance metric, the best hyper-parameters set is selected for each model. The selected models are then trained on the entire training-validation set and their AUC performance on the holdout test sets is ranked.

In some embodiments, system 100 includes a healthcare provider portal to display, e.g., in a report, score or other vehicle various outputs of the analytic engine 114 in predicting and/or estimating presence, non-presence, severity, and/or localization (where applicable), etc., of a disease or abnormal condition, or an indicator of one. This physician or clinician portal, in some embodiments, is configured to access and retrieve data and reports from a repository (e.g., a storage area network). The physician or clinician portal and/or repository can be compliant with various privacy laws and regulations such as the U.S. Health Insurance Portability and Accountability Act of 1996 (HIPAA) for use in a clinical setting. Description of an example healthcare provider portal is provided in U.S. Pat. No. 10,292,596, entitled "Method and System for Visualization of Heart Tissue at Risk", which is hereby incorporated by reference herein in its entirety. Although in certain embodiments, the portal is configured for presentation of patient medical information to healthcare professionals, in other embodiments, the healthcare provider portal can be made accessible to patients, other caregivers, family members, researchers, academics, and/or other portal users. This portal may be used for a wide variety of clinical and even research needs in a wide variety of settings—from hospitals to emergency rooms, laboratories, battlefield or remote settings, at point of care with a patient's primary care physician or other caregiver, and even the home.

Cycle Variability Assessment Example #1—CV Score

Figure 4A:
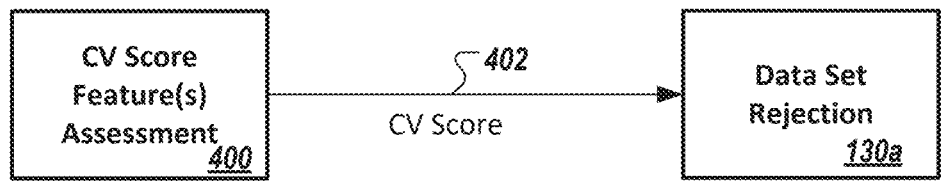
FIGS. 4A, 4B, 4C, and 4D each illustrates an example cycle-variability based signal rejection module configured to determine values of cycle-variability associated properties of one or more acquired biophysical signals to reject the one or more acquired biophysical signals in accordance with an illustrative embodiment.

As discussed above, the exemplified methods and systems facilitate the quantification of cardiac cycle-variability as a metric of signal quality of an acquired signal data set and the rejection, based on that quantification, of said acquired signal data set from one or more subsequent analyses. FIG. 4A illustrates an example cycle-variability based signal rejection module comprising a cycle-variability assessment module 400 configured to determine values of cycle-variability associated properties of one or more acquired biophysical signals. The cycle-variability assessment module 400 provides the determined values of the cycle-variability associated properties to a data set module that can reject the one or more acquired biophysical signals (e.g., for reacquisition or additional acquisition of the more acquired biophysical signals). In FIG. 4A, the cycle-variability based signal rejection module is configured to output a cycle-variability score 402 for a given signal and to provide that output 402 to the signal quality assessment operation in module 130 (shown as data set rejection operation 130a) to generate an alarm or additional/replacement acquisition indication, as discussed in relation to FIGS. 1A and 1B. The score may be a quantification of skeletal-muscle-related-signal contamination and muscle-artifact-noise contamination, and other asynchronous-noise contamination in an acquired signal. For a cardiac cycle, e.g., with 3 channels, a cycle-variability score may be generated for each of the three channels.

Figure 5A:
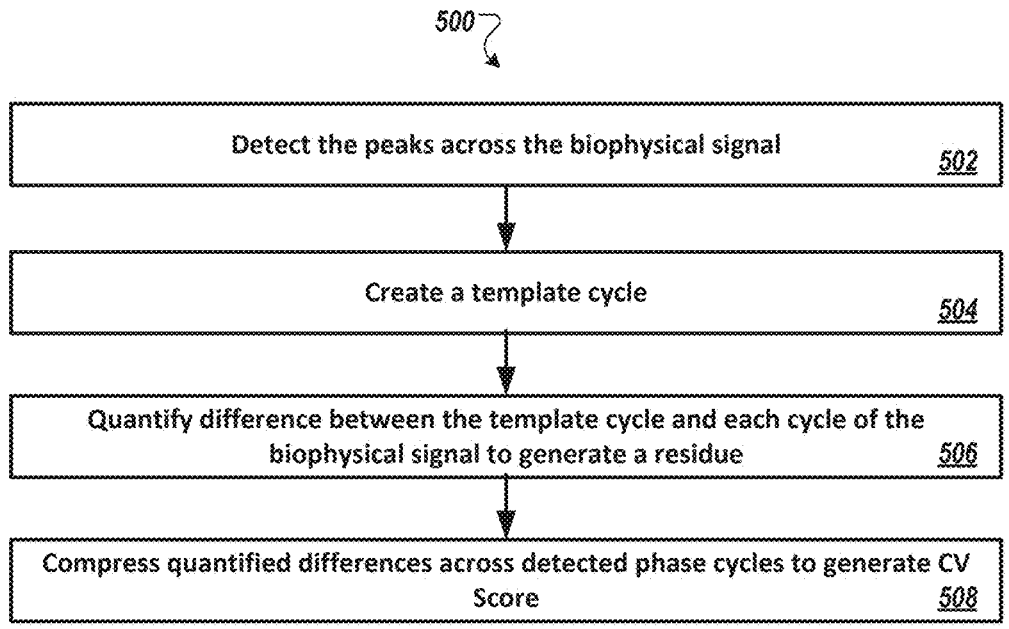
FIGS. 5A, 5B, and 5C are each a diagram of an exemplary method to generate a cycle-variability score of a biophysical signal in accordance with an illustrative embodiment.

FIG. 5A is a diagram of an exemplary method 500 to generate a cycle-variability score (e.g., "CV_score X" $CV_x$, "CV_score Y" $CV_y$, "CV_score Z" $CV_z$) of a biophysical signal in accordance with an illustrative embodiment.

The method 500 includes detecting peaks (502) in all, or a substantial portion (e.g., at least 50% or a number of cycles statistically determined to be representative of the signal), of the biophysical signal for a quasi-periodic cycle. For cardiac signals, the peaks may be points of ventricular depolarization (also commonly referred to as "R-peaks"), which are a point in the signal during each cycle when the electrical activation of the ventricles is maximal. In some embodiments, the method 500 employs a Pan-Tompkins algorithm for ventricular depolarization detection, for example, as described in Pan & Tompkins, A Real Time QRS Detection Algorithm, IEEE Transactions on Biomedical Engineering, Volume 32-3, 230-236, 1985, the entirety of which is hereby incorporated by reference herein. Other algorithms may be used to detect peaks in the cardiac signal data set—examples include those described in Makwana et al. "Hilbert transform based adaptive ECG R-peak detection technique," International Journal of Electrical and Computer Engineering, 2(5), 639 (2012); Lee et al., "Smart ECG Monitoring Patch with Built-in R-Peak Detection for Long-Term HRV Analysis," Annals of Biomedical Engineering. 44(7), 2292-3201 (2016); and Kim et al., "Detection of R-Peaks in ECG Signal by Adaptive Linear Neuron (ADALINE)," Artificial Neural Network, presented at MATEC Web of Conferences, 54, 10001 (2016), each of which is hereby incorporated by reference herein in its entirety. Various PPG peak detectors may be used for photoplethysmographic signals.

The method 500 then includes determining or creating (504) a template-signal vector data set (also referred to as a template cycle). The template-signal vector data set represents a quasi-periodic signal pattern of the subject (e.g., a heart-beat pattern for cardiac signals). The term "quasi-periodic" can also be referred to in more general terms as a characteristic of a signal system that cycles with, at a minimum, two frequency components, of which their ratio is not a rational number.

In some embodiments, to determine the template-signal vector data set, a median peak-peak interval (e.g., R-R intervals for cardiac signals) is calculated using the detected peak locations. The cycle region is set around each peak and normalized for the amplitude. The cycle region includes regions of interest, for example, the P and completion of the T wave for cardiac signals.

Figure 6A:
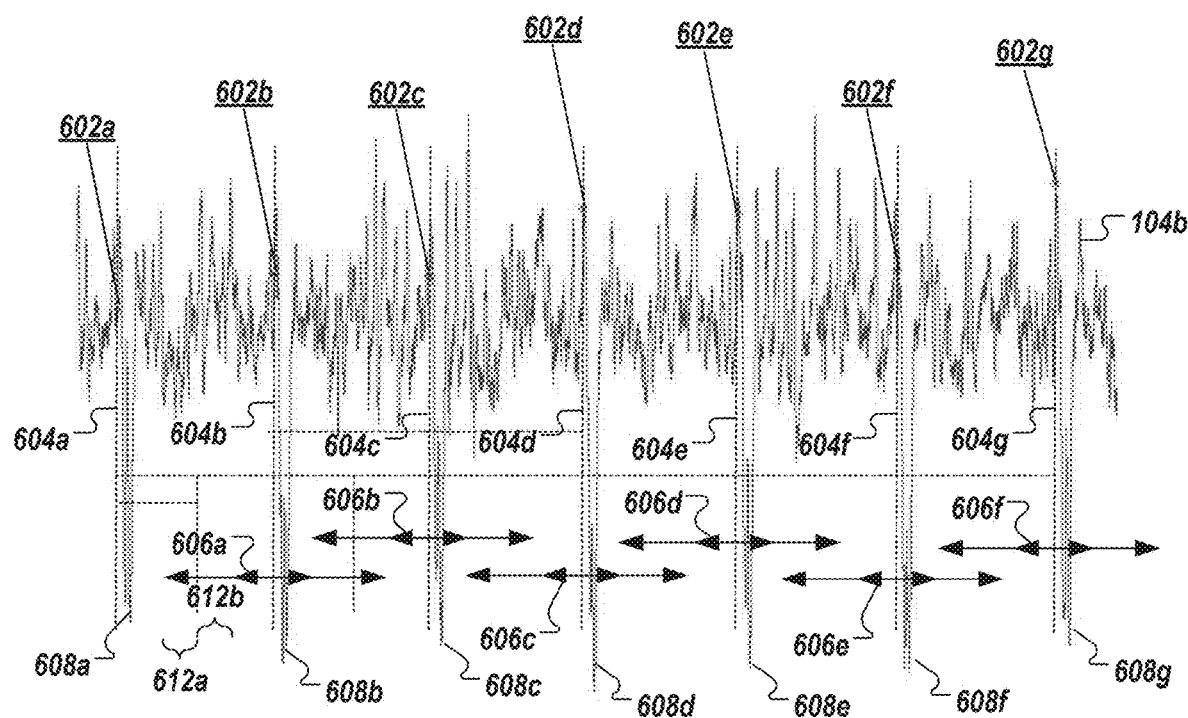
FIGS. 6A and 6B each shows aspects of, e.g., the method of FIGS. 5A, 5B, and 5C in accordance with an illustrative embodiment.

In FIG. 6A, the detected peak locations of cardiac signal 104b (e.g., shown as 602a-602g) are used to determine a median peak-to-peak interval (e.g., median R-R peaks for portions of the cardiac signal 104b as shown with 604a-604g) and to set a cycle region (e.g., shown as 606a-606f) around each peak (e.g., R-peaks for portions of cardiac signal 104b as shown with 608a-608g). FIG. 6A further shows that the cycle region is set around the R-peak and includes both the P wave and completion of the T wave for cardiac signal 104b. In FIG. 6A, the ranges are from -20% to +20% of the median interval (e.g., shown as 612a, 612b). Each of the cycle regions (e.g., 606a-606f) can be stored by a processor in a matrix (also referred to a "cycle matrix"). The cycle matrix may be M×N in which M is the number of detected cycles, and N is 40% of the median peak-to-peak interval (e.g., median R-R intervals for cardiac signals) in which the 40% (or other range) of the peak-to-peak interval represents the full temporal "width" of the cycle. Specifically, once the median peak-to-peak interval (e.g., median R-R interval for cardiac signals) is known across the dataset, the signal can be divided in half, e.g., to get the "20%" that reaches both forward and backward in time from the peak (e.g., R-peak) to capture the other waves (e.g., T wave and P wave for a cardiac signal). Of course, other cycle region lengths can be used for cardiac signals and for the various distinct waves in brain signals, etc. For example, ranges that may be applied include, but are not limited to, from −10% to 10%, −15% to 15%, −25% to 25%. In addition, rather than a median of the peak-to-peak interval, the mean of the peak-to-peak interval may also be used.

Figure 6B:
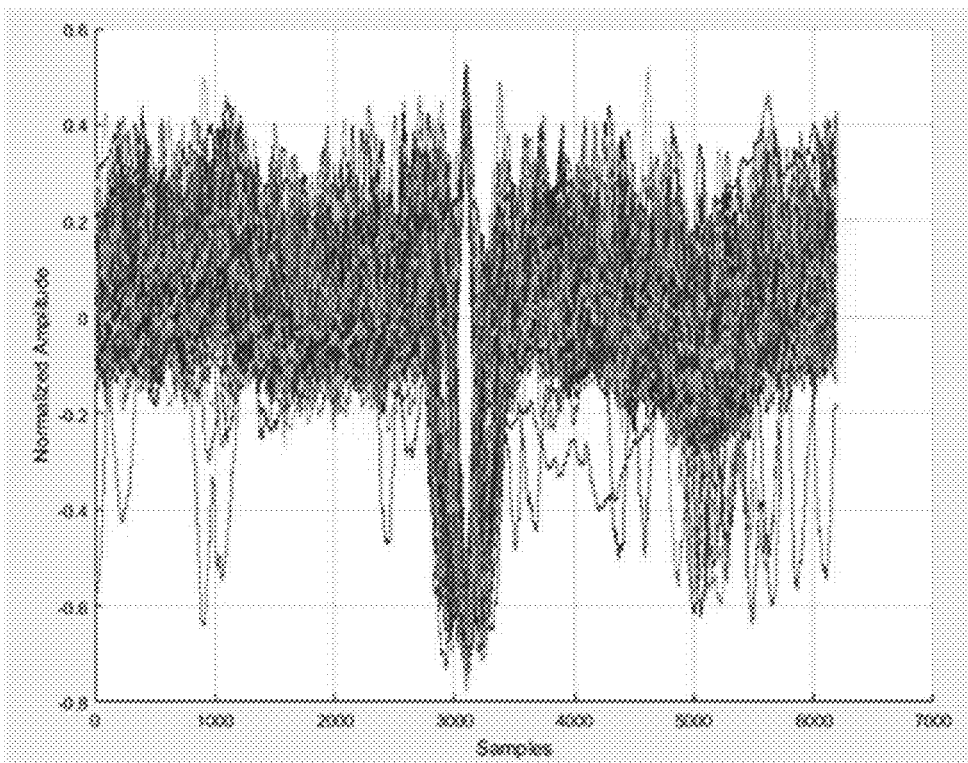

FIG. 6B shows a plot of results of the normalization process in accordance with an illustrative embodiment. In FIG. 6B, each cycle region (e.g., 606a-606f) of the biophysical-signal data set (e.g., cardiac signal data set 110b) is normalized by a processor to remove any offsets such that the average value of each cycle region is zero. The normalized cardiac signal data set, as shown, can have a range of "1" and "−1", though that range can vary depending on the distribution of the data.

FIG. 6C shows a plot of a determined template-signal vector data set 610 (shown as 610a, 610b, and 610c) in reference to one of the cycles 612 (shown as 612a, 612b, and 612c). In FIG. 6C, the template-signal vector data set is shown for each of a three cardiac signal data set. The same template-signal vector data set calculated for one representative cycle is used to assess against all of the cycles of that given signal. FIG. 6D shows the determined template-signal vector data set 610 of FIG. 6C in phase space. In FIG. 6D, each value of the template-signal vector data set corresponding to a same time instance is shown in three-dimensional space. The values for all the channels of the acquired biophysical signals are also concurrently displayed.

Referring back to FIG. 5A, method 500 then includes quantifying (506) the difference between each detected biophysical cycle and the template-signal vector data set. In some embodiments, the template-signal vector data set is subtracted from each of the detected biophysical cycle to generate a residue data set. FIG. 6E shows a plot of the residue 616 calculated between the detected biophysical cycle and the template-signal vector data set in phase space. Each axis in FIG. 6E represents a channel (channels X, Y, and Z) of the acquired signals.

Referring to FIG. 5A, method 500 then includes combining the resultant differences across the detected phase cycles to create the final cycle variability score (CVS) for the channel. The cycle variability score, in some embodiments, is a median of the calculated residue data set for each given signal (e.g., 1 score per channel). In other embodiments, the cycle variability score is a median of the calculated residue data set for all of the signals (e.g., 1 score per set of channels). In some embodiments, the cycle variability score is calculated from a subset of the acquired signals. In another embodiment, the cycle variability score is a mean of the calculated residue data set for a given signal. In yet another embodiment, the cycle variability score is a mean of the calculated residue data set for all of the signals, or a representative subset of such signals.

In some embodiments, the cycle variability score is a Z-score value for a given data point in the template signal vector data set and is calculated as a difference between the value of the given data point and a mean of a set of cycles in which the difference is then normalized by the standard deviation of that given data point to the same indexed data value of the set of cycles.

Figure 5B:
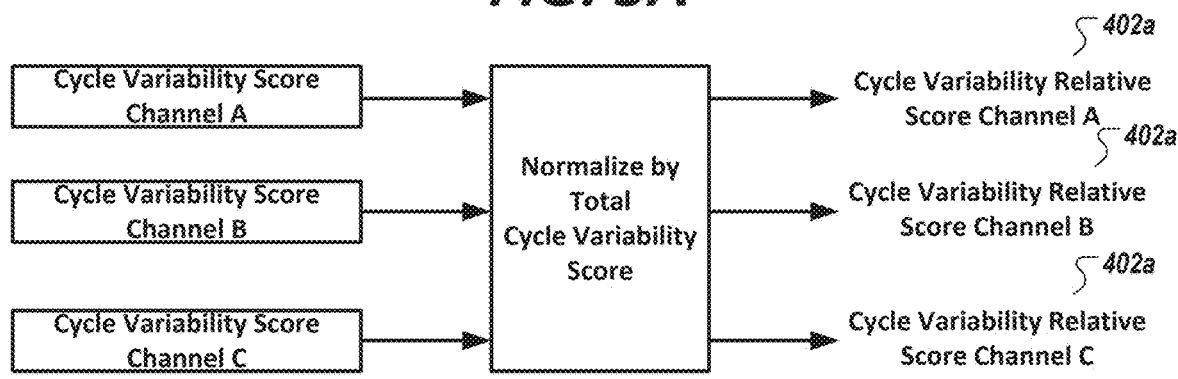

FIG. 5B shows a diagram to generate cycle-variability relative scores (shown as 402a) that can normalize each cycle-variability score for a given channel to all the calculated score (e.g., for all three channels). In FIG. 5B, the cycle-variability relative scores 402a are shown for three channels. The cycle-variability relative score 402a for a channel n is calculated the score for channel n, $CV_n$, over the sum of all the calculated score, as shown in Equation 1:

$$\frac{CV_n}{\sum_{1}^{n} CV_n} \quad \text{(Equation 1)}$$

The cycle-variability based rejection module may also generate a cycle-variability ratio score (shown as 402b) that can determine a ratio between the cycle-variability score for a given channel to the cycle-variability score for other channel.

Figure 5C:
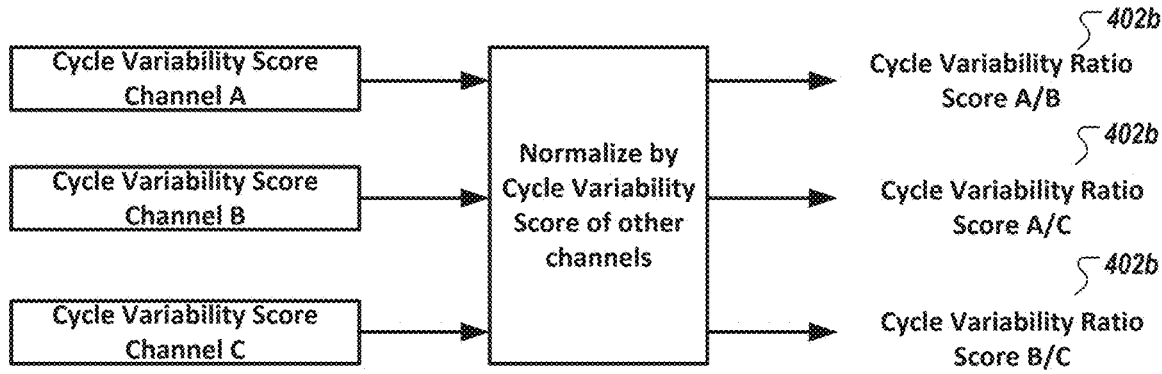

FIG. 5C shows a diagram to generate cycle-variability ratio scores 402b that normalize each cycle-variability score as a ratio between two channels. In FIG. 5C, the cycle-variability relative scores 402b is shown for three channels.

Table 2 shows examples of cycle-variability scores 402. The scores 402 may be raw scores (e.g., mean of residue or median or residue values as discussed herein), relative scores in which the raw scores are normalized by the total residue values, or ratios of raw scores between two channels or signals. In Table 2, the cycle-variability relative score 402b are shown as "CV_relative_X", "CV_relative_Y", and "CV_relative_Z" and the cycle-variability ratio scores 402c are shown as "CV_ratio_XY", "CV_ratio_XZ", and "CV_ratio_YZ."

TABLE 2

| | Feature name | Description |
|---|---|---|
| 1 | CV_score X | Cycle variability score of channel X of cardiac signals ($CV_x$) |
| 2 | CV_score Y | Cycle variability score of channel Y of cardiac signals ($CV_y$) |
| 3 | CV_score Z | Cycle variability score of channel Z of cardiac signals ($CV_z$) |
| 4 | CV_relative_X | $\dfrac{CV_x}{CV_x + CV_y + CV_z}$ |
| 5 | CV_relative_Y | $\dfrac{CV_y}{CV_x + CV_y + CV_z}$ |
| 6 | CV_relative_Z | $\dfrac{CV_z}{CV_x + CV_y + CV_z}$ |
| 7 | CV_ratio_XY | $\dfrac{CV_x}{CV_y}$ |
| 8 | CV_ratio_XZ | $\dfrac{CV_x}{CV_z}$ |
| 9 | CV_ratio_YZ | $\dfrac{CV_y}{CV_z}$ |

Cycle Variability Assessment Example #2—CV Statistical Distribution

Figure 4B:
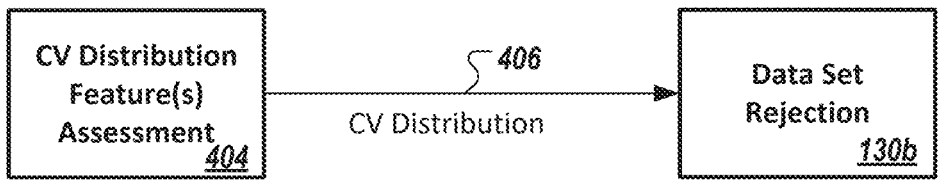

FIG. 4B illustrates an example cycle-variability based signal rejection module 404 configured to determine statistical assessment of distribution of cycle-variability for the acquired biophysical signals to reject the one or more acquired biophysical signals (e.g., for reacquisition or additional acquisition of the more acquired biophysical signals) in accordance with an illustrative embodiment. In FIG. 4B, the cycle-variability based signal rejection module is configured to output a cycle-variability distribution score 406 for a given signal and to provide that output 406 to the signal quality assessment module 130 (shown as 130b) to generate an alarm or additional/replacement acquisition indication, as discussed in relation to FIGS. 1A and 1B. The cycle-variability distribution score 406 may be a quantification of skeletal-muscle-related-signal contamination and muscle-artifact-noise contamination, and other asynchronous-noise contamination in an acquired signal. In FIG. 4B, the statistical assessment includes one or more of a mean, a median, a standard deviation, a skewness, and a kurtosis of an assessed distribution. Although the CV score may be generated as a median or mean of the calculated residue across the cycles for a given signal/channel, the distribution score (a mean, median, or other statistical assessment discussed herein) is based on an assessed histogram/distribution of the calculated residue.

Table 3 shows an example set of cycle-variability features and their corresponding description.

TABLE 3

| 10 | CV_X_mean | Mean of X CV |
| 11 | CV_X median | Median of X CV |
| 12 | CV_X_std | Std of X CV |
| 13 | CV_X_Skew | Skewness of X CV |
| 14 | CV_X Kurt | Kurtosis of X CV |
| 15 | CV_Y_mean | Mean of Y CV |
| 16 | CV_Y_median | Median of Y CV |
| 17 | CV_Y_std | Std of Y CV |
| 18 | CV_Y Skew | Skewness of Y CV |
| 19 | CV_Y Kurt | Kurtosis of Y CV |
| 20 | CV_Z mean | Mean of Z CV |
| 21 | CV_Z_median | Median of Z CV |
| 22 | CV_Z_std | Std of Z CV |
| 23 | CV_Z Skew | Skewness of Z CV |
| 24 | CV_Z_Kurt | Kurtosis of Z CV |

Figure 7A:
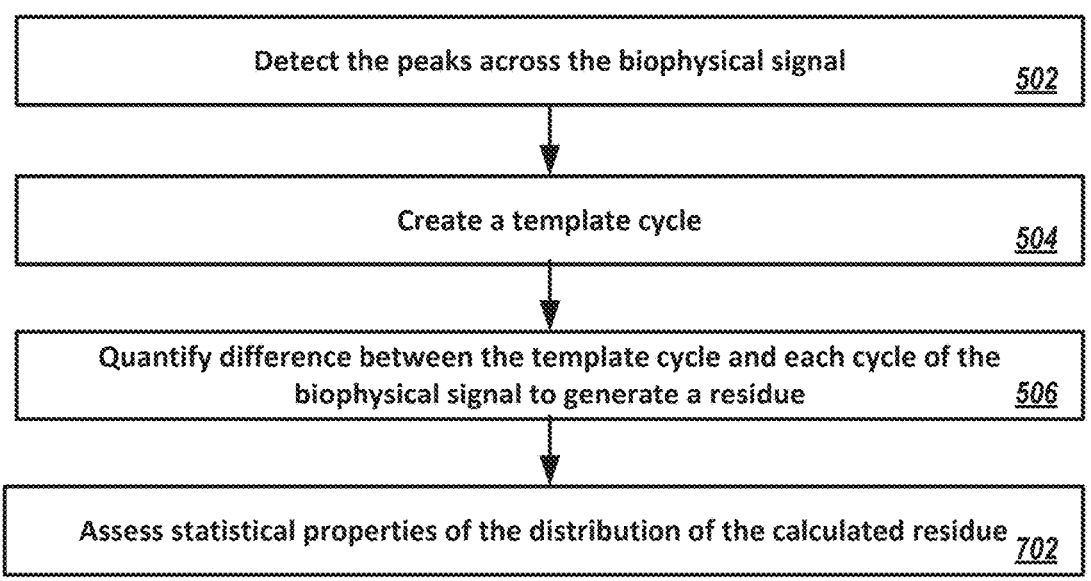
FIG. 7A is a diagram of an exemplary method to generate a distribution of cycle-variability residue of a biophysical signal in accordance with an illustrative embodiment.

FIG. 7A is a diagram of an exemplary method 700 to generate a distribution of cycle-variability residue of a biophysical signal in accordance with an illustrative embodiment. In FIG. 7A, method 700 may include performing the peak detection step (502), the template cycle creation step (504), and the residue distribution calculation step (506) as described in relation to FIG. 5. Method 700 further includes performing a statistical assessment (702) of the calculated distribution. The statistical assessment may include a mean, median, standard deviation, skewness, and kurtosis of the distribution.

In Table 3, the output of the cycle-variability based rejection module 404 includes "CV_X_mean", "CV_X_median", "CV_X_std", "CV_X_Skew", "CV_X_Kurt", "CV_Y_mean", "CV_Y_median", "CV_Y_std", "CV_Y_Skew", "CV_Y_Kurt", "CV_Z_mean", "CV_Z_median", "CV_Z_std", "CV_Z_Skew", and "CV_Z_Kurt."

Cycle Variability Assessment Example #3—CV Model Parameters

Figure 4C:
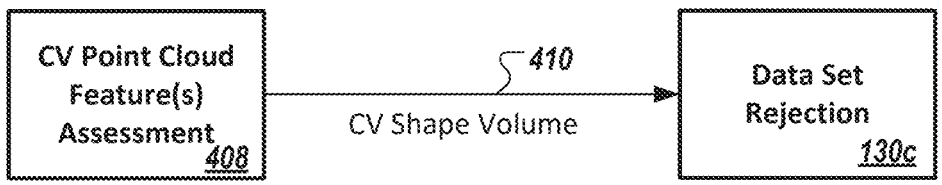

FIG. 4C illustrates an example cycle-variability based rejection module 408 configured to determine values of cycle-variability associated properties of one or more acquired biophysical signals in accordance with an illustrative embodiment. In FIG. 4C, the cycle-variability based rejection module 408 is configured to generate a two- or three-dimensional phase space model (e.g., an alpha shape model) of the calculated CV residue and determining geometric-based parameters of that two- or three-dimensional phase space model (e.g., an alpha shape model). The cycle-variability based rejection module 408 generates the cycle-variability score 410 based on geometric-based parameters or using the geometric-based parameters and provide that output 410 to the signal quality assessment module 130 (shown as 130c) to generate an alarm or additional/replacement acquisition indication, as discussed in relation to FIGS. 1A and 1B. The score may be a quantification of skeletal-muscle-related-signal contamination and muscle-artifact-noise contamination, and other asynchronous-noise contamination in an acquired signal.

For a cardiac cycle, e.g., with 3 channels, the three-dimensional phase space model can be generated with each channel serving as an axis of the model. The geometric parameters that may be assessed from the three-dimensional phase space model includes volume, porosity, void volume, and surface area. The two-dimensional phase space model can be generated from two channels to provide perimeter parameter of an enclosing alpha shape.

Table 4 shows an example set of cycle-variability features determined from a three-dimensional phase space model and their corresponding description.

TABLE 4

| 25 | CV_Volume | Alpha Shape volume |
| 26 | CV_VoidVolume | CV Convex Hull Volume − CV Alpha Shape Volume |
| 27 | CV_Porosity | $\frac{CV \text{ Void Volume}}{CV \text{ Convex Volume}}$ |
| 28 | CV_Surface Area | Alpha Shape surface area |
| 29 | CV_PerimeterXY | Perimeter of Alpha Shape of XY data |
| 30 | CV_PerimeterXZ | Perimeter of Alpha Shape of XZ data |
| 31 | CV_PerimeterYZ | Perimeter of Alpha Shape of YZ data |

Figure 7B:
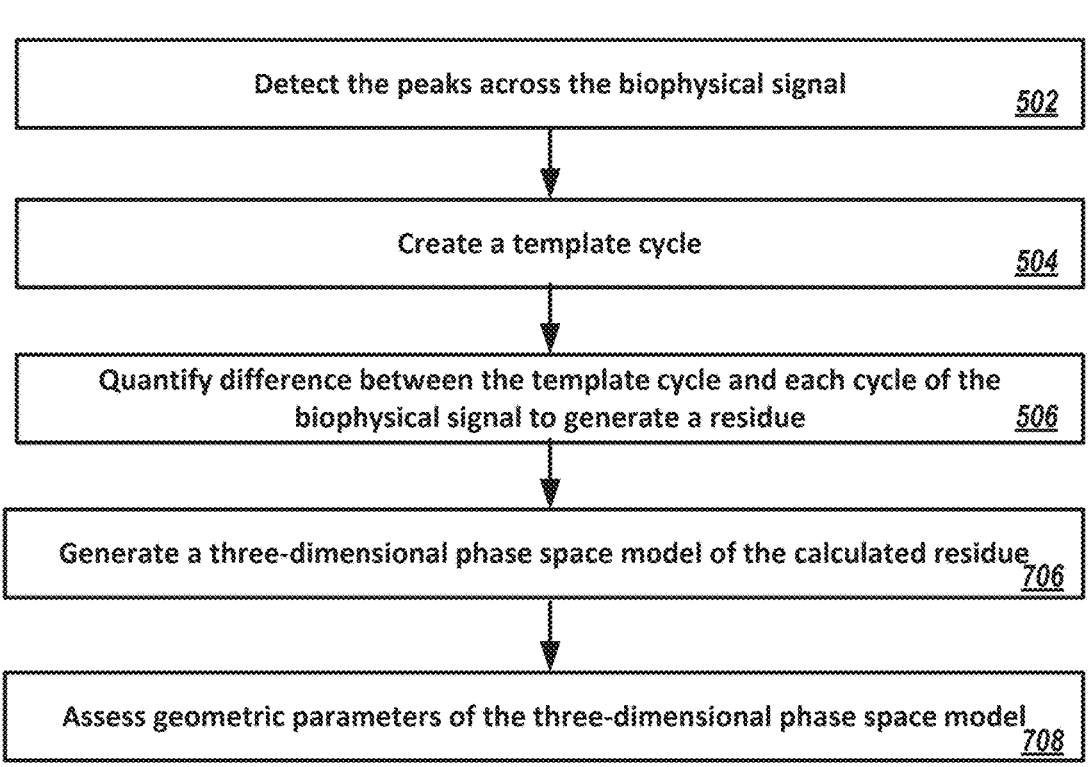
FIG. 7B is a diagram of an exemplary method to generate a three-dimensional phase space model from cycle-variability residue of a biophysical signal in accordance with an illustrative embodiment.

FIG. 7B is a diagram of an exemplary method 704 to generate a three-dimensional phase space model from cycle-variability residue of a biophysical signal in accordance with an illustrative embodiment. In FIG. 7B, the method 704 may include performing the peak detection step (502), the template cycle creation step (504), and the residue distribution calculation step (506) as described in relation to FIG. 5.

The method 704 further includes generating (706) a three-dimensional phase space model from the calculated residues determined from the three channels of the acquired data set. The residues may be used generate a point-cloud map to which a triangulation operation may be applied. Examples of triangulation operation include alpha hull as well as convex hull. Other types of triangulation operation may be applied.

Figure 7C:
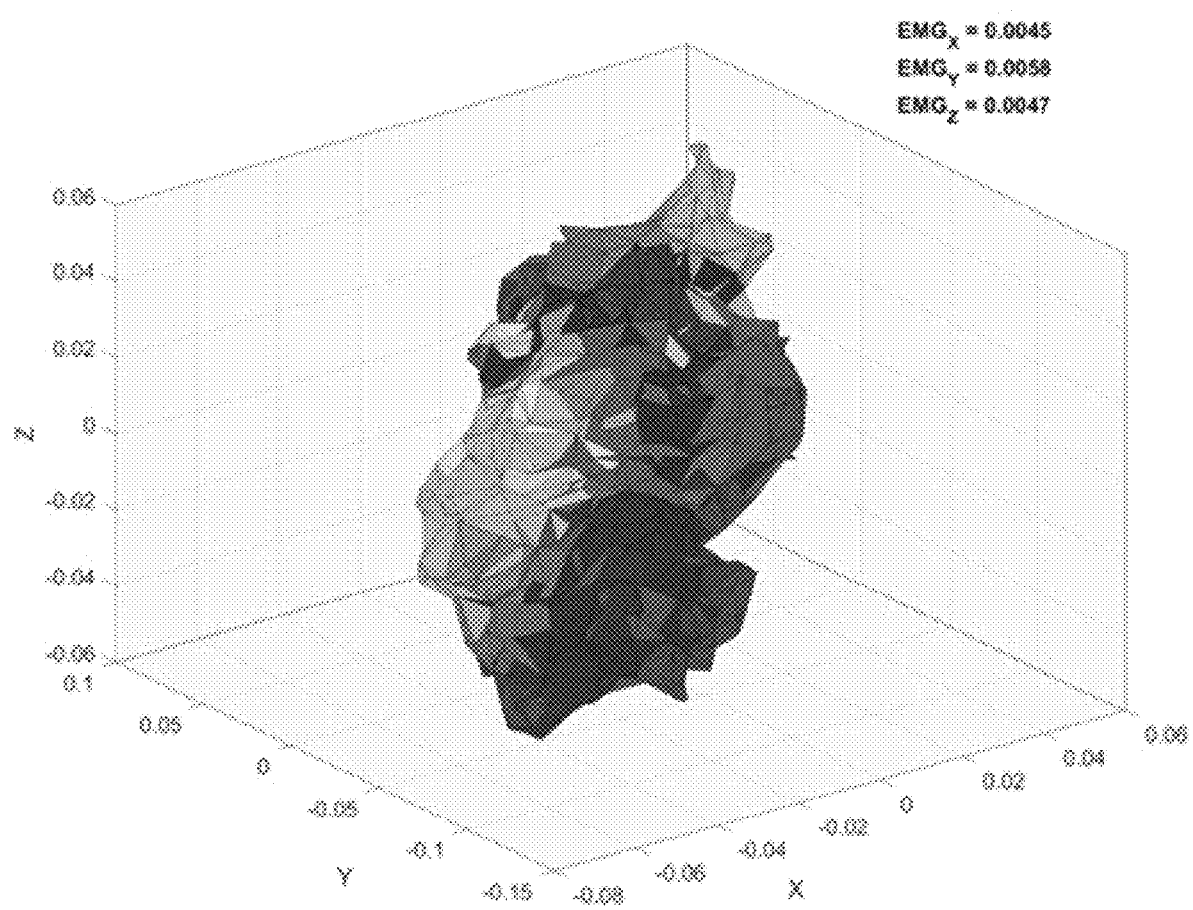
FIG. 7C shows an example three-dimensional phase space model generated from the point-cloud map of FIG. 6E in accordance with an illustrative embodiment.

As described above, FIG. 6E shows an example point-cloud map generated from the residue data set of a three-channel cardiac signal. FIG. 7C shows an example three-dimensional phase space model 710 generated from the point-cloud map of FIG. 6E in accordance with an illustrative embodiment. The three-dimensional phase space model 710 may be colorized in some embodiments to assess a fourth dimensional data set.

In FIGS. 6D and 6E, there appears to be a structure in viewing the CV residues in phase space. Further, this structure is related to the temporal location within the cardiac cycle, as can be seen in FIG. 7C that adds coloring.

In Table 4, the output of the cycle-variability based rejection module 600 includes "CV_Volume", "CV_VoidVolume", "CV_Porosity", "CV_SurfaceArea", "CV_PerimeterXY", "CV_PerimeterXZ", and "CV_PerimeterYZ."

Figure 4D:
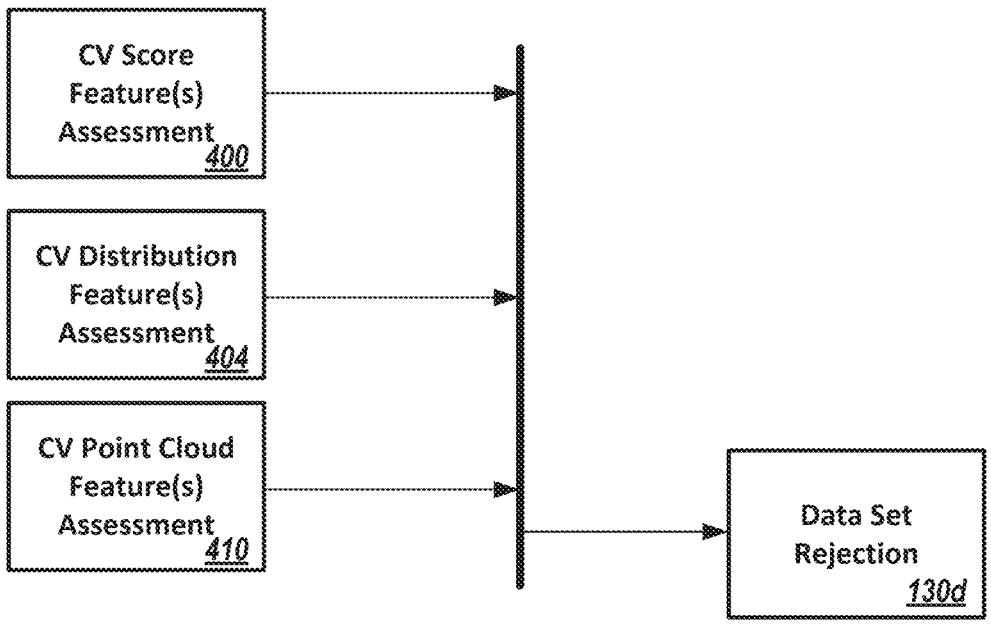

FIG. 4D shows another example of two or more cycle-variability scores (e.g., 400, 404, 410) being used for signal rejection. The two or more cycle-variability scores may be individually evaluated by a signal quality assessment module 130 (shown as 130*d*) to generate an alarm or additional/replacement acquisition indication, as discussed in relation to FIGS. 1A and 1B.

Example of quantification of asynchronous noise is described in U.S. Publication No. 2019/0384757, entitled "Methods and Systems to Quantify and Remove Asynchronous Noise in Biophysical Signals," which can be used to select or determine one or more cycle-variability features for rejection of a biophysical signal data, as described in relation to FIGS. 4A, 4B, 4C, and 5D.

Synchronicity Evaluation Between Cardiac Signal and Raw Photoplethysmographic Signals Referring to FIG. 1A and FIG. 1B, the dynamical feature extraction module 118, in some embodiments, is configured to evaluate one or more nonlinear dynamical properties of synchronicity between one or more of acquired photoplethysmographic signal(s) 104*a* and one or more of the acquired cardiac signal 104*b*. Several examples of synchronicity are disclosed.

Figure 8A:
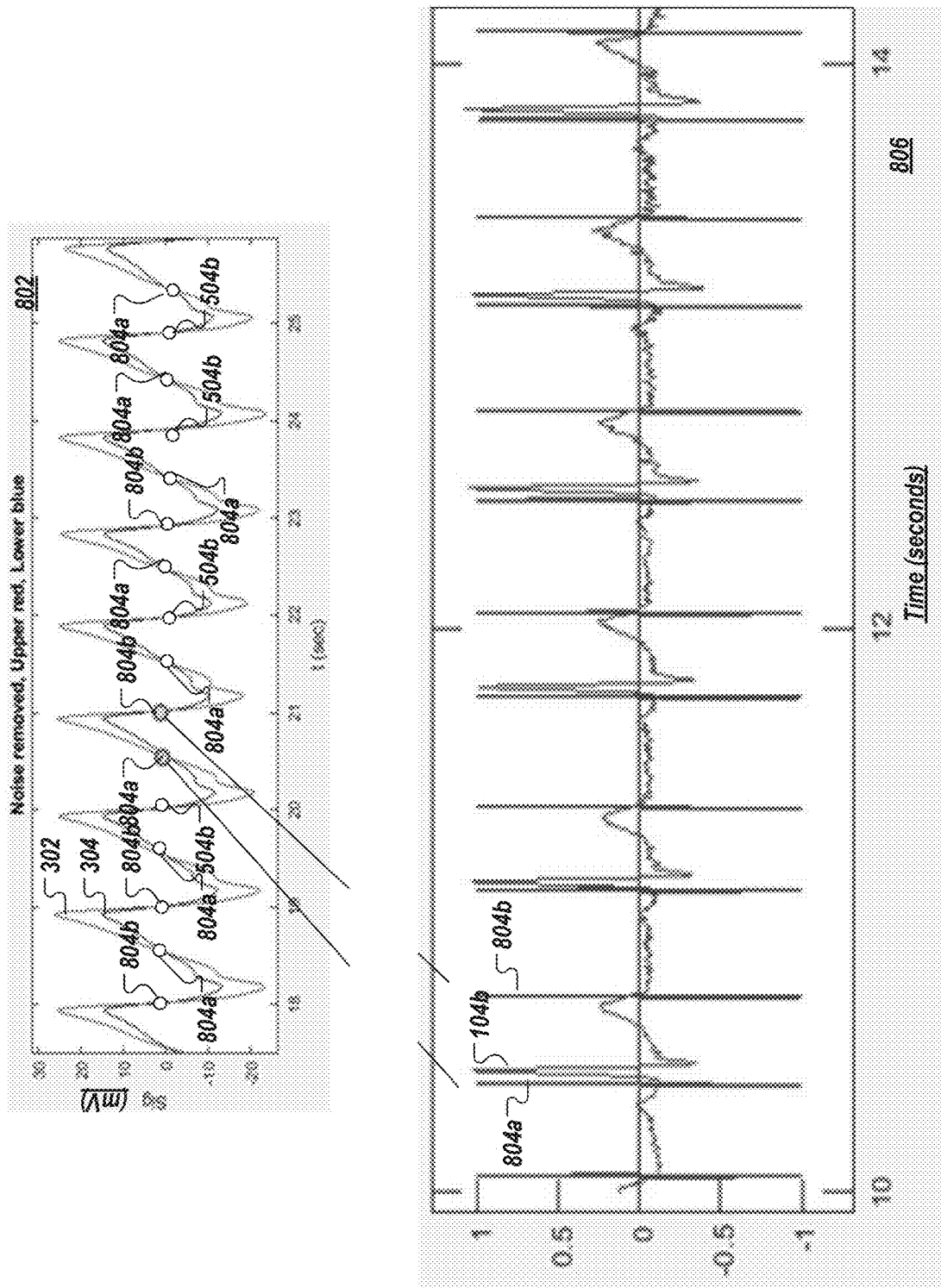
FIGS. 8A, 8B, 8C, 8D, 8E, and 8F illustrate example dynamical properties of synchronicity between acquired photoplethysmographic and cardiac signals, and analysis of such properties, in accordance with an illustrative embodiment.
Figure 8B:
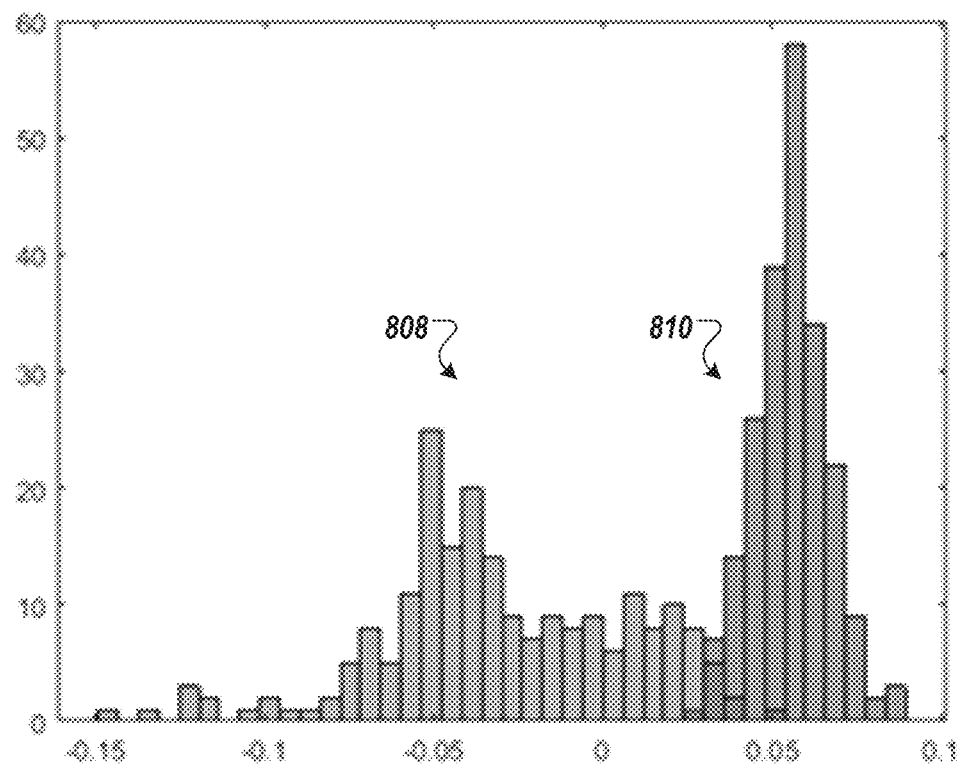
Figure 8C:
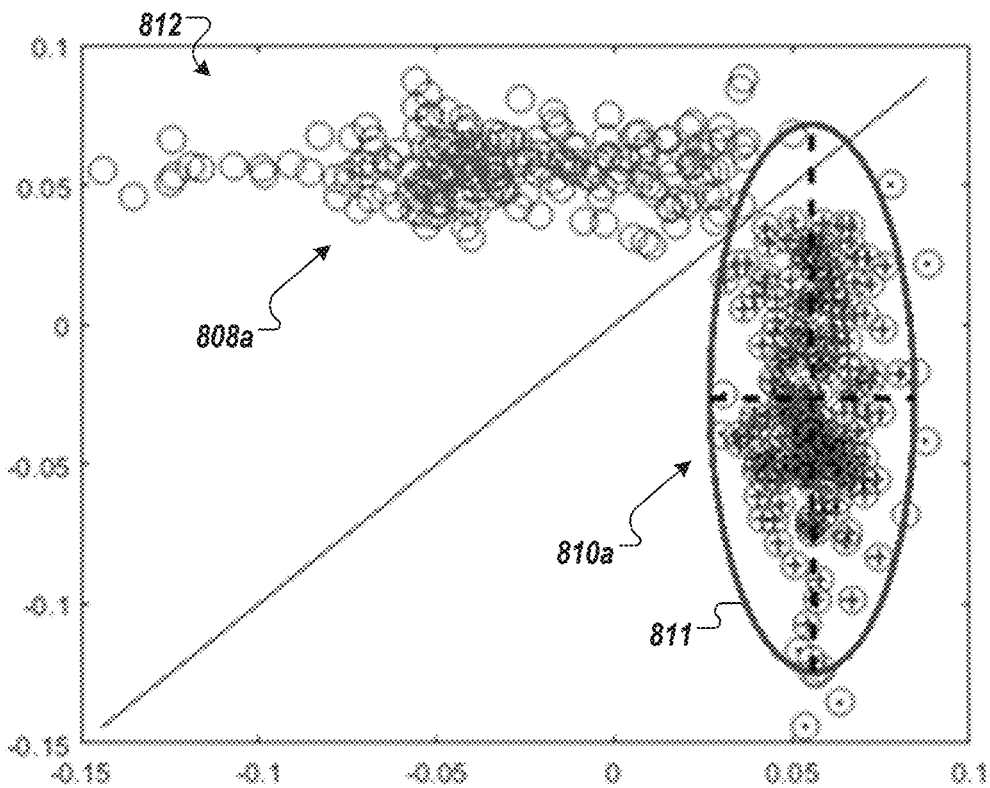

FIGS. 8A, 8B, and 8C illustrate example dynamical synchronicity properties between acquired photoplethysmographic signal and cardiac signals in accordance with an illustrative embodiment. Specifically, in FIGS. 8A, 8B, and 8C, synchronicity is determined, via histogram/Poincaré map analysis, using landmarks defined by the photoplethysmographic signals.

Specifically, FIG. 8A shows, in a first plot 802, cross-over landmarks 804*a* and 804*b* defined between a red photoplethysmographic signal 302 and an infrared photoplethysmographic signal 304. A second plot 806 shows the cross-over landmarks 804*a* and 804*b* in relation to one of the channels of the acquired cardiac signal 104*b*. In FIG. 8A, the x-axis shows time (in seconds) and the y-axis shows the signal amplitude in millivolts (mv).

FIG. 8B shows a histogram of the distribution of values of the cardiac signal 104*b* at the cross-over landmarks 804*a* and 804*b*. Specifically, FIG. 8B shows distributions 808, 810 corresponding to amplitude values of the cardiac signal at the respective first and second sets of crossover landmarks (804*a*, 804*b*). In FIG. 8B, the x-axis of the histogram shows signal amplitude (in mV) and the y-axis shows the frequency/count.

In some embodiments, dynamical feature extraction module 118 is configured to generate a histogram (e.g., as generated per FIG. 8B) and extract statistical and geometric properties from the generated histogram. In some embodiments, the extracted histogram features include, for example, but not limited to, modes, standard derivation, skewness, kurtosis, and mutual information. Mode refers to the set of data values that appear most often in a date set. Skewness refers to a measure of the asymmetry of the probability distribution of the data set about its mean. Kurtosis refers to the sharpness of the peak of a distribution curve. In some embodiments, mutual information is determined by first calculating a probability normalization of the histogram of each time series and then constructing and normalization a 2-dimensional histogram of the two-time series. From the resulting calculations, mutual information may be calculated according to:

$$I(X, Y) = \sum_{y \in Y}\sum_{x \in X} p(x, y) \log\left(\frac{p(x, y)}{p(x)p(y)}\right)$$

FIG. 8C shows a Poincaré map 812 of values of the cardiac signal 104*b* at the crossover landmarks 804*a* and 804*b*. That is, the Poincaré map records the value of the cardiac signal 104*b*, or at least one of the channels, based on triggers defined by the crossover landmarks 804*a*, 804*b*. In FIG. 8C, the x-axis and y-axis each shows the difference in amplitude values for the cardiac signal from cycles to cycles.

In some embodiments, to generate the Poincaré map 812, the system plots/generates a 2D pairs of points [$x_i$, $x_{i+1}$] (e.g., ($x_1$, $x_2$), ($x_2$, $x_3$), etc.) against the points [$x_i$, $x_{i-1}$] (e.g., ($x_0$, $x_1$), ($x_1$, $x_2$), etc.) of the amplitude values of a cardiac signal at the cross-over landmark points formed between photoplethysmographic signals.

Figure 8D:
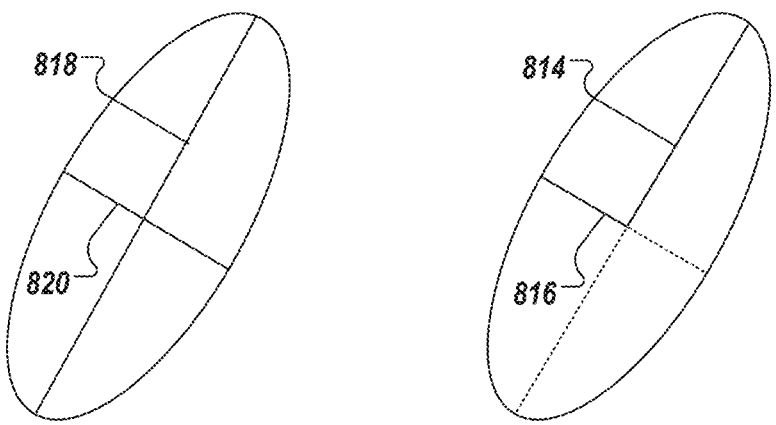

In some embodiments, dynamical feature extraction module 118 is configured to generate Poincaré map 812. Following generation of Poincaré map 812, dynamical feature extraction module 118, in some embodiments, is configured to generate a geometric object from the map data. In FIG. 8C, in some embodiments, dynamical feature extraction module 118 determines an ellipse 811 based on an ellipse fit operation of the data associated with a cluster (e.g., 808*a*, 810*a*). Based on the fitted ellipse, dynamical feature extraction module 118, in some embodiments, is configured to determine geometric parameters such as, but not limited to, length of semi axis "a" (814), semi axis "b" (816), length along a long axis (818), and length along a short axis (820) as shown in FIG. 8D.

The dynamical feature extraction module 118, in some embodiments, may extract other parameters such as void area, surface area, porosity, perimeter length, and density, among others.

Figure 8E:
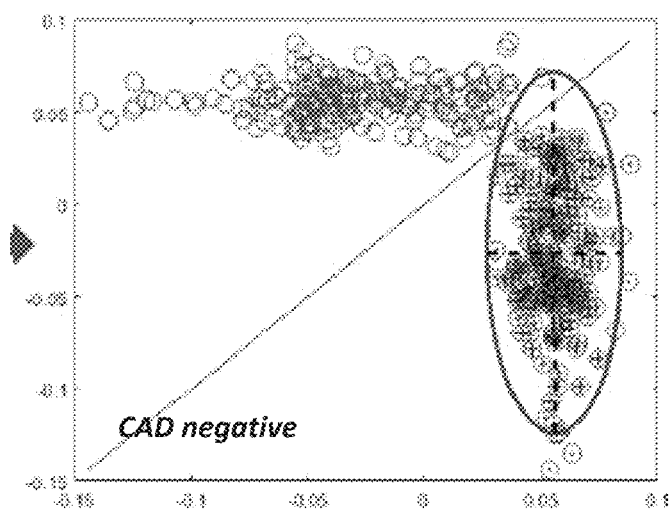
Figure 8F:
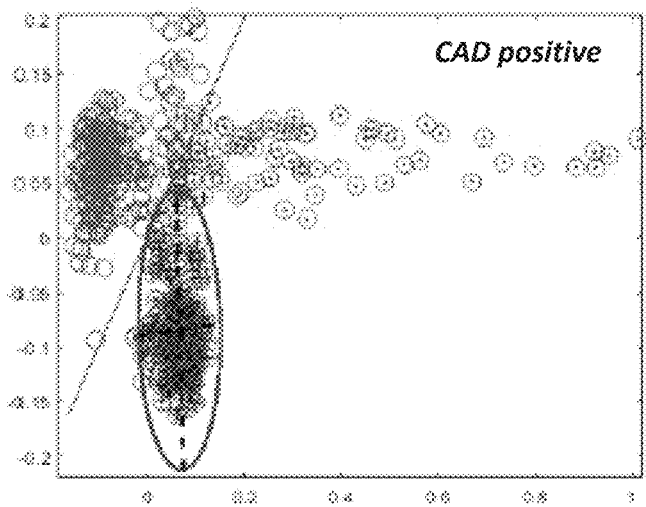

Indeed, synchronicity between acquired photoplethysmographic signals (e.g., where acquired raw signals are merely processed to remove baseline wander and high frequency noise) and a cardiac signal based on triggers defined in the photoplethysmographic signal may be used to assess for the presence, non-presence, severity, and/or localization, etc., (where applicable) of coronary artery disease (CAD), pulmonary hypertension, heart failure in various forms, among other diseases and conditions. In the CAD context, FIG. 8E shows an example Poincaré map of a data set acquired from a CAD-negative patient (i.e., a patient who does not have CAD). FIG. 8F shows an example Poincaré map of a data set acquired from a CAD-positive patient (i.e., a patient who has CAD in some form). It is readily apparent that the Poincaré maps of FIGS. 8E and 8F between a CAD-negative patient and a CAD-positive patient are different. FIGS. 8E and 8F shows an example Poincaré map generated from the amplitude values of a cardiac signal at landmarks defined by the photoplethysmographic signals. In the x- and y-axis, the Poincaré map shows the signal amplitude of the cardiac signal (e.g., as normalized with high-frequency and baseline wander removed) at time x and x−1 in the x-axis and time x and x+1 in the y-axis. That is, each assessed parameter (e.g., signal amplitude) at a given time/data point is shown in the Poincaré map with respect to the next time/data point (e.g., [$x_i$, $x_{i+1}$] versus [$x_i$, $x_{i-1}$]). The Poincaré map thus facilitates the analysis of variability of a given parameter (e.g., variability in the lowest peak landmarks) between cycles in the acquired data set. Similar analysis may be applied to any of the parameters and features discussed herein.

Table 5 provides a description of each of the assessed synchronicity extracted parameters of FIG. 8A to 8F.

TABLE 5

| Parameter name | Description |
| --- | --- |
| dXDmj | Major diameter of ellipse from Poincare map PM#1 for PSR/ECG "X" channel |
| dXDmn | Minor diameter of ellipse from Poincare map PM#1 for PSR/ECG "X" channel |
| dZDmn | Minor diameter of ellipse from Poincare map analysis PM#1 on PSR/ECG "Z" channel |
| dY Alpha | Tilt angle, alpha, of the ellipse from Poincare map analysis PM#1 on PSR/ECG "Y" channel |
| dZAlpha | Tilt angle, alpha, of ellipse from Poincare map analysis PM#1 on PSR/ECG "Z" channel |
| dXMean1 | Amplitude mean of PSR/ECG "X" channel at the first intersection/crossover points of photoplethysmographic signals |
| dXStd1 | Standard deviation of the distribution of PSR/ECG "X" channel triggered by the first cross-overs of photoplethysmographic signals |
| dXStd2 | Standard deviation of the distribution of PSR/ECG "X" channel triggered by second cross-overs of photoplethysmographic signals |
| dYStd2 | Standard deviation of distribution of PSR/ECG "Y" channel data triggered at second crossovers of photoplethysmographic signals |
| dYKurt2 | Kurtosis of distribution of PSR/ECG "Y" channel data triggered at second crossovers of photoplethysmographic signals |
| dZKurt2 | Kurtosis of distribution of PSR/ECG "Y" channel data triggered at second crossovers of photoplethysmographic signals |
| dYMode2 | Mode of distribution of PSR/ECG "Y" channel data triggered at second crossovers of photoplethysmographic signals |
| dZMode2 | Mode of distribution of PSR/ECG "Z" channel data triggered at second crossovers of photoplethysmographic signals |
| dZSkew1 | Kurtosis of distribution of PSR/ECG "Z" channel data triggered at first crossovers of photoplethysmographic signals |
| dZSkew2 | Kurtosis of distribution of PSR/ECG "Z" channel data triggered at second crossovers of photoplethysmographic signals |
| dYRelStdMAD2 | Relative difference between the standard deviation and median absolute deviation (MAD) of distribution of PSR/ECG "Y" channel data triggered at second crossovers of photoplethysmographic signals |
| dZRelStdMAD1 | Relative difference between the standard deviation and median absolute deviation (MAD) of distribution of PSR/ECG "Z" channel data triggered at first crossovers of photoplethysmographic signals |

Tables 6, 7, and 8 each shows experimental results of the features of Table 5 having potential clinical relevance in predicting and/or estimating presence, non-presence, severity, and/or localization (where applicable) of a disease state or abnormal condition or a metric that can be used for the assessment of such disease state or abnormal condition. In Tables 6, 7, and 8, a small p-value (typically ≤0.05) indicates strong evidence against the null hypothesis. A receiver operating characteristic (ROC) curve is used to test a spectrum of thresholds, and the area under the ROC curve (AUC) indicates the overall utility of the feature in separating these two groups. It is considered statistically significant when the bottom end of the 95% confidence interval is greater than 0.50. Mutual information quantifies the difference between the distributions, and is significant when greater than 1.

TABLE 6

| Feature Name | Disease State | t-test p-value | Mutual Information | ROC-AUC |
| --- | --- | --- | --- | --- |
| dDmjL | CAD | 0.035 | 1.104 | 0.502 |
|  | LVEDP | 0.031 | n/s | n/s |
| dDmjU | LVEDP | 0.007 | n/s | n/s |
| dDmnU | LVEDP | 0.038 | n/s | n/s |

TABLE 7

| FA_scenario | LVEDP <= 12 (N = 246) vs >=20 (N = 209) | |
| --- | --- | --- |
| Feature_name | t-test p-value | MI |
| dZDmn | 0.0407 | 1.2632 |
| dYMode2 | n/s | 1.0537 |

TABLE 8

| FA_scenario | LVEDP <= 12 (N = 246) vs >=25 (N = 78) | |
| --- | --- | --- |
| Feature_name | t-test p-value | MI |
| dZDmn | 0.0039 | 1.3256 |
| dYMode2 | n/s | 1.1214 |

In addition to the statistical evaluations reported in Tables 6, 7, 8, the features of Table 5 have also been evaluated and determined to be predictive in estimating the presence or non-presence of an elevated or abnormal LVEDP, as discussed in U.S. Provisional Patent Application No. 63/130,324, entitled "Method and System to Assess Disease Using Cycle Variability Analysis of Cardiac and Photoplethysmographic Signals, which is hereby incorporated by reference herein in its entirety. Table 8, in particular, illustrates the clinical utility of the synchronicity extracted parameters in non-invasively estimating that a subject has an elevated LVEDP of greater than 25 mmHg or a normal LVEDP of less than 12 mmHg during acquired cardiac signals.

Further examples and description of the synchronicity analysis may be found in U.S. patent application Ser. No. 16/831,380, entitled "Method and System to Assess Disease Using Dynamical Analysis of Cardiac and Photoplethysmographic Signals"; PCT Application No. PCT/IB2020/052890, entitled "Method and System to Assess Disease Using Dynamical Analysis of Cardiac and Photoplethysmographic Signals," each of which is hereby incorporated by reference herein in its entirety.

In addition, examples of other analysis used to estimate a metric associated with the presence, non-presence, severity, and/or localization (where applicable) of a disease or abnormal condition are described in U.S. patent application Ser. No. 16/831,264, entitled "Method and System to Assess Disease Using Dynamical Analysis of Biophysical Signals"; PCT Application No. PCT/IB2020/052889, entitled "Method and System to Assess Disease Using Dynamical Analysis of Biophysical Signals," each of which is hereby incorporated by reference herein in its entirety.

Signal Quality Assessment Module

In addition to cycle-variability based rejection, the signal quality assessment and rejection module (i.e., module 130) may also quantify noise of a biophysical signal data set (e.g., 110a, 110b) and reject such data sets based on the quantification. Such contamination May originate from a variety of sources and may affect the acquired signal in a variety of ways.

The exemplary system quantifies the noise in the signal to exclude unmanageable noise, so such noise does not affect the performance of subsequent analyses (and learning operation).

In some embodiments, the signal quality assessment operation of module 130 is configured to quantify biopotential signal noise metrics, including, but not limited to metrics associated with biopotential powerline interference and biopotential high-frequency noise. Biopotential powerline interference generally refers to noise introduced by a 60 Hz or 50 Hz powerline, frequencies used in many geographical regions, and their harmonics. The term "Biopotential High-Frequency Noise" generally refers to excessive signal frequency content greater than 170 Hz-which is a choice relevant to the phase signal recorder discussed throughout this document. The frequency content above 170 Hz, in such embodiments, is not necessarily periodic and can include pulses and other such artifacts.

In some embodiments, the signal quality assessment operation of module 130 is configured to quantify biopotential signal noise metrics, including metrics associated with PPG signal quality metrics, including, but not limited to, a score value associated with a frequency (e.g., in percentage) of PPG signal jumps and dropouts (also referred to herein as the "PPG Jump Percentage"), a score value associated with a frequency (e.g., in percentage) of PPG signal that is clipped or railing (also referred to herein as the "PPG Railing Percentage"), and a score value associated with a duration (e.g., in seconds) of the PPG signal that is clipped or railing (also referred to herein as the "PPG Railed Window").

Figure 38:
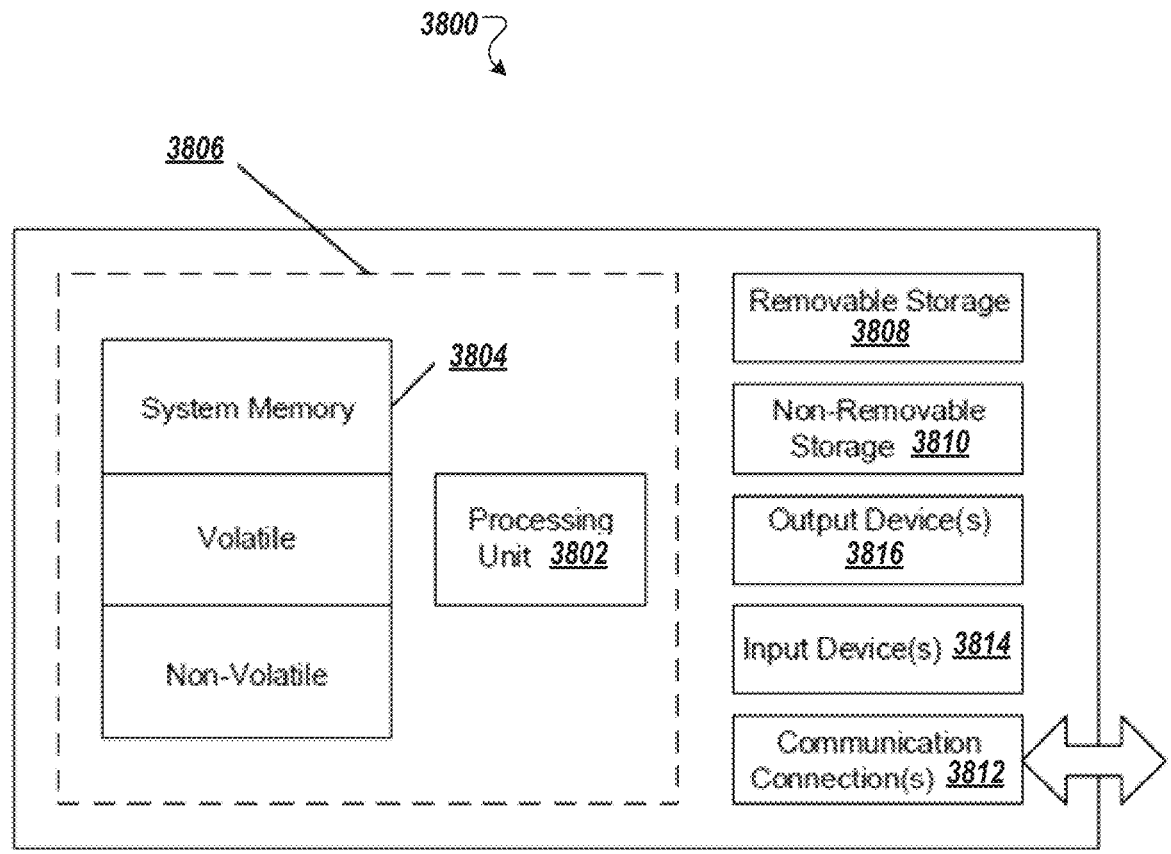
FIG. 38 shows an exemplary computing environment in which example embodiments of the analysis system and aspects thereof may be implemented, including the signal quality assessment operation.

The signal quality assessment operation of module 130, in some embodiments, is performed via a signal quality assessor system and a measurement system. The signal quality assessor system and the measurement system may be comprised within the same computing device or may be comprised, as with all the components of the systems described throughout this disclosure, in separate computing devices that are in communication with each other (such as directly connected or coupled to each other, or communicatively connected or coupled to each other via a wired, optical, or wireless network). The network may be or comprised of one or more of a variety of network types including the public switched telephone network (PSTN), a cellular/mobile telephone network, a local area network such as a wired or wireless ethernet network (LAN), a network that includes near field communication (NFC) or other radio-frequency-based technologies and standards (e.g., Bluetooth, Bluetooth Low Energy, etc.), a packet switched network (e.g., the internet), etc. Although only one measurement system is shown in FIG. 1, there is no limit to the number of measurement systems that may be supported. The signal quality assessor and the measurement system, as with all the components of the systems described throughout this disclosure, may each be implemented using one or more processors in connection with any variety of computing devices such as, for example, smartphones, smart watches or other wearable devices, desktop computers, server computers, mainframe computers, laptop computers, tablet computers, and set top boxes (including any combinations thereof). Other types of computing devices may be supported. A suitable computing device is illustrated in FIG. 38 as computing device 3800.

Measurement System may be any measurement system, such as measurement system 102, and signal quality assessor may be implemented separately or within measurement system 102.

The quality of any electrical signal, including that of a biophysical signal such as a PSR signal as described herein (e.g., a signal acquired at about 8 kHz) can be affected by noise, which can originate from a variety of sources. Such noise can affect the acquired signal quality in a variety of ways. For example, noise can negatively affect the performance of subsequent analyses, such as those described herein relative to a clinical indication or disease state of a subject or patient. The impact of negative performance of subsequent analyses can manifest in a variety of ways. When processing is performed remotely (e.g., in a cloud service), a real-time or near real-time rejection of the signal facilitate the reacquisition or re-measurement of the patient, reducing patient inconvenience and cost in the patient having to come back to, e.g., the physician's office, hospital, or other clinical setting in order to reacquire the signals. Further, if the subsequent analysis involves the generation of a data set/or image (e.g., phase space data set/images) for interpretation by a physician, then the image may not correctly represent the physiological state of the subject and therefore lead to a misinterpretation, potentially resulting in delayed or incorrect diagnosis and/or treatment. If the subsequent analysis involves the explicit quantitative assessment of a given disease state of a subject, then negative performance could involve an incorrect quantification of the disease state, which may result in delayed or incorrectly withheld treatment, or the unnecessary use of additional testing or interventions, which may introduce the possibility of harm to the patient. Furthermore, independent of the type of analysis, noise may extend the processing time and/or cost (in computational resources) to produce an output. Therefore, it may be useful to identify and quantify noise so that it may be, in whole or in part, (or even in some cases along with the signal(s) with which it is associated) excluded, minimized, or otherwise processed-thus eliminating or minimizing such negative effects. Examples of noise relevant to the present disclosure include, for example, powerline interference, high frequency noise, high frequency noise bursts, (abrupt) baseline movement, and cycle variability. For purposes of the present disclosure, any unwanted disturbance in the signals disclosed herein, regardless of its source, may be considered "noise".

Example Method to Calculate Biopotential Noise Scores

Figure 10:
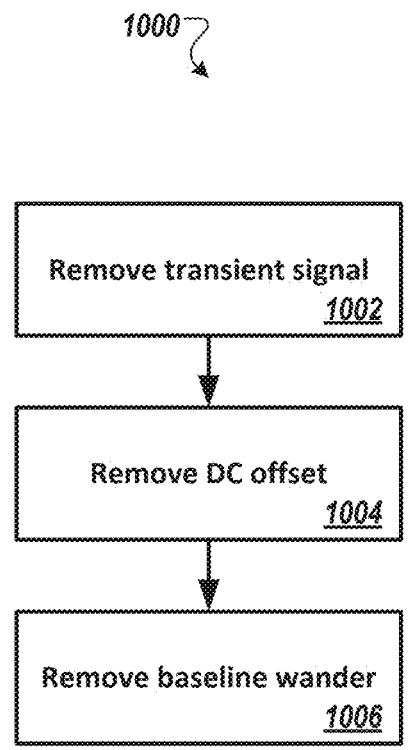
FIG. 10 shows an example pre-processing operation in accordance with an illustrative embodiment.

In some embodiments, prior to the signal quality assessment, the raw biopotential is pre-processed by removing the transient time (1002), removing direct current (DC) offset (1004), and removing the baseline wander (1006), shown in the FIG. 10 example pre-processing operation 1000 in accordance with an illustrative embodiment.

Operation 1002 to remove transient time may include removing portion of the beginning and/or end of the signal. We have observed in our experiments that patients often tend to exhibit a higher amount of physical motion at the start of a biophysical signal acquisition session. During this early period of a session, the electrodes also settle, and contact (and therefore signal quality) improves. As such, discarding a portion of signals acquired in this early period is desirable. In some embodiments, the first 30-31 seconds of the signals maybe discarded; other portions of such signals may be discarded as necessary.

Operation 1004 to remove direct current offset may include removing, e.g., by subtraction operation, a determined mean of the acquired signal from the signal for each acquired channel (e.g., from the output of operation 1002).

Operation 1006 to remove the baseline wander may include subtracting the acquired signal (e.g., from the output of the operation of 1002 and/or 1004) from its low frequency baseline. The baseline, in some embodiments, is reconstructed by applying a stationary wavelet transform (Daubechies wavelets with 8 vanishing moments) and preserving the coefficient at the lowest frequency.

To characterize the powerline noise, the system may evaluate the chronic fundamental frequency of 60 Hz, in North America and many other regions, and its harmonics that could destructively interfere with biopotential signals. Powerline interference may be caused by electromagnetic interference by powerline, electromagnetic field induced by the machinery in signal collection sites, alternative current (AC) fields originating by the loops in the cables, improper grounding of the signal recording device or the patient, as well as electrical equipment drawing heavy AC, e.g., air conditioner, elevators, and X-ray units.

Figure 11:
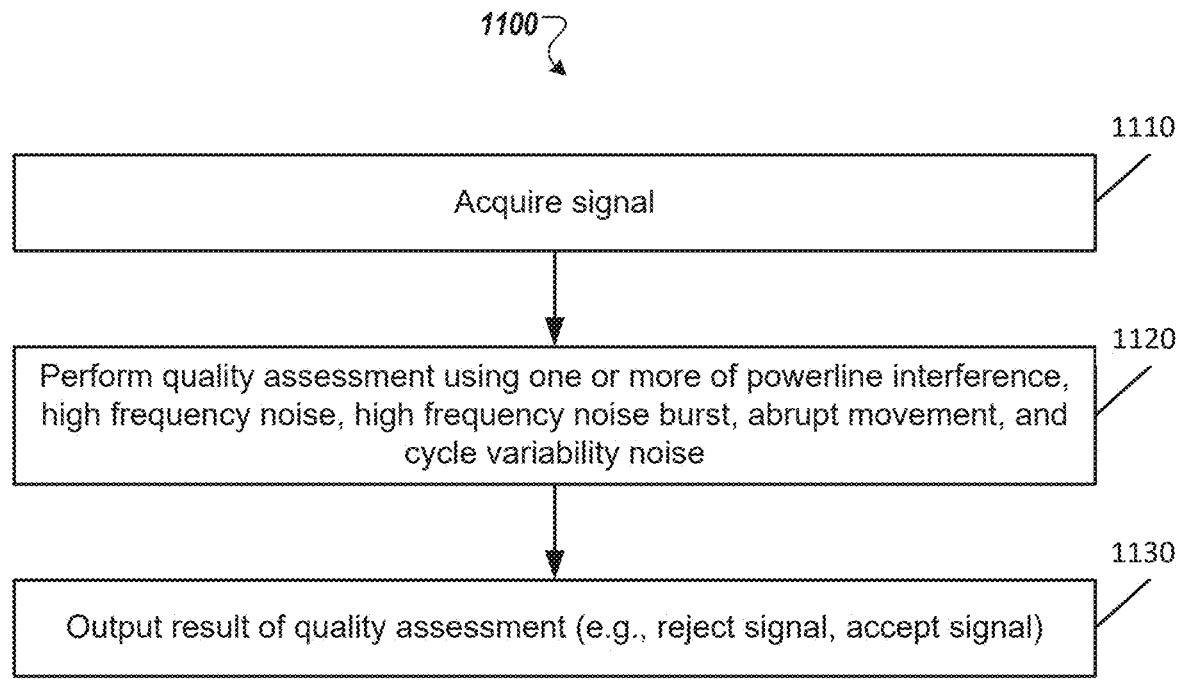
FIG. 11 is an operational flow diagram of a method for non-invasively assessing a disease state or abnormal condition of a subject.

FIG. 11 is an operational flow diagram of a method 1100 for non-invasively assessing a disease state or abnormal condition of a subject. The method includes obtaining (1110), by one or more processors (e.g., from a stored database or from a measurement system), a first biophysical signal data set of a subject associated with saturation of oxygenated or deoxygenated hemoglobin, including a red photoplethysmographic signal and an infrared photoplethysmographic signal. The method 1100 also includes obtaining (also in 1110), by the one or more processors (e.g., from a stored database or from a measurement system), a second biophysical signal data set of the subject associated with a biopotential signal, such as a cardiac signal (e.g., acquired from a cardiac and photoplethysmographic waveform recorder or from an ECG device).

Method 1110 further includes determining (1130), by the one or more processors and/or remotely by one or more cloud-based services or systems, one or more signal quality parameters of the obtained first and second biophysical-signal data sets, wherein at least one of the one or more signal quality parameters is selected from group consisting of powerline interference parameter associated with powerline noise contamination, a high-frequency noise parameter associated with high frequency noise contamination, a noise burst parameter associated with high frequency noise burst contamination, an abrupt movement parameter associated with abrupt movement contamination, and an asynchronous noise parameter associated with skeletal muscle contamination or heart cycle variability.

Method 1100 further includes rejecting (1140), based on the determination, the obtained first and/or second biophysical-signal data set from subsequent analysis to determine an estimated value for presence of a disease state (e.g., based on the determined one or more synchronicity dynamical propert(ies)) (e.g., wherein the disease state includes presence of coronary artery disease (e.g., significant coronary artery disease) or abnormal left ventricular end-diastolic pressure).

Figure 12:
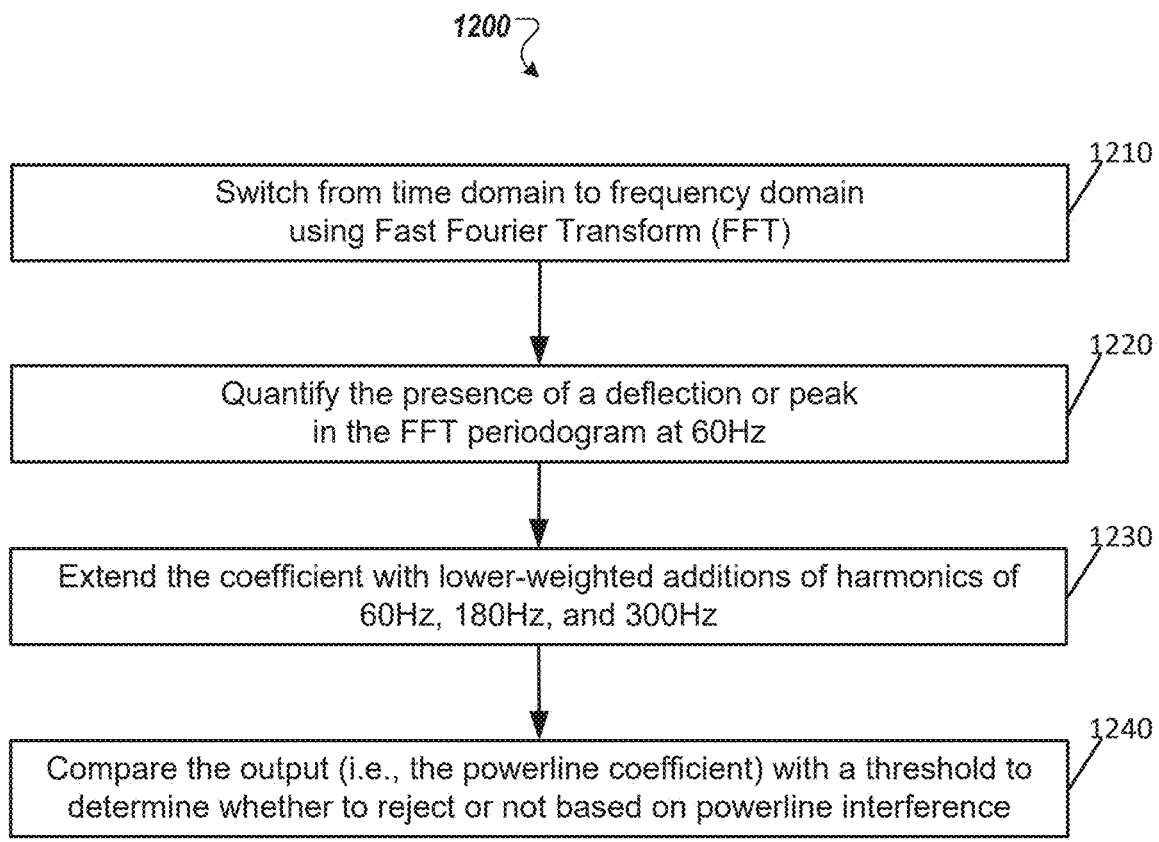
FIG. 12 is an operational flow diagram of an implementation of a method of assessing powerline interference, in accordance with another illustrative embodiment.

FIG. 12 is an operational flow diagram of an implementation of a method 1200 of assessing powerline interference, in accordance with another illustrative embodiment, and as described in U.S. patent application Ser. No. 16/725,416, which is hereby incorporated by reference herein in its entirety. In an embodiment, a powerline coefficient can be an indicator of contamination of powerline noise, with higher values indicating higher contamination.

At step 1210, the signal quality assessment operation of module 130 shown in FIGS. 1A and 1B, in some embodiments, is configured to calculate a powerline coefficient as a measure for powerline interference with the biopotential signal. The coefficient may be calculated by transferring the signal from the time domain to the frequency domain using a Fast Fourier Transform, or the like, and quantifying (step 1220) the maximum powerline energy ($P_{max}$) through the maximum decibel value between 58 Hz and 62 Hz. A benchmark signal energy ($P_{baseline}$) through the average decibel value between 55 Hz and 58 Hz and 62 Hz and 65 Hz may be used to quantify the presence of a deflection (or peak) in the FFT periodogram at 60 Hz. Having the $P_{max}$ and $P_{baseline}$ calculated, the powerline coefficient is defined by Equation 1:

$$powerlineCoeff_{60Hz} = \frac{P_{baseline} - |P_{max}|}{P_{baseline}} \quad \text{(Equation 1)}$$

At step 1230, the powerline coefficient is further extended with inclusion of lower-weighted additions of harmonics (from 60 Hz) at 180 Hz and 300 Hz, which are calculated using the same methodology as described above with respect to the powerline coefficient for 60 Hz. It is contemplated that other frequencies and harmonics may be used depending on the implementation. The output from this assessment is the powerline coefficient for each of the ORTH1, ORTH2 and ORTH3 channels with the base name (only modified to indicate the data channel) of "powerlineCoeff".

At step 1240, the output (i.e., the powerline coefficient) is determined as a score that is compared to a threshold value to determine whether or not to reject the input signal based on powerline interference.

The coefficient is further extended with lower-weighted additions of the 3rd and 5th harmonics of 60 Hz (i.e., 180 and 300 Hz), calculated by Equation 2:

$$powerlineCoeff = 10^{(powerlineCoeff_{60\,Hz} + 0.5\,powerlineCoeff_{180\,Hz} + 0.25\,powerlineCoeff_{300\,Hz})} \quad \text{(Equation 2)}$$

In an implementation, if the powerline coefficient is greater than a threshold value of 486.6, then the signal is rejected based on powerline interference. In some implementations, there may be a geographic consideration when quantifying this score, e.g., with respect to the device being used. For example, for regions using 50 Hz, the calculation of the score may be modified to quantify 50 Hz powerline noise.

The output from the assessment may be characterized, and/or labeled as, the powerline coefficient for each of acquired channels of the second biophysical data set (e.g., channels ORTH1, ORTH2, ORTH3).

A study was conducted entailing a systematic visual assessment of powerline noise on 668 biopotential signals (acquired using a phase signal recorder) by four independent reviewers to evaluate the signal suitability for analysis (i.e., signal visual attributes and feature extraction). The initial visual assessment had been used as a base for assigning the powerline threshold. According to the visual assessment, the powerline threshold can be assigned to be 486.6. Accordingly, signals with noise scores greater than 486.6 were rejected due to high powerline interference and signals below the threshold are accepted for further analysis.

Figure 13A:
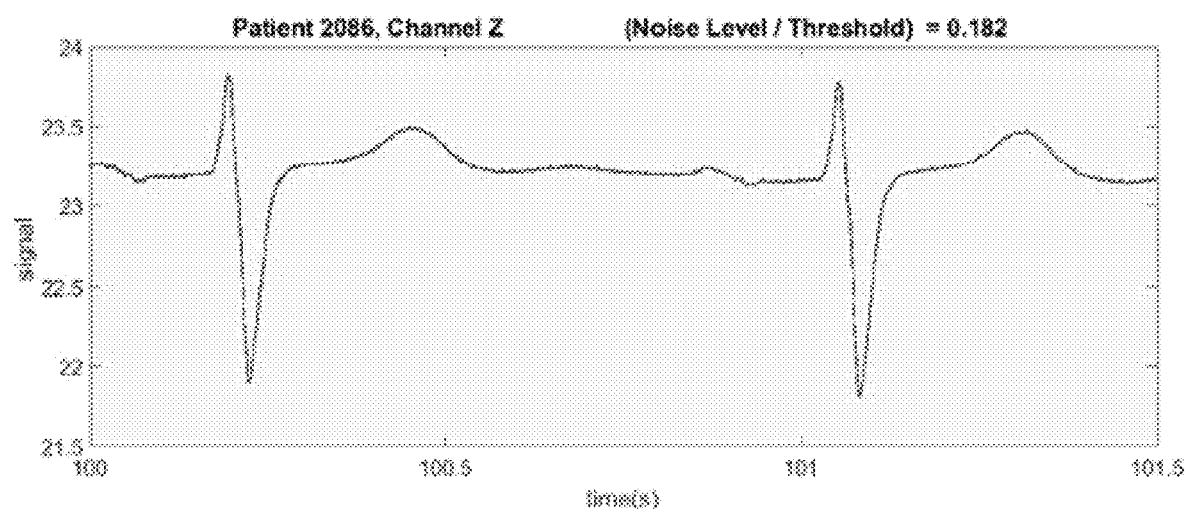
FIGS. 13A, 13B, 13C, 13D, and 13E each shows an example of biopotential signals with powerline interference.
Figure 13B:
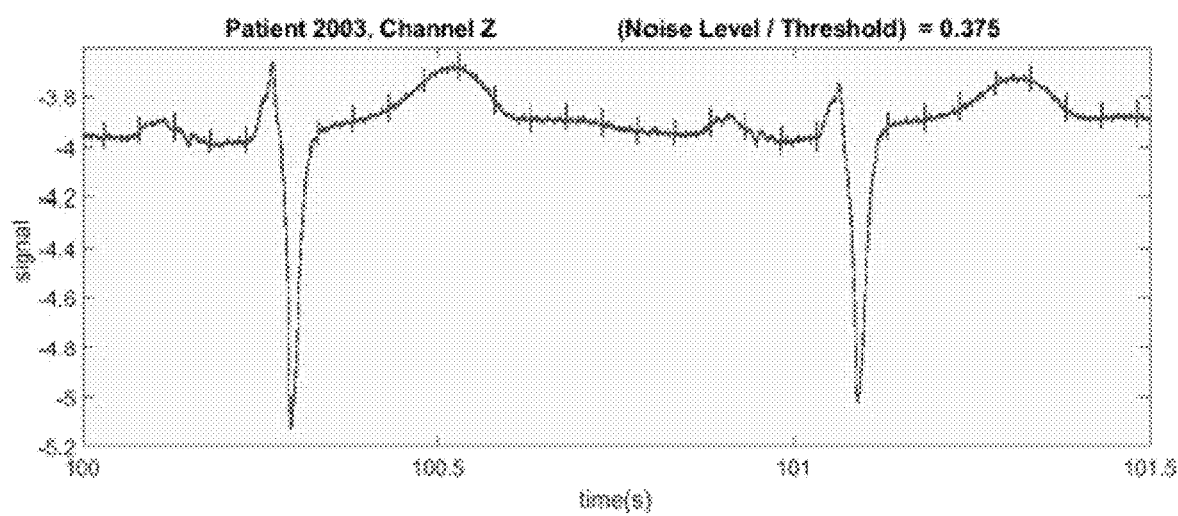
Figure 13C:
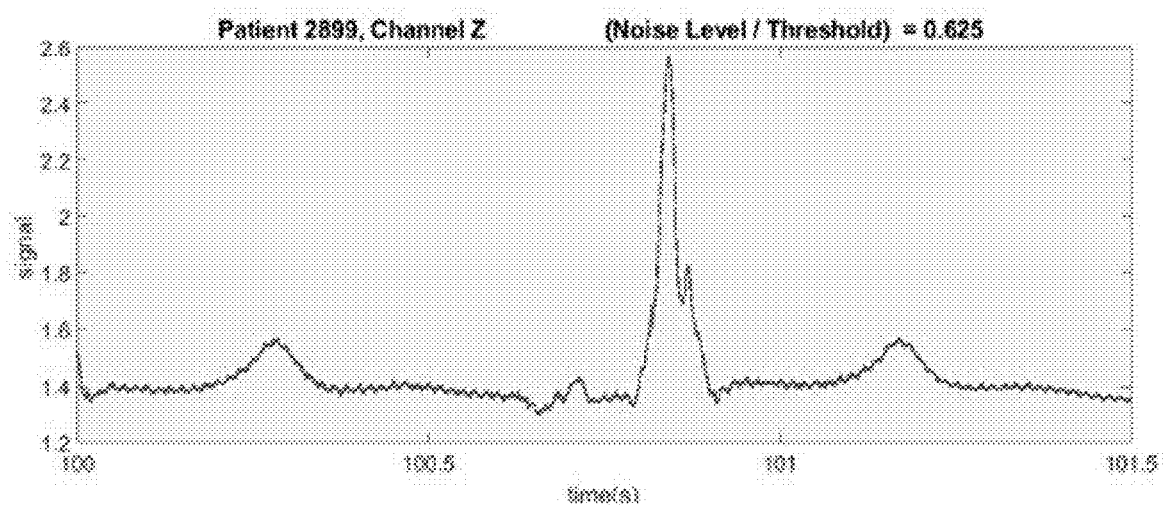

FIGS. 13A, 13B, and 13C each shows examples of biopotential signals with various levels of powerline interference. FIG. 13A shows powerline interference quantified by the powerline coefficient score considered to be infinitesimal in the signal (e.g., having noise score five times smaller than the powerline noise threshold). Conceivably, an increase of the noise level below the threshold causes notable powerline interferences with signal attributes, however, signal characteristics (e.g., depolarization/repolarization waves) can still be distinguished from powerline noise, shown in FIGS. 13B-13D. FIG. 13E shows significant powerline noise interference (e.g., having about four times larger than the powerline threshold). The powerline periodic oscillations in the amplitude range of -9.15 mV to -9.45 mV are clearly visible between the ventricular depolarization waves. As evident, the signal is highly contaminated with powerline interference so that the visual attributes of signal (e.g., peak amplitudes, wave duration, onsets and offsets) are barely detectable. Accordingly, this signal is rejected through the powerline quality assessment.

Figure 13D:
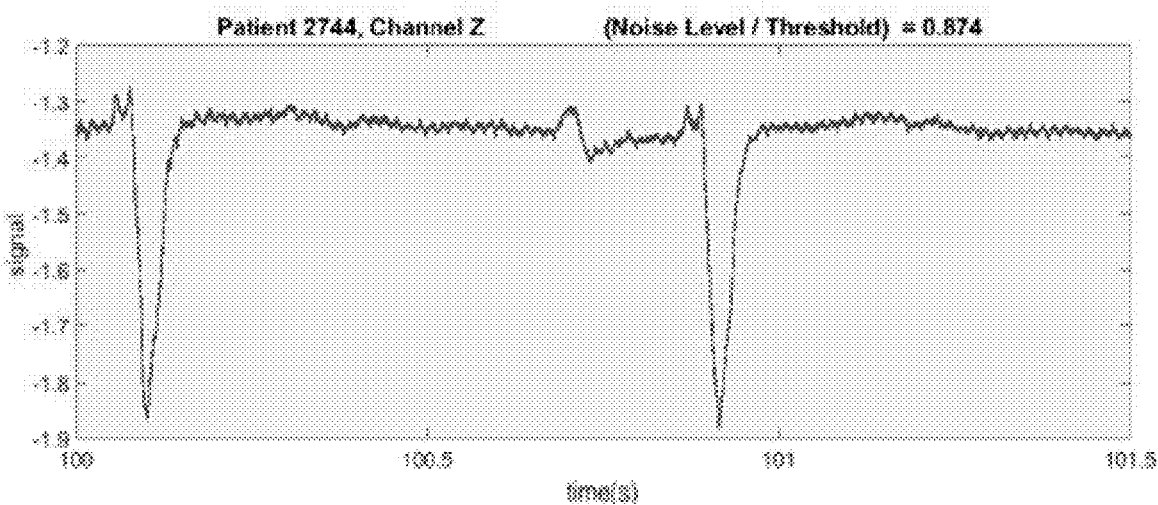
Figure 13E:
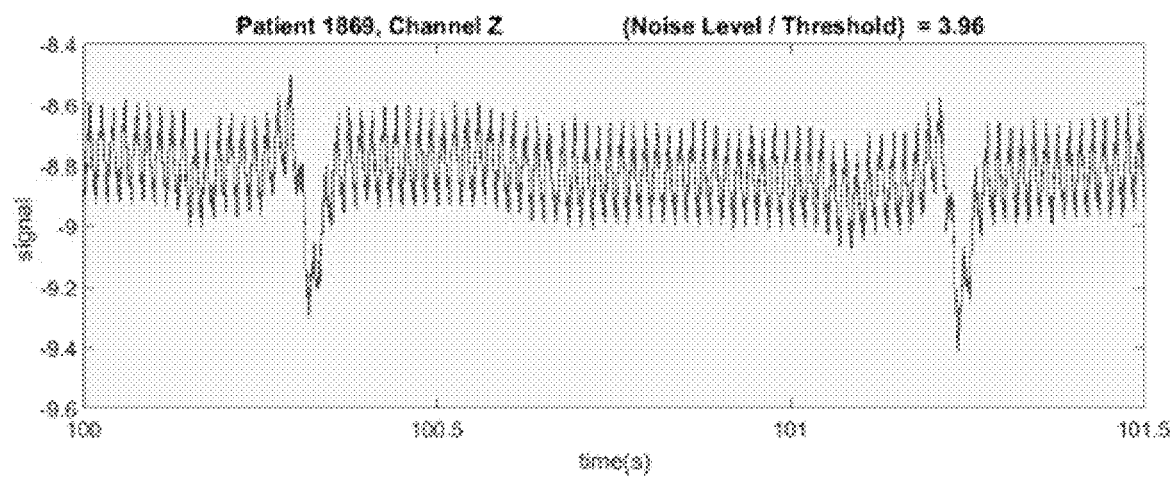

Specifically, FIGS. 13A-13E show examples of powerline interference with the biopotential signal from a clinical study dataset termed "CADLAD", in which FIG. 13A shows low powerline interference (powerline coefficient in channel Z=88.4); FIG. 13B shows low-moderate powerline interference (powerline coefficient in channel Z=182.6); FIG. 13C shows moderate-high powerline interference (powerline coefficient in channel Z=304.1); FIG. 13D shows high powerline interference but below the threshold (powerline coefficient in channel Z=425.4); FIG. 13E shows maximum powerline interference observed in CADLAD (powerline coefficient in channel Z=1982.3).

Representing Powerline Noise in Terms of Signal-to-Noise Ratio. In some embodiments, the signal quality assessment operation of module 130 is configured to represent powerline noise as a signal-to-noise ratio parameter. Having defined the powerline coefficient as a measure of powerline interference with the biopotential signal, the signal quality assessment operation 130 may define a relationship between the powerline noise score (NSPL) and conventional noise metrics, such as signal-to-noise ratio (SNR). Specifically, the signal quality assessment operation of module 130 may approximate the powerline coefficient according to Equation 3:

$$NS_{PL} = f(Y(f)_{signal}, \theta_{signal}, Y(f)_{noise}, \theta_{noise}) \quad \text{(Equation 3)}$$

Per Equation 3, Y(f) is the signal (or noise) transformation in the frequency domain, e.g., FFT coefficient, and θ is the phase of the signal (or noise). When the powerline coefficient is dimensionless, for a given signal with specified sampling frequency and duration, the noise score relationship may be expressed by the signal-to-noise ratio (SNR) per Equation 4:

$$NS_{PL} \approx f(SNR) \quad \text{(Equation 4)}$$

where SNR is defined by Equation 5:

$$SNR = 20\log\left(\frac{RMS_{signal}}{RMS_{noise}}\right) \quad \text{(Equation 5)}$$

In some embodiments, SNR is a function of signal and noise frequency content and noise relative phases (fundamental and harmonics), thus, Equation 4 may be a dimensionless representation of Equation 3. To provide a dimensionless relation given in Equation 4, the study generated synthetic signals (series of sine waves) with additive noise. To cover the wide frequency range presented in the biopotential signal, in the study, synthetics signals were generated by superimposing a set of hundred sine waves with the same duration as PSR signals (215 seconds corresponding to 1,720,008 data points with a sampling frequency of 8 kHz). Thus, discrete signal y(tn) is described by Equations 6 and 7:

$$y = \sum_{i=1}^{100} a_i \sin(2\pi f_i t_n + \theta_i) \quad \text{(Equation 6)}$$

where $0 < a_i \leq 1$, $0\ Hz < f_i \leq 55\ Hz$, and $0 < \theta_i < 2\pi$ (Equation 7)

The study used Monte Carlo simulations to generate synthetic signals with powerline noise. The components of the waves (i.e., amplitude, frequency, and phase) were randomly sampled from the pools given in Equations 7 and 8. The study randomly sampled the waves frequency components ($f_i$) (with replacement) from a low-to-moderate frequency pool with uniform distribution, ranging between 0 to 55 Hz with the same resolution of the PSR signal, i.e., 0.005 Hz (the frequency sub-band that contains most of the biopotential energy).

In the study, the frequency content of the ventricular repolarization wave generally contributes to the lowest frequency of biopotential signals, ranging from 0 to 10 Hz, with some overlay with atrial depolarization/repolarization waves, dominated in 5-30 Hz frequency range. The ventricular depolarization wave contains most of the biopotential energy which normally demonstrates itself within 8-50 Hz frequency range. Besides the aforementioned physiological rationales, the selected frequency sub-band of 0-55 Hz does not overlay with 58-62 Hz band corresponding to the powerline noise; thus, it allows for decoupling the synthetic powerline noise characteristics from that of the generated signal required for SNR calculation. The study randomly sampled the phase ($\theta_i$) of the waves from a uniform distribution, $0 < \theta_i < 2\pi$ with the resolution of $0.001\pi$.

Figure 14:
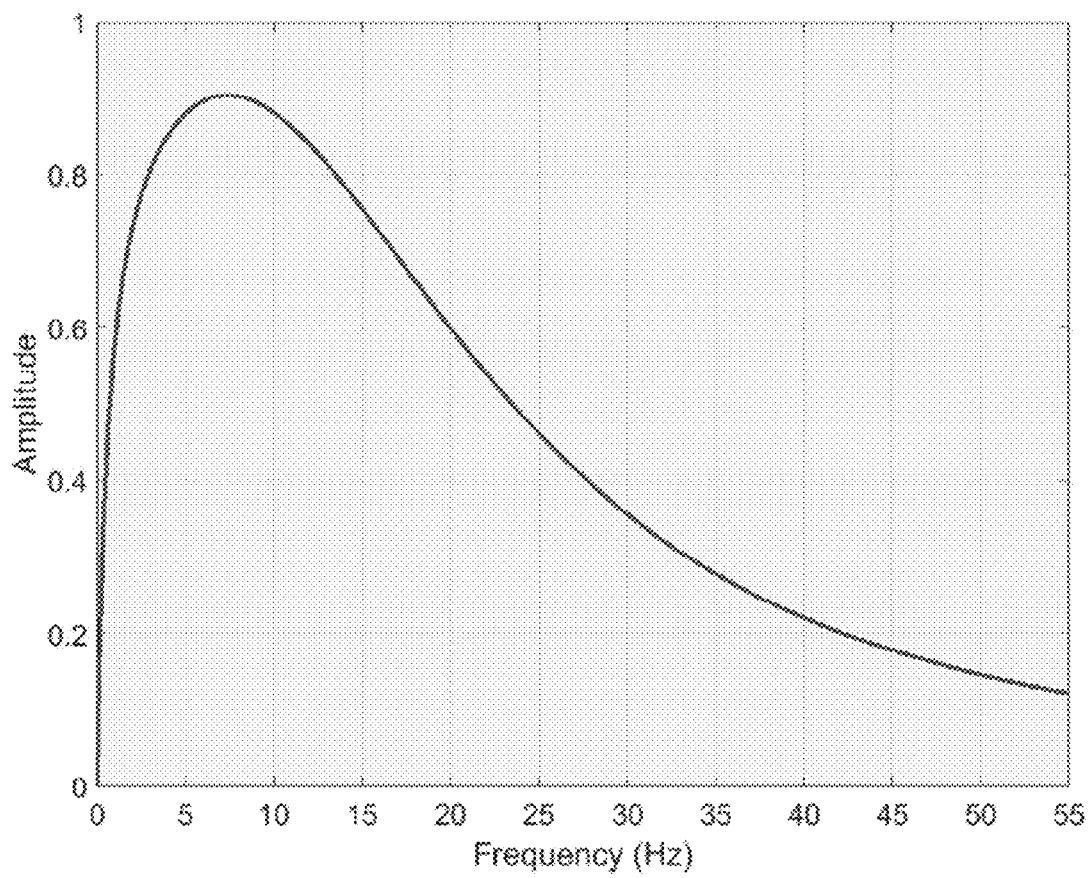
FIG. 14 shows plots of amplitude versus frequency used to generate synthetic signals in a signal quality quantification study.

In the study, while amplitudes may be similarly sampled from a uniform distribution, the study considered biopotential power not physiologically distributed uniformly in the frequency domain, e.g., depolarization and repolarization waves, to be contributed differently to the frequency range of 0-50 Hz. In the study, to create synthetic signals better resembling biological biopotential signals, an amplitude-frequency relationship for any sampled frequency is matched as shown in FIG. 14. Specifically, FIG. 14 shows plots of amplitude versus frequency used to generate synthetic signals in the study.

To statistically power the analysis, the study generated the signals 2500 times using the bootstrap sampling from ascribed pools given in Equation 7. Bootstrap sampling from the component pools may favorably cover a wide range of possible signals, and ultimately, may provide a confidence interval for the noise scores. Even though the synthetic components were derived from the biologically reasonable pools, the generated synthetics signals could yet be substantially disparate from the biopotential signals.

Because the powerline noise may be simulated through the random sampling of the frequency and phase from bounded ranges of frequency and phase, the study generated the powerline noise centered at 60 Hz with its harmonics at 180 Hz and 300 Hz using Equations 8 and 9:

$$\tilde{y} = \tilde{a}_0 \sin(2\pi \tilde{f}_0 t + \tilde{\theta}) + \tilde{a}_3 \sin(2\pi \tilde{f}_3 t + \tilde{\theta}) + \tilde{a}_5 \sin(2\pi \tilde{f}_5 t + \tilde{\theta}) \quad \text{(Equation 8)}$$

$$\tilde{f}_0 = 60 \pm 2 \text{ Hz}, \tilde{f}_3 = 180 \pm 2 \text{ Hz, and } \tilde{f}_5 = 300 \pm 2 \text{ Hz} \quad \text{(Equation 9)}$$

In the study, the frequency and phase of the noise were bootstrapped 2500 times from a Gaussian (see FIG. 15) and uniform distribution, respectively. While frequencies were sampled independently from the given normal distribution with means of 60, 180, and 300 Hz, the study assumed that the fundamental and harmonics are in phase.

Figure 15:
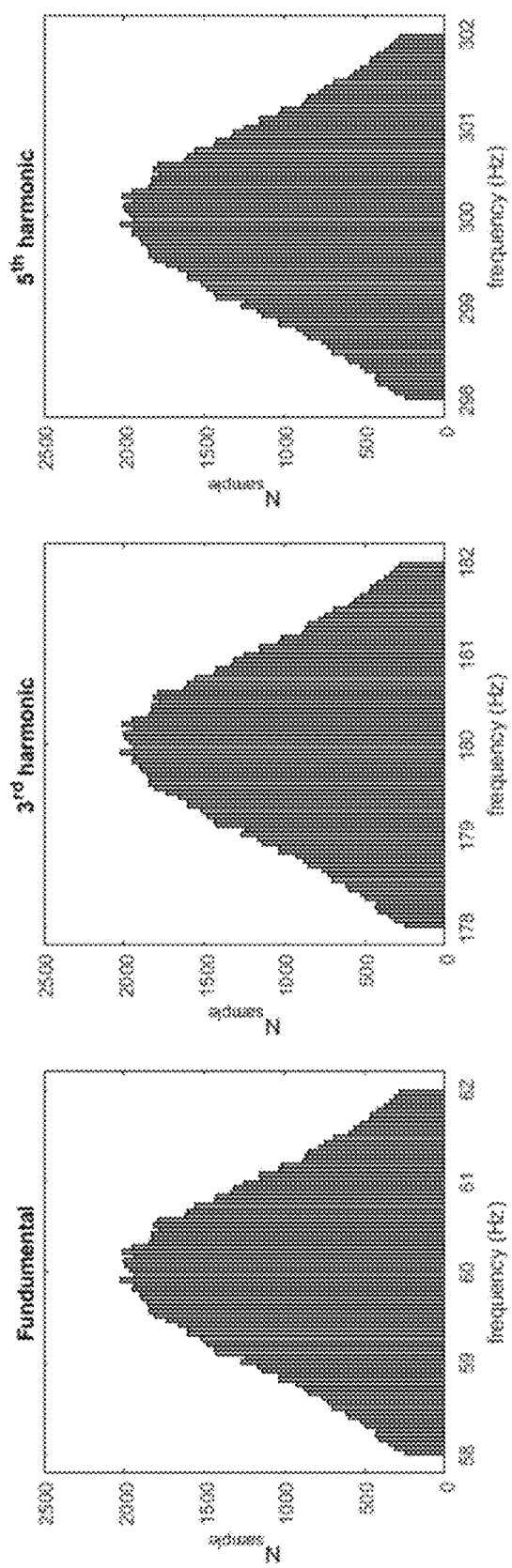
FIG. 15 shows example distribution of the fundamental and harmonic frequencies used for the simulation of powerline noise in the signal quality quantification study.

FIG. 15 shows example distribution of the fundamental and harmonic frequencies for the generation of powerline noise.

To assign valid amplitudes for the fundamental and harmonics of the noise, the study calculated the ratio of the amplitudes, i.e., $\tilde{a}_3/\tilde{a}_0$ and $\tilde{a}_5/\tilde{a}_0$, using a set of 64 subjects from CADLAD with balanced gender and disease. The amplitude ratio in each of the corresponding frequencies is calculated as a square root of the power, where the average band power is determined using a band power operator with a frequency range of ±2 Hz centered at the fundamental and harmonic frequencies. The amplitude ratios were tabulated in Table 9 for each channel.

TABLE 9

(example amplitude ratio of the 3rd and 5th harmonics)

| Parameter | median (channel X) | median (channel Y) | median (channel Z) | mean |
|---|---|---|---|---|
| 3rd harmonic ratio | 0:2524 | 0.2513 | 0.2332 | 0.2456 |
| 5th harmonic ratio | 0.1547 | 0.1444 | 0.1370 | 0.1454 |

The mean of the amplitude ratio in three channels is used to determine the noise amplitudes in Equation 8.

Figure 16:
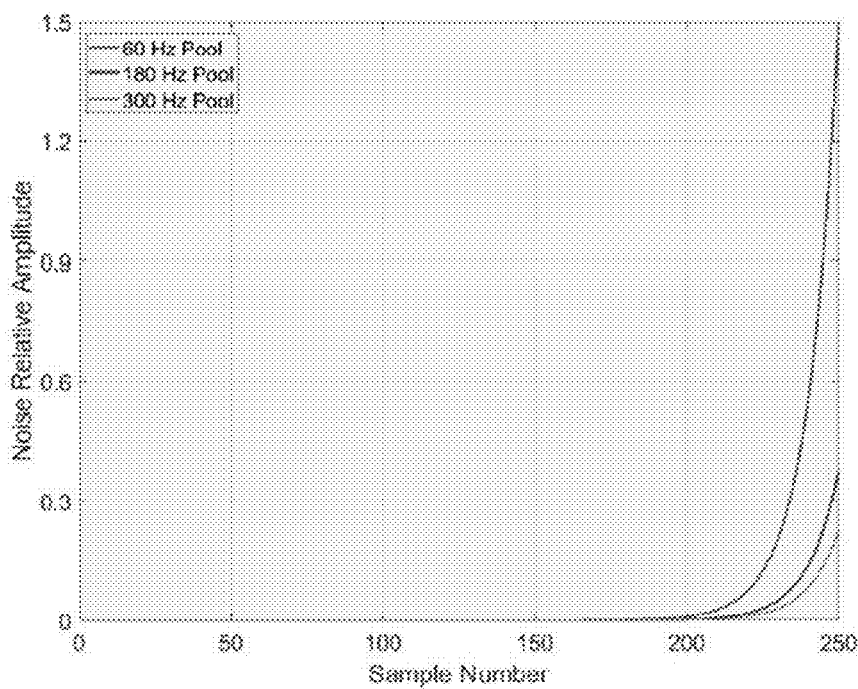
FIG. 16 show example ranges of noise relative amplitude values for the fundamental and harmonic frequencies used for simulation of powerline noise in the signal quality quantification study.

The values of $\tilde{a}_3$ and $\tilde{a}_5$ may be determined as $\tilde{a}_3 = 0.25 \tilde{a}_0$ and $\tilde{a}_5 = 0.15 \tilde{a}_0$, respectively, in which, at each signal frequency and noise level, values of do were linearly swept through a set of 250 values, as shown in FIG. 16. Specifically, FIG. 16 show example ranges of amplitude for the fundamental and harmonics used for simulation of powerline noise. Such range of values for $\tilde{a}_0$ was found to cover a reasonable range of the SNR (10<SNR<300).

Doing so, the study generated 2500 clean signals and noises, which were superimposed to create a set of 2500 signals contaminated with powerline noise.

Figure 17:
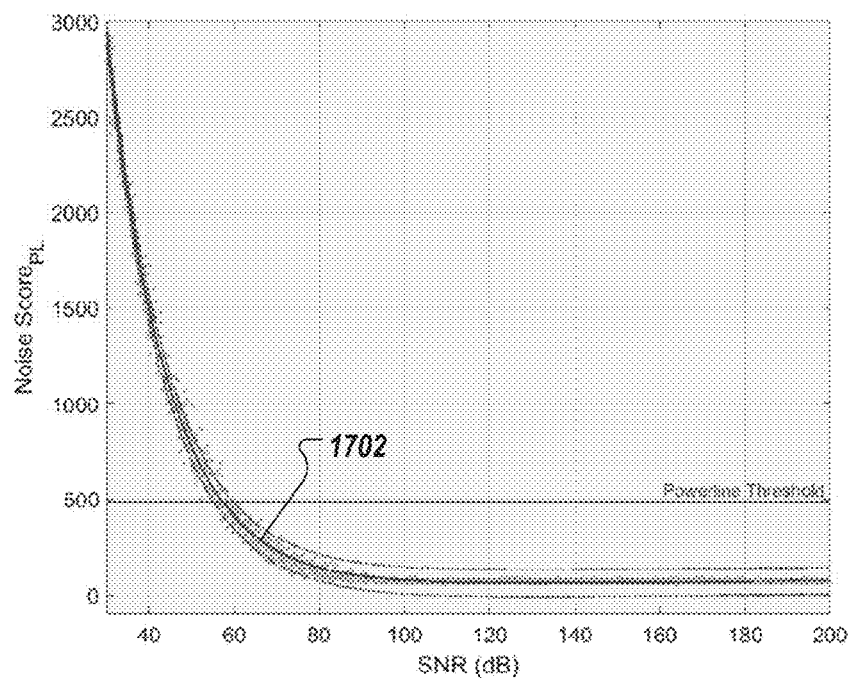
FIG. 17 shows powerline noise score versus assessed SNR in the signal quality quantification study.

FIG. 17 shows that the powerline noise score has an inverse relationship with SNR along with the fitted curve (double exponential function) and the 95% confidence bands. Based on these results, the relationship between the powerline noise score and SNR can be expressed by Equation 10:

$$\text{NS}_{PL}(22960 \pm 550) e^{(-0.06896 \pm 0.00063) SNR} + (38.35 \pm 4.16)$$
$$e^{(-0.003225 \pm 0.000667) SNR} \quad \text{(Equation 10)}$$

Specifically, FIG. 17 shows powerline noise score versus SNR. At each SNR, the powerline fundamental and harmonic frequency were sampled from Gaussian frequency pools and the noise phase was sampled from the uniform phase pool ($0 \leq \theta \leq 2\pi$). The line (1702) shows the fitted curves with the 95% prediction bounds. In FIG. 17, the double exponential expression was observed to accurately fit the data (R-squared=0.9912 with a Standard Error of estimation of 2.859×106). Substituting the powerline noise threshold into Equation (10), the study determined the threshold to be $\text{SNR}_{threshold\_PL}$ (dB)≈57.3±2.5. The upper bound of SNR threshold value (SNR=59.8 dB) was observed to be similar to the maximum powerline noise that commercial ECG instrument can normally tolerate, e.g., SNR>60-70 dB.

High-Frequency Noise. While the American Heart Association (AHA) recommends an upper-frequency cut-off of at least 150 Hz to accurately capture the biopotential signal attributes in ECG for adults, adolescents, and children, ischemia may be detected with greater sensitivity by examining the higher frequency components (suggested frequencies between 150-250 Hz) in QRS complex than by visual inspection of the standard ECG. In some embodiments, high-frequency QRS complex analysis may be performed during exercise stress echocardiography for the detection of coronary artery disease (CAD).

The signal quality assessment operation of module 130 may be configured to evaluate the usefulness of the high-frequency content through an appropriate signal quality assessment. If there is an unusual level of high-frequency content (e.g., greater than 170 Hz), then the signal quality assessment operation of module 130 may assume that the high-frequency range of the acquired signal is contaminated with noise. The frequency content (e.g., above 170 Hz) may not necessarily periodic and can include pulses and other such artifacts.

Figure 18:
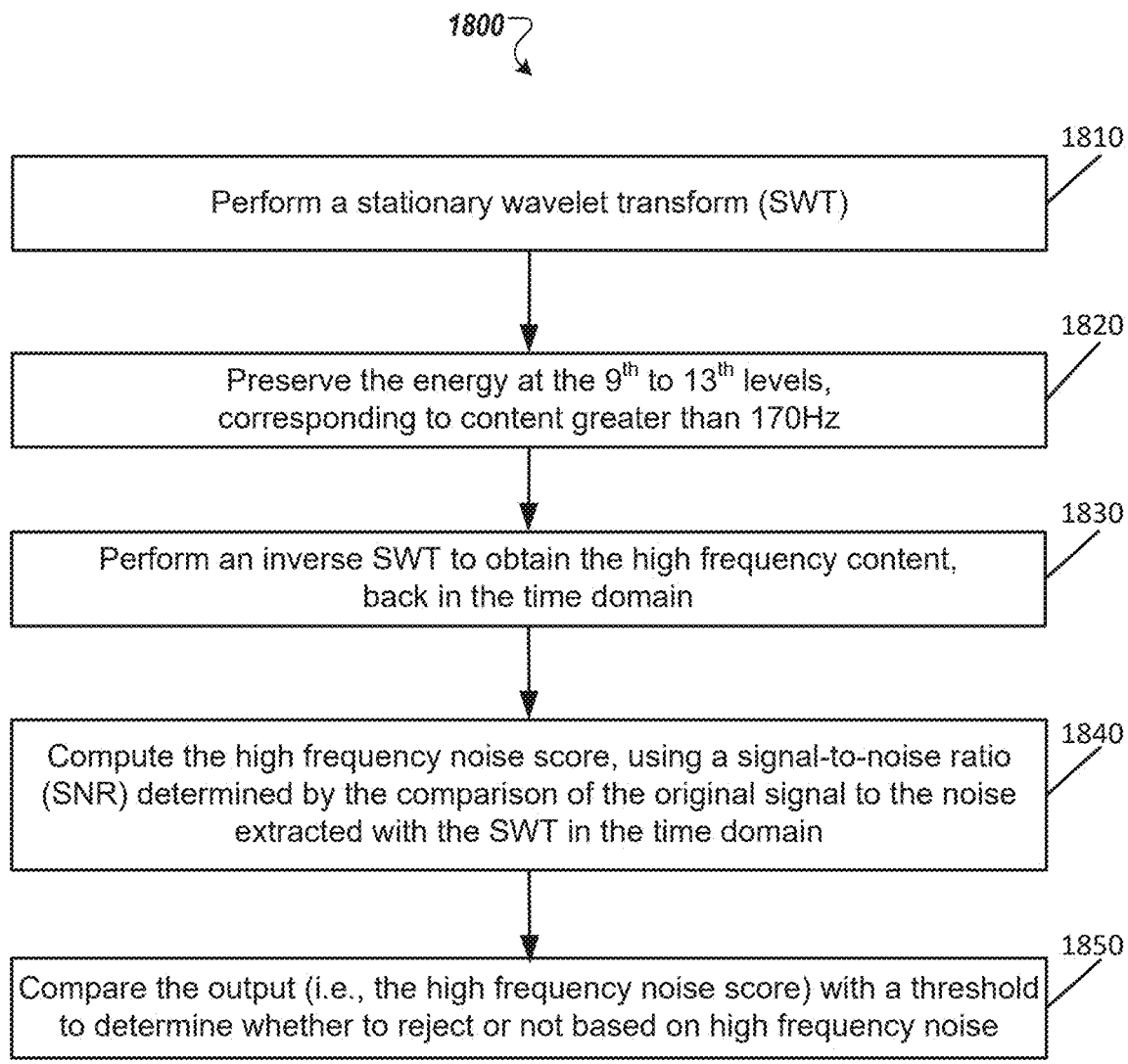
FIG. 18 is an operational flow diagram of an implementation of an exemplary method of assessing high frequency noise, in accordance with an illustrative embodiment.
Figure 19:
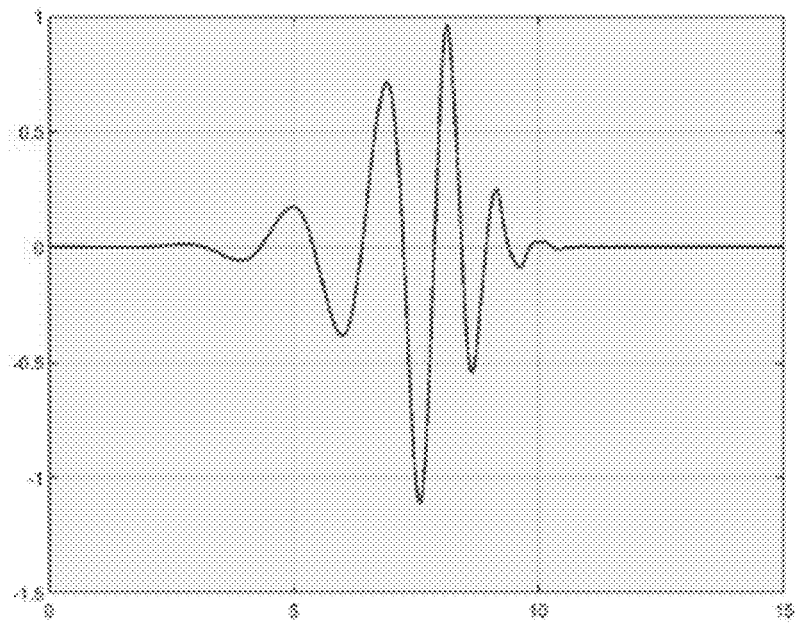
FIG. 19 shows an example Daubechies wavelet with 8 vanishing moments that may be used in a baseline wander removal operation.

FIG. 18 is an operational flow diagram of an implementation of an exemplary method 1800 (e.g., by the signal quality assessment operation of module 130 shown in FIGS. 1A and 1B) of assessing high frequency noise, in accordance with an illustrative embodiment. The high frequency noise score is computed by first performing a stationary wavelet transform (SWT) at step 1810. SWT allows for frequency localization in time at the expense of frequency detail. In some embodiments, orthogonal Daubechies wavelets with 8 vanishing moments, commonly known as db8 (and as shown in FIG. 19) were applied to the signal and the energy at the 9th to 13th levels, corresponding to contents greater than 170 Hz, were preserved, while all energy below 170 Hz were removed. Specifically, FIG. 19 shows an example Daubechies wavelet with 8 vanishing moments.

At step 1820, the energy at the 9th to 13th levels is preserved, corresponding to content greater than 170 Hz, and then at step 1830 an inverse SWT is performed. The result of these transformations is the high frequency content, back in the time domain (where it is visible, if that intermediate output was plotted).

At step 1840, the signal-to-noise ratio (SNR) is computed as the high frequency noise score through the comparison of the original signal to the noise extracted with the SWT in the time domain. In some embodiments, the SNR is calculated for 1-second segments of the signal, for about 207 segments, and the median of the SNR values is used for the noise score calculation. The noise score may be defined as the inverse of the median SNR. The output from the evaluation, in some embodiments, is defined in Equation 11:

$$hfNoiseToSignalRatio = \frac{1}{\text{median}(SNR)} \quad \text{(Equation 11)}$$

In Equation 11, SNR is an array of SNRs calculated on 1-second segments. Similar to the powerline assessment, a threshold is set to evaluate the quality of the biopotential signal for high-frequency noise contamination.

At step 1850, the output (i.e., the high frequency noise score) is compared with a threshold to determine whether or not to reject the input signal based on high frequency noise. In an implementation, if the high frequency noise score is greater than 0.05273, then the signal is rejected based on high frequency noise.

Figure 20A:
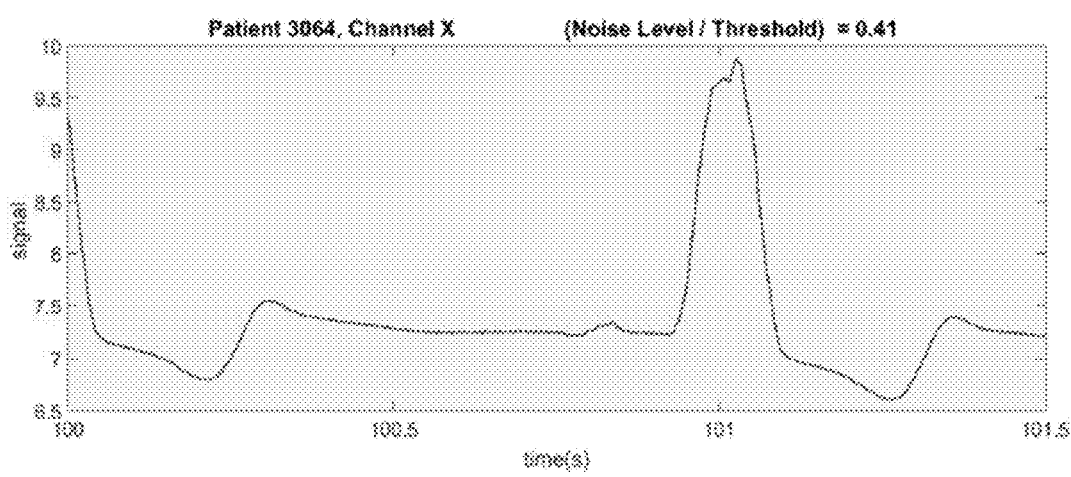
FIGS. 20A, 20B, and 20C each shows example acquired signals with different high-frequency noise in the signal quality quantification study.
Figure 20B:
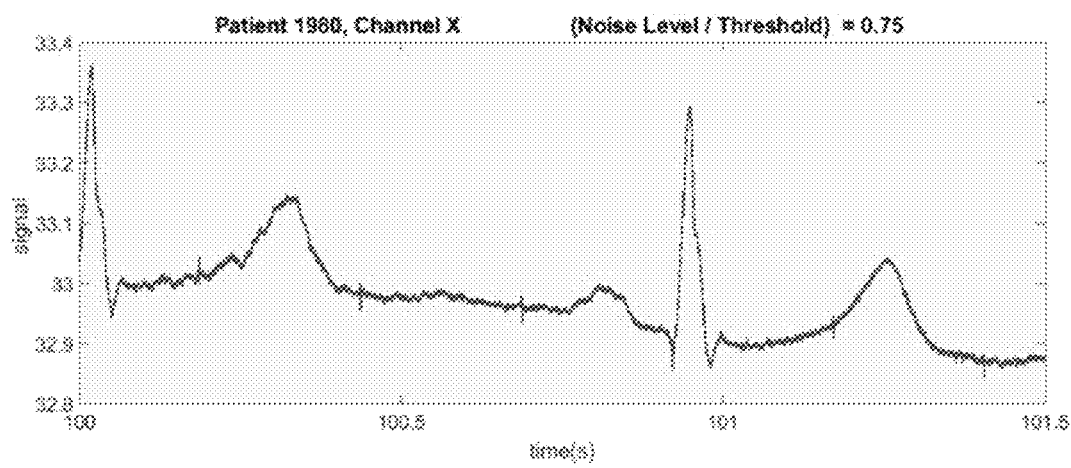
Figure 20C:
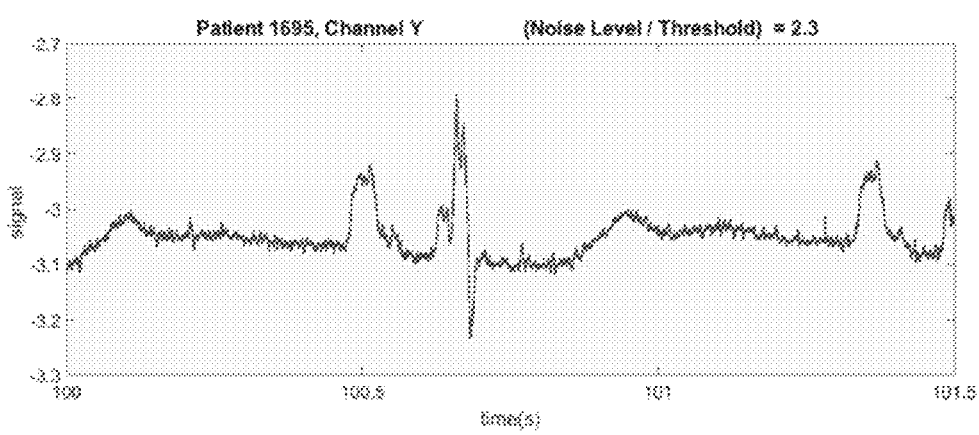

FIGS. 20A, 20B, and 20C each shows acquired signals with different high-frequency noise. FIG. 20A shows a substantial waveform with negligible high-frequency noise contamination—the signal with a noise score 41% of threshold. FIG. 20B shows acquired signals with noise level approaching the threshold—specifically showing example depolarization and repolarization waveforms, which are affected by the high-frequency interactions but where the biopotential signal is still distinguishable from the noise. FIG. 20C shows high-frequency noise as random impulses that highly contaminate the entire ventricular and atrial depolarization/repolarization waves in such a manner that the signal is not visually interpretable, e.g., it is not clear if the notches on ventricular and atrial depolarization waves are biological or noise-induced. More importantly, with the significant noise interference with the visual characteristics of the signal, the topological properties of the signal would become less evident and that would adversely impact the accuracy of any feature relying on one, two, or three-dimensional topology of the signal.

Representing High-Frequency Noise in Terms of Signal-to-Noise Ratio. In some embodiments, the signal quality assessment module 130 is configured to evaluate high-frequency noise score in association with SNR. The signal quality assessment operation of module 130 may generate synthetics signals by superimposing a set of sine waves (e.g., 100 sine waves) comprising the low-to-moderate frequency range between 0 to 55 Hz per Equations 12 and 13:

$$y = \sum_{i=1}^{100} a_i \sin(2\pi f_i t + \theta_i) \quad \text{(Equation 12)}$$

$$0 < a_i \leq 1,\ 0\ \text{Hz} < f_i \leq 55\ \text{Hz, and } 0 < \theta_i < 2\pi \quad \text{(Equation 13)}$$

Low-moderate frequency range may be considered to be the sub-band carrying most of the biopotential energy and is well-separated from the high-frequency pool (f>170 Hz) required for synthetics noise generation. The amplitude, frequency, and phase of the signals may be randomly sampled (with replacement) from the same distribution. Noise may be simulated per Equations 14 and 15:

$$\tilde{y} = \sum_{i=1}^{100} \tilde{a}_i \sin(2\pi \tilde{f}_i t + \tilde{\theta}_i) \quad \text{(Equation 14)}$$

$$0 \leq \tilde{a}_i \leq 0.10 a_{max},\ 170 \leq \tilde{f}_i \leq f_s/2,\ \text{and } 0 < \tilde{\theta}_i < 2\pi \quad \text{(Equation 15)}$$

All the noise attributed may be sampled from a uniform distribution where the noise amplitude is bounded to the maximum pre-set value for signal amplitude, i.e., $a_{max}=1$. The signal quality assessment operation of module 130 may superimpose the noise and signal to generate synthetics noisy signals (e.g., 2500 synthetic noisy signals) per Equation 16:

$$Y(n) = y(n) + \tilde{y}(n) \quad \text{(Equation 16)}$$

The high-frequency score may be expressed by SNR per Equation 17:

$$NS_{HF} = (0.9985 \pm 0.00750) SNR^{(-0.999 \pm 0.0022)} \quad \text{(Equation 17)}$$

By substituting the high-frequency noise threshold 0.05273 into Equation 17, the signal quality assessment operation of module 130 may express signal-to-noise ratio as SNRthreshold HF (dB)≈19.0±0.1. The high-frequency noise score may be defined to be an inverse of the median SNR, calculated over one second, which has been also verified through the inverse relationship given by the correlation in Equation 16.

Figure 21:
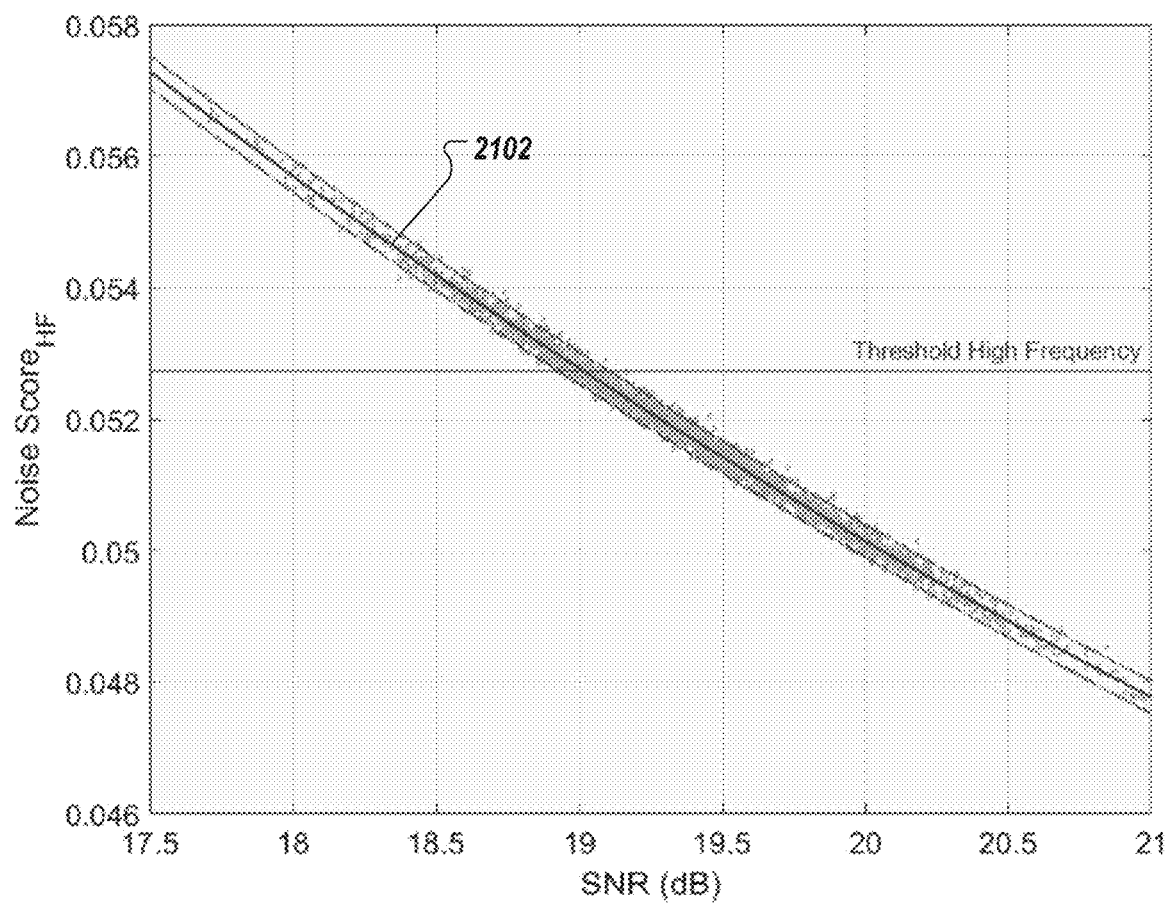
FIG. 21 shows a comparison of the high-frequency noise score versus the SNR score in the signal quality quantification study.

FIG. 21 shows a comparison of the high-frequency noise score versus the SNR score. At each SNR value, the signal and high-frequency noise were generated superimposing 100 sine waves where their frequency, amplitude, and phase are randomly sampled 2500 times from a uniform amplitude, frequency, and phase pools. The line (2102) shows the fitted curves with the 95% prediction bands.

Example Method to Calculate PPG Quality Scores

In contrast to biopotential signals, the PPG signals typically have slow variations. The dominant rhythm (i.e., frequency with most power) is often the heart rate which for adults is normally between 60 to 100 beats per minute (1-1.6 Hz). In addition to the biopotential activity, respiration affects the PPG signals, too. For adult humans, the respiration frequency is normally between 0.2 to 0.3 Hz.

The meaningful frequency band for PPG is below the powerline interference (~50 Hz and higher) and the high-frequency noise. As a result, power interference can be readily removed from the PPG signals without introducing undesirable distortions. In some embodiments, the computations for feature extraction may involve digitally filtering the PPG signals.

Because the signal quality assessment operation of module 130 may include powerline interference and the high-frequency noise from the PPG signals, anomalies become a major factor affecting the quality of the signals. Several metrics may be used to quantify how anomalies corrupt the signal.

Figure 22:
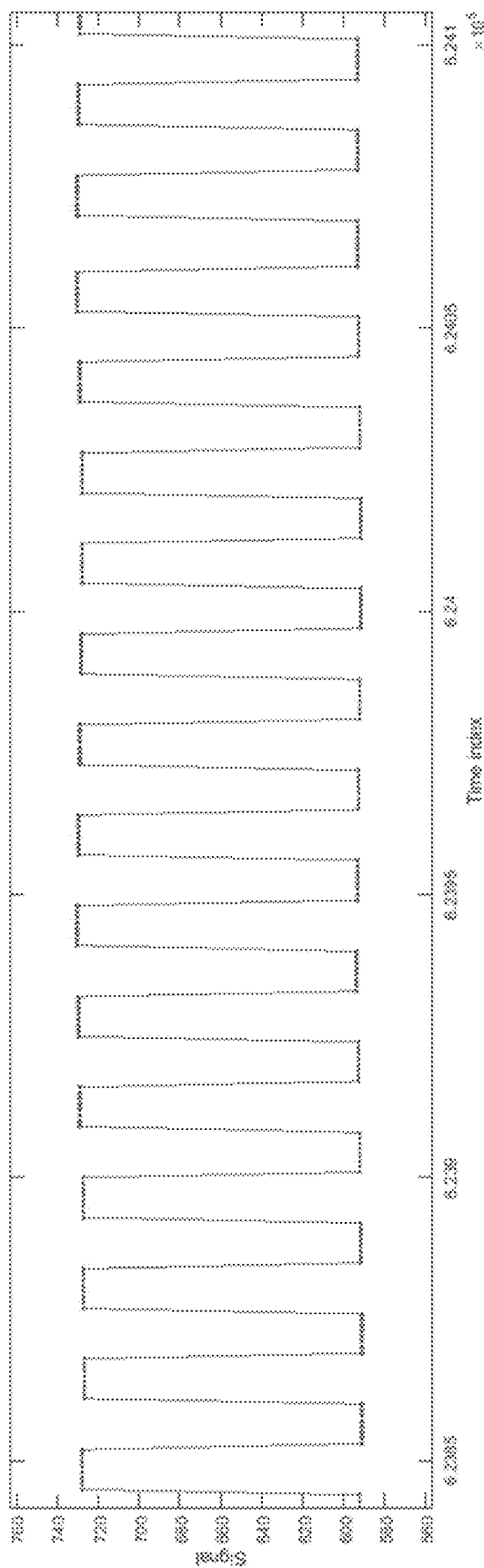
FIG. 22 shows an example raw PPG signal acquisition comprising a red light (upper) and infrared light (lower) transmitted intensity that are multiplexed to each other.

PPG Signal Extraction. In some embodiments, the transmitted red and infrared light signals are multiplexed into one recording. Other implementation may be used in which the PPG signals are separately and individually acquired without multiplexing. FIG. 22 shows an example raw PPG acquisition comprising a red light (upper) and infrared light (lower) transmitted intensity that are multiplexed to each other in which each is acquired at 500 Hz and repeated 8 times.

Figure 23:
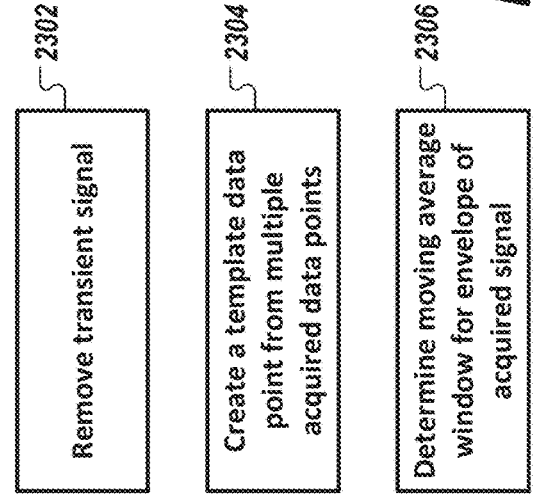
FIG. 23 shows an example pre-processing operation to extract each signal component of a single multiplexed acquired PPG signal of FIG. 22 in accordance with an illustrative embodiment.

FIG. 23 shows an example pre-processing operation 2300 to extract each signal component of a single multiplexed acquired PPG signal of FIG. 22.

To avoid transient effects, operation 2300 includes discarding (2302) one or more pre-defined section(s) of the acquired signal. In some embodiments, 10 seconds from the beginning and 2 seconds from the end of the raw signal are removed.

Figure 24:
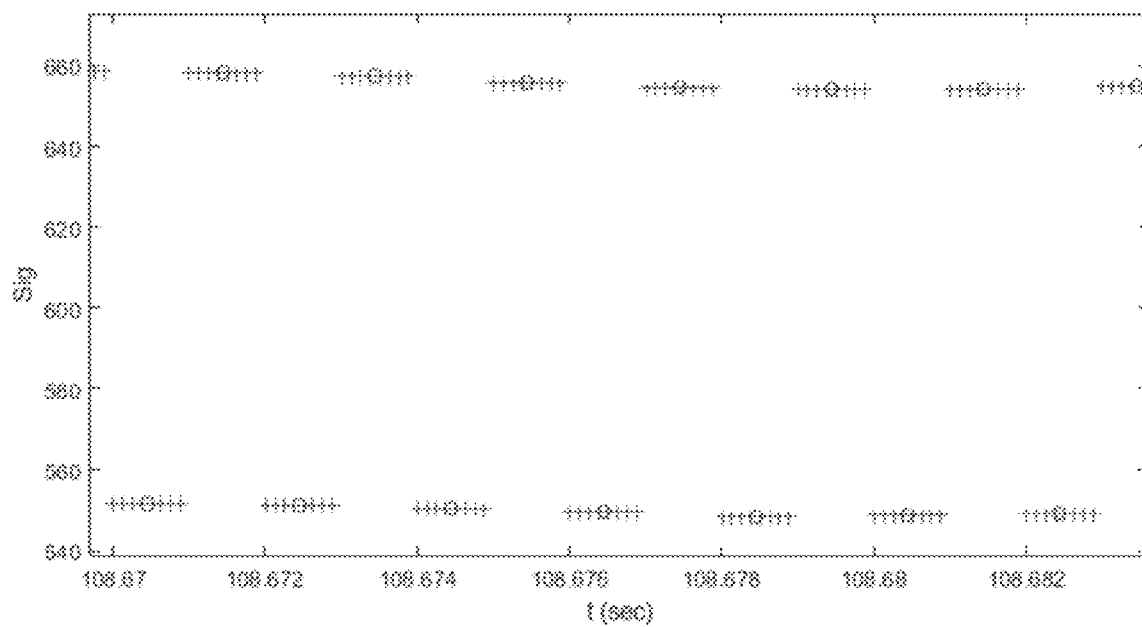
FIG. 24 shows a process to create template data points from multiply acquired data points in accordance with an illustrative embodiment.

Operation 2300 may further include coalescing (2304) the repeated data points have into one in the middle. That is, multiple waveforms may be acquired, and they are combined to form a template data point. FIG. 24 shows repeated data points (+ symbol) being collapsed (e.g., via an averaging operator) into one data point in the middle (o symbol).

Figure 25:
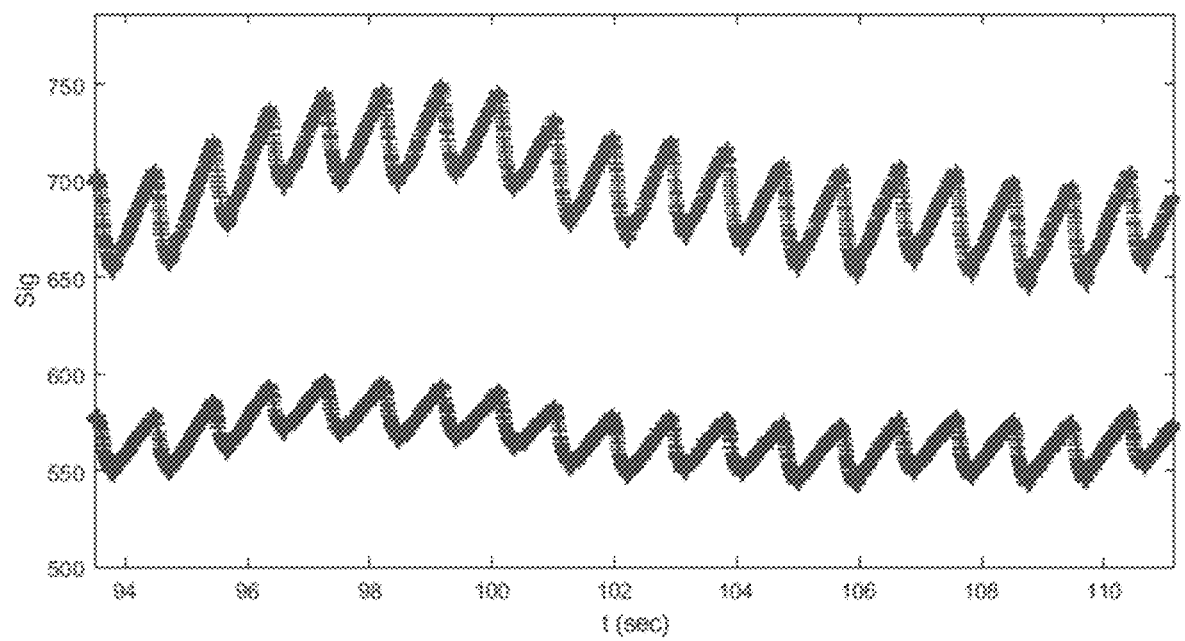
FIG. 25 shows example extracted red light (upper) and extracted infrared (lower) PPG signals in accordance with an illustrative embodiment.

Operation 2300 may further include calculating (2306) a moving average window (e.g., having a pre-defined length, e.g., 16) to determine a mean variation between the upper and lower envelope. Operation 2300 may further include (not shown in FIG. 23) the step of detecting, e.g., with a saturation or rail detector, whether upper and lower envelopes (red and infrared light signals) are above or below the mean variation. FIG. 25 shows the output of the PPG signal extraction including extracted, and now separated, red light (upper) and infrared (lower) PPG signals.

PPG Signal Pre-Conditioning. After a raw multiplexed PPG signal is demultiplexed/extracted into the red and infrared signals, in some embodiments, the signal quality assessment operation of module 130 is configured to precondition the extracted signals before the signals are analyzed in anomaly quantification operation.

Figure 26:
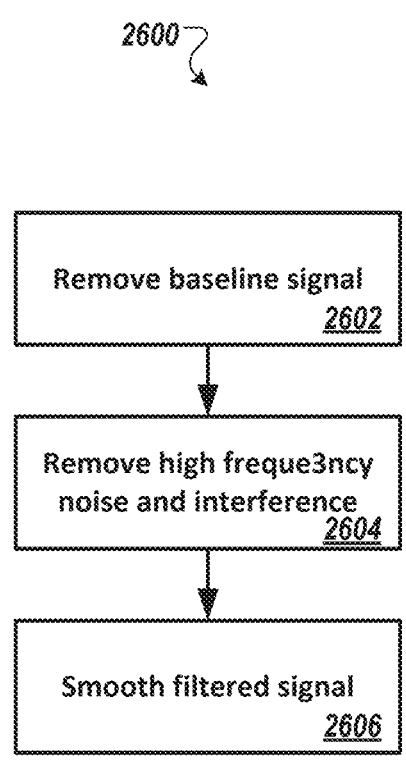
FIG. 26 shows an example preconditioning operation of the extracted red and infrared signals in accordance with an illustrative embodiment.

FIG. 26 shows an example preconditioning operation 2600 of the extracted red and infrared signals.

Method 2600 includes removing (2602) a baseline signal from the extracted signal. In some embodiments, the baseline signal is removed using high pass cut-off frequency (e.g., 0.3 Hz).

Method 2600 may include removing (2604) high-frequency noise and powerline interference. In some embodiments, the removal process 2604 is performed using a low-pass $2^{nd}$ order Chebyshev digital filter configured with a passband frequency $F_{pass}$ of 30 Hz, a stopband frequency $F_{stop}$ of 35 Hz, a passband ripple $A_{pass}$ of 1 dB, and a stopband attenuation $A_{stop}$ of 80 dB.

Figure 27:
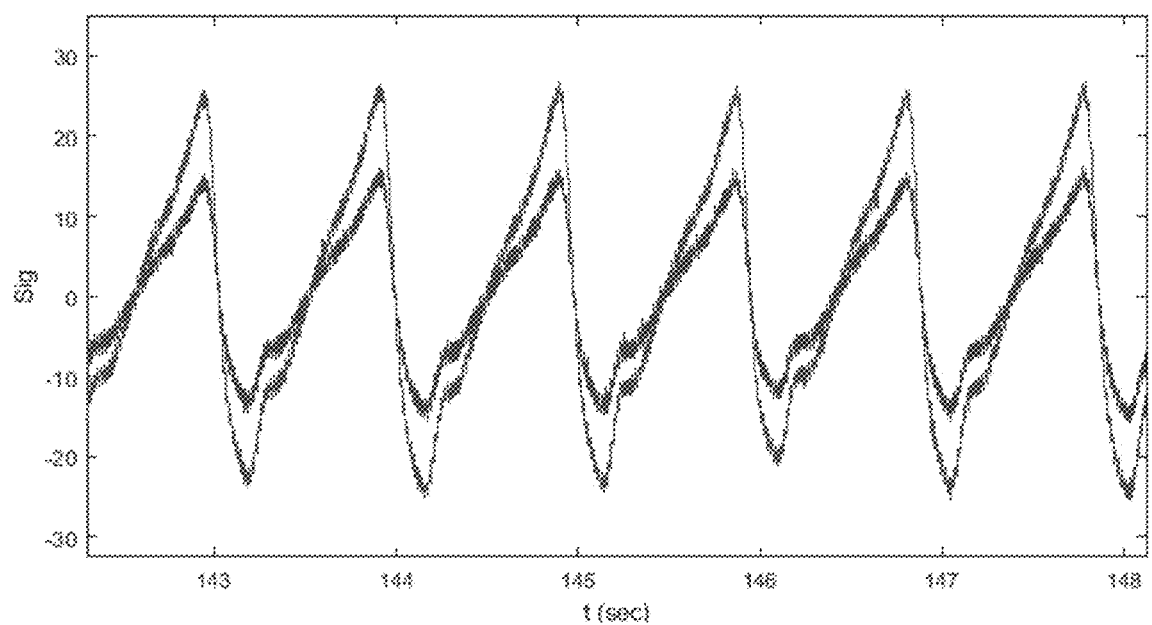
FIGS. 27 and 28 show examples of extracted PPG signals before preconditioning operations in accordance with an illustrative embodiment.
Figure 28:
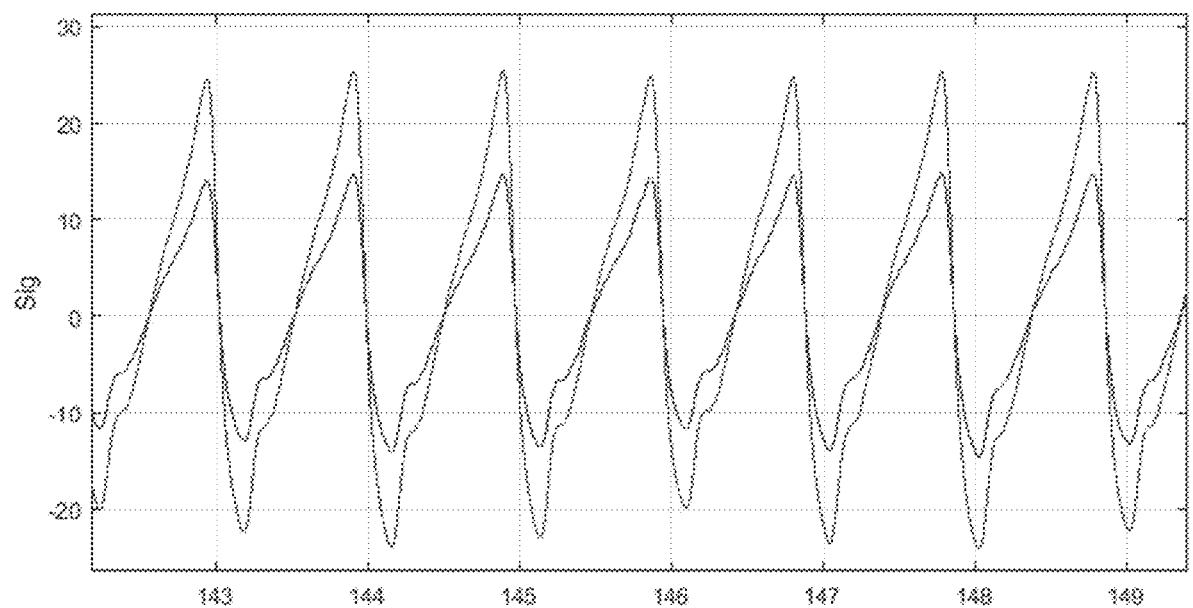
Figure 29:
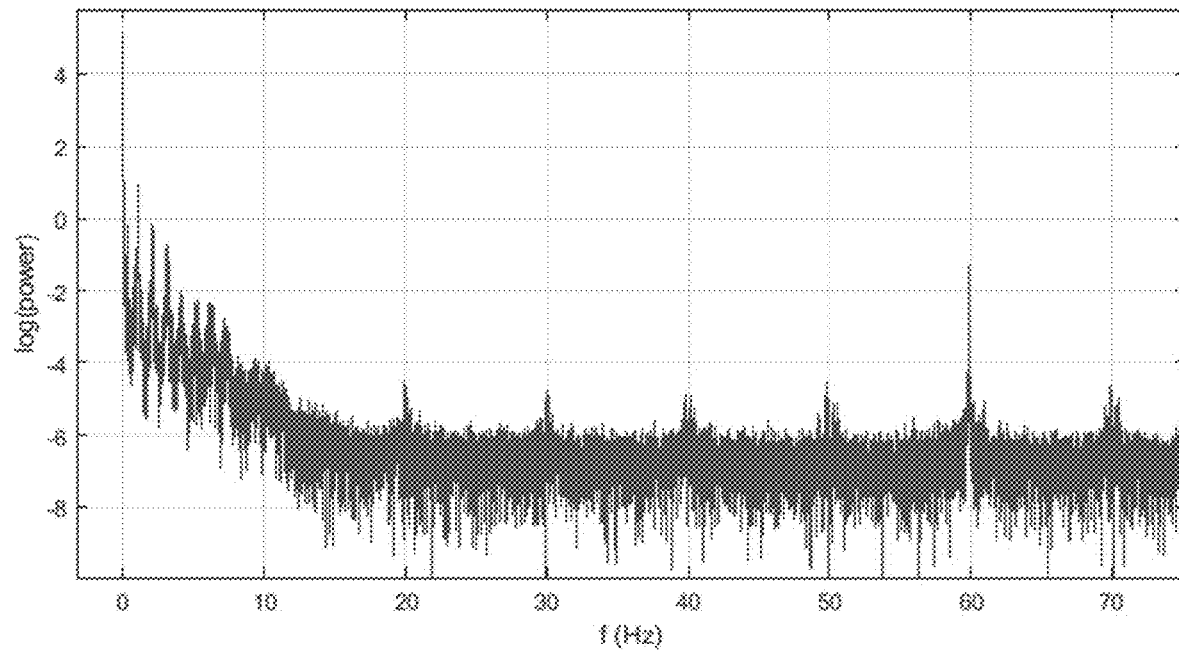
FIGS. 29 and 30 show a power spectrum of one of the extracted PPG signal (e.g., red PPG signal) before and after filtering, respectively, as performed in accordance with an illustrative embodiment.
Figure 30:
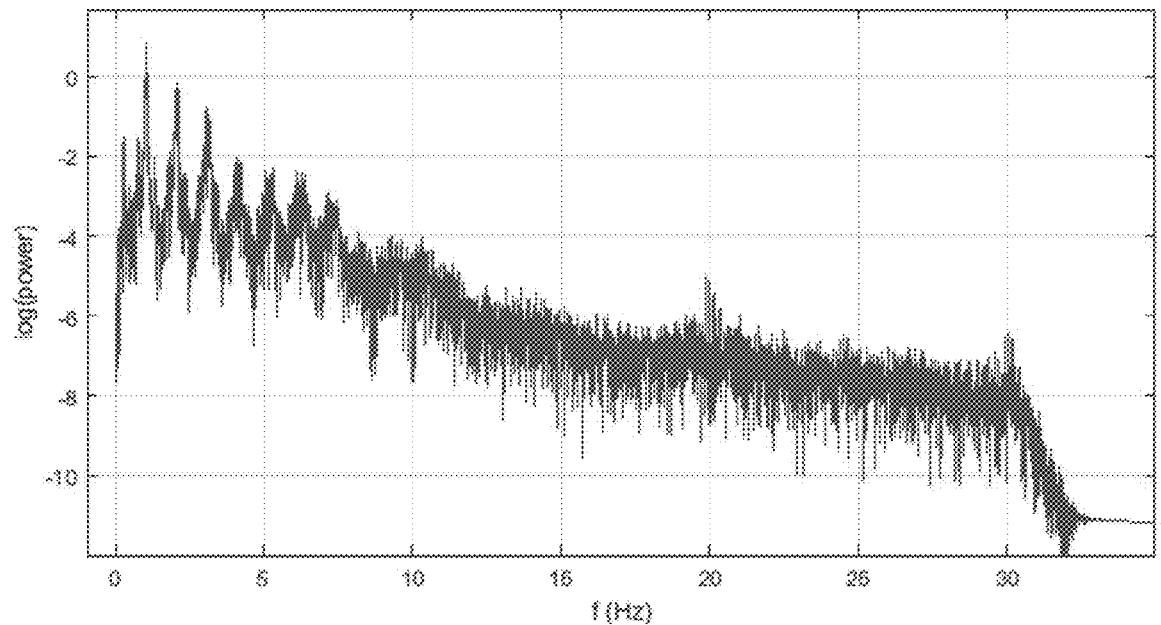

Method 2600 may include smoothing (2606) the filtered signal using a centered moving average, e.g., 6 points. FIGS. 27 and 28 show example of extracted PPG signals before preconditioning operations, respectively. FIGS. 29 and 30 respectively show power spectra of one of the extracted PPG signal (e.g., red PPG signal) before and after filtering are performed.

Figure 31:
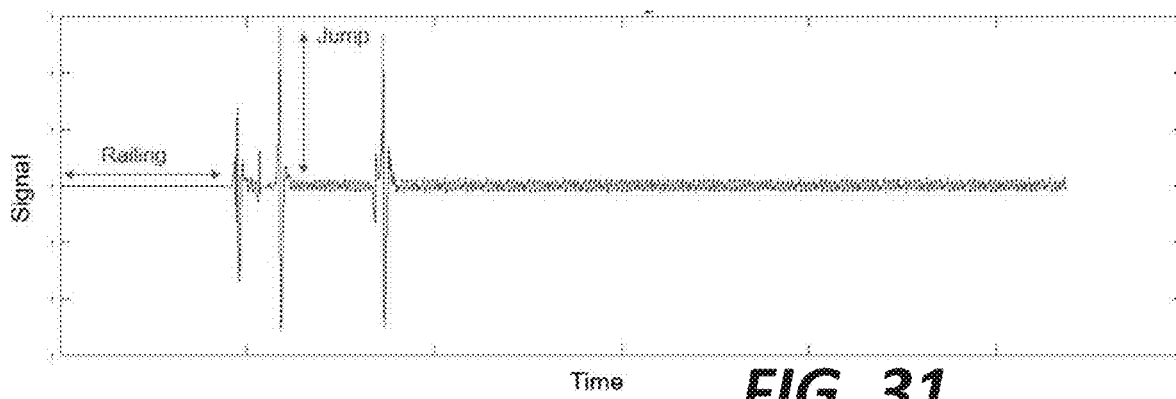
FIG. 31 shows example railing and jump anomalies assessed in an acquired PPG signal in accordance with an illustrative embodiment.

Assessment of PPG Anomalies. The PPG anomalies may arise from motion artifact or sensor problem. To determine the anomalies, in some embodiments, the PPG waveforms from a selected subset of a studied datasets were visually inspected and those with abnormality were selected to be studied for quality score development. Two types of anomalies were identified: (1) railing which is a portion of the signal with constant value and (2) jump which is an abrupt increase or decrease in the signal intensity. Railing may occur when the intensity of the transmitted light exceeds the dynamic range of the analogue to digital converter (ADC). FIG. 31 shows the railing and jump anomalies in an infrared PPG signal.

In some embodiments, the signal quality assessment operation of module 130 is configured to evaluate one or more metrics to characterize the anomalies, including, but not limited to: PPG jump percentage, PPG railing percentage, and longest continuous railed window. PPG jump percentage may refer to a percentage of the signal corrupted due to jump. That is, a portion of the signal that is corrupted by jumping artifacts as a percentage of the total signal that is analyzed. PPG railing percentage may refer to a percentage of the signal corrupted due to railing. That is, a portion of the signal that is corrupted by railing artifacts as a percentage of the total signal that is analyzed.

PPG Jump Percentage. In some embodiments, jumps are identified as outliers from the normal portion of the signal. The outliers may be detected (e.g., per module 130) using a median absolute deviation (MAD) score defined by Equation 17:

$$\text{MAD}=(X(t)-\text{median}[X(t)])/\text{median}(|X(t)-\text{median}[X(t)]|) \quad \text{(Equation 17)}$$

Figure 32:
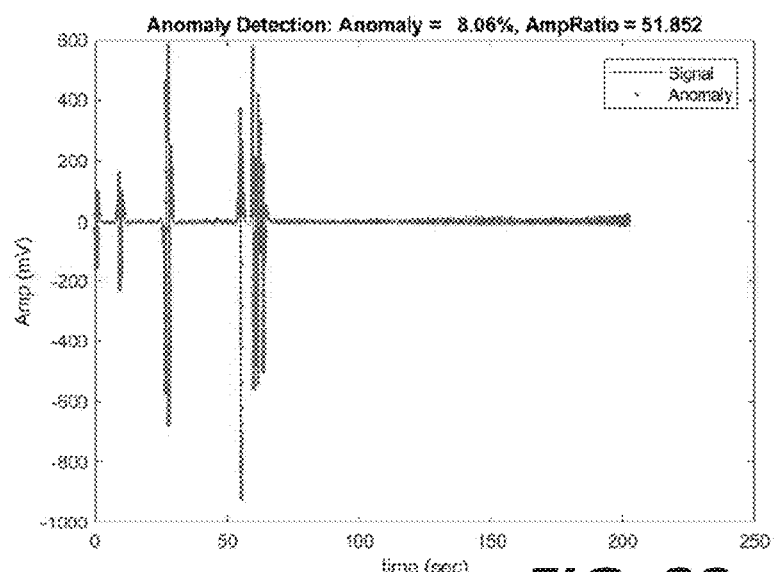
FIGS. 32 and 33 each shows examples of jump anomalies assessed on a respective infrared and red PPG signal in accordance with an illustrative embodiment.
Figure 33:
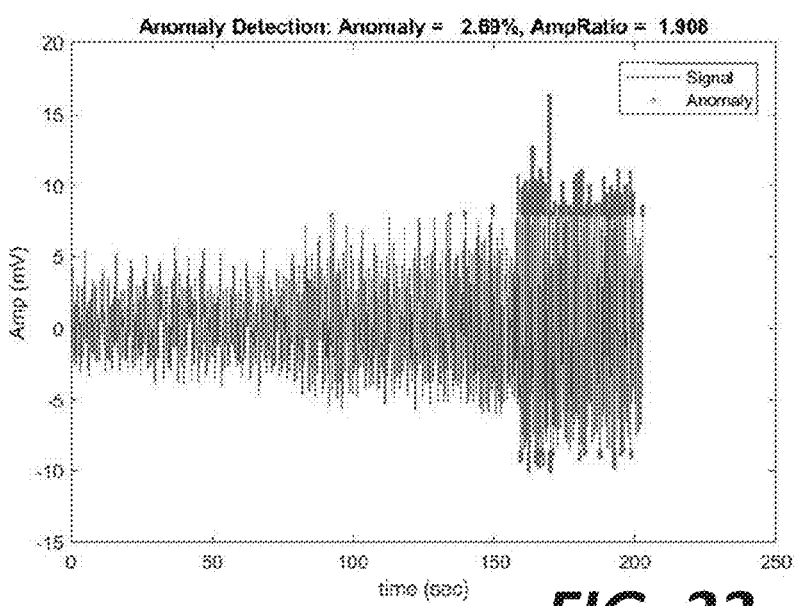

In Equation 17, X(t) is the signal of interest. If MAD>2.5, the point may be identified as an outlier. Of course, other thresholds may be used. The percentage ratio of the total number of outlier points to the total length of the signal may be defined as the "percentage outlier" metric for quality assessment. FIGS. 32 and 33 each shows examples of jump anomaly on a respective infrared and red PPG signal as observed in two subjects. Specifically, FIG. 32 shows a jump anomaly (outlier) of 8.06% in an infrared PPG signal. FIG. 33 shows a jump anomaly (outlier) of 2.69% in a red PPG signal.

Figure 34:
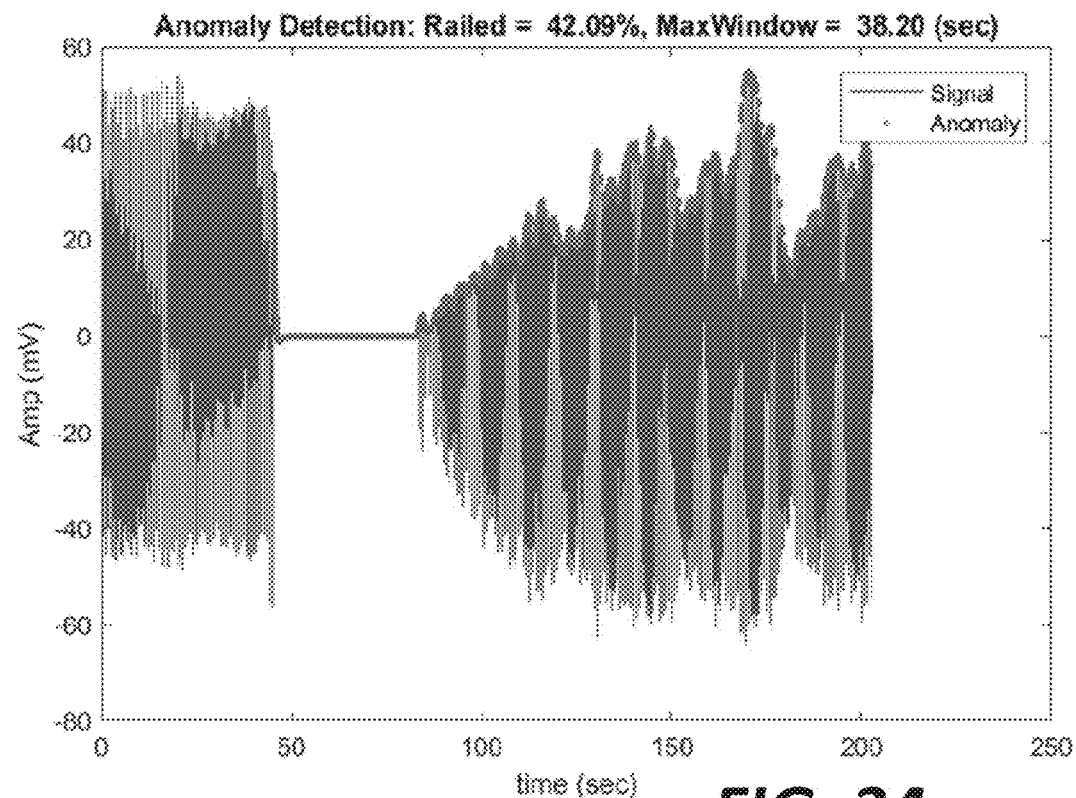
FIG. 34 shows an example assessed railing anomaly occurring in a first acquired PPG signal in accordance with an illustrative embodiment.

PPG Railed Percentage and Railed Window. Railing may occur when the intensity of the transmitted light exceeds the dynamic range of an analog-to-digital converter device. When this happens, the maximum digitizable intensity is recorded over the duration of the railing. Linear variations are observed following or preceding flat railing which could be due to disconnection and reconnection or due to preprocessing of multiplexed signals. FIG. 34 shows example railing anomaly occurring in a PPG signal. In some embodiments, the linear portion is also classified into railing anomaly.

In some embodiments, the signal quality assessment operation of module 130 is configured to apply a fourth-order differencing (analogous to fourth-order derivative) to the raw red and infrared PPG signals to flatten (zero intensity) up to perfectly cubic variations which may arise due to filtering. Then, the signal quality assessment operation of module 130 may identify time indices of the flat regions and calculate the total length of the time indices to obtain a percentage value of the railing. In some embodiments, the signal quality assessment operation of module 130 uses the duration of the railed region with maximum length as a quality metric.

Figure 35:
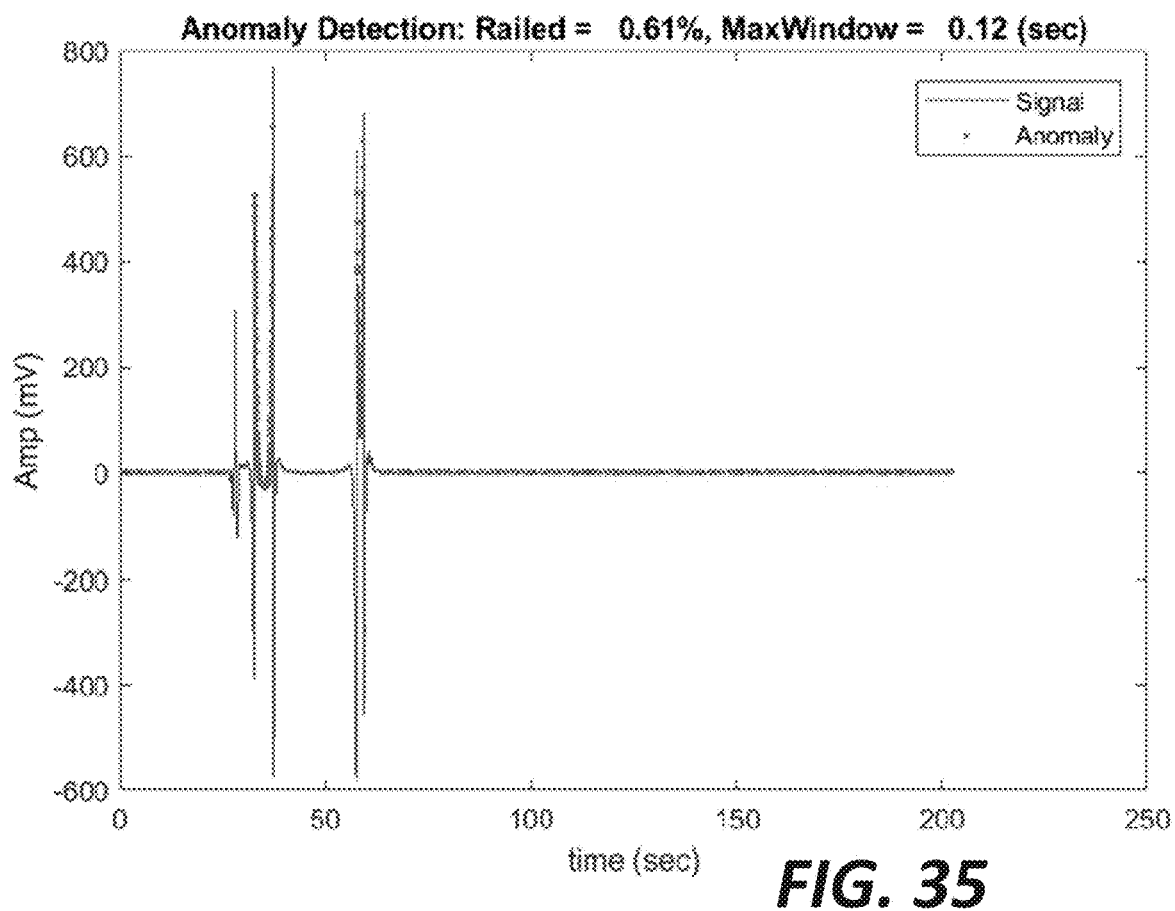
FIG. 35 shows an example assessed railing anomaly occurring in a second acquired PPG signal in accordance with an illustrative embodiment.

FIGS. 34 and 35 show the railing in a red and an infrared PPG signal, respectively. The magenta region indicates railed segments identified by the module 130 to be an anomaly region. Specifically, FIG. 34 shows railing anomaly of 42.09% with the maximum railed portion of 38.20 seconds in a red PPG signal. As shown, all purple points are railed in the raw signal after filtering as described herein has been performed. Short duration railing demonstrates linear or higher order behavior. FIG. 35 shows a railing anomaly of 0.61% with the maximum railed portion of 0.12 seconds in an infrared PPG signal.

PPG Quality and Scores Thresholds. To evaluate the quality of the PPG signal and to establish the score threshold, a study was performed using the quality metrics for PPG signals based on the PPG jump Percentage, the PPG Railed Percentage, and the PPG Railed Window. If a signal either of these quality scores exceeds a certain value, the study observed that the reliability of calculated features dropped.

To find a suitable set of thresholds for these quality metrics, first, the features data from the studied data set was evaluated under the Kolmogorov-Smirnov test (as for example described in F. J. Massey, "The Kolmogorov-Smirnov Test for Goodness of Fit," J. Am. Stat. Assoc., vol. 46, No. 253, pp. 68-78, 1951, which is hereby incorporated by reference in its entirety) to compare the empirical distribution of select features between the following two groups: (i) features from normal signals without any anomalies and (ii) those from signals with PPG anomalies (jump and railing). Signals in the second group may be selected if their scores are greater than a set of values; various sets of incrementally increasing values may be tested to find the right threshold.

Features of interest in this analysis are selected from dynamical system feature set, including those described herein, including Lyapunov exponent of PPG signals (e.g., SpLEL and SpLEU); Correlation Dimension of PPG signals (e.g., SpD2L and SpD2U); Entropy of PPG signals (e.g., SpK2L and SpK2U); and various synchronization feature set that characterizes the synchronicity of the PPG and the biopotential signal via several Poincare maps (e.g., dYMean1, dZMean1, dYStd1, dXRelStdMAD1, dYRelStdMAD1, dZRelStdMAD1, dXSkew1, dYSkew1, dXKurt1, dYKurt1, dYModel, dZModel, dXStd2, dXRelMeanMedDiff2, dZRelMeanMedDiff2, dXRelStdMAD2, dZRelStdMAD2, dYSkew2, dZSkew2, dXKurt2, dYKurt2, dXAlpha, dAlphaL, dMeanU, dModeUP, dDmjU, dDmnU, dMeanLURP1).

Further description of such feature sets may be found in U.S. application Ser. No. 16/831,264, the entirety of which is hereby incorporated by reference herein.

The initial set of candidate thresholds are [0.1, 0.1, 1.0] for Percent Outlier, Percent Railed, and Maximum Railed Window, respectively. In the study, one hundred tests were performed, and for each test, the values were incremented by 0.1 for all scores. The anomalous signals in the second group may be selected if the associated quality scores exceed the candidate threshold value. For each KS test, the test statistics and the corresponding p-value are recorded.

Figure 36:
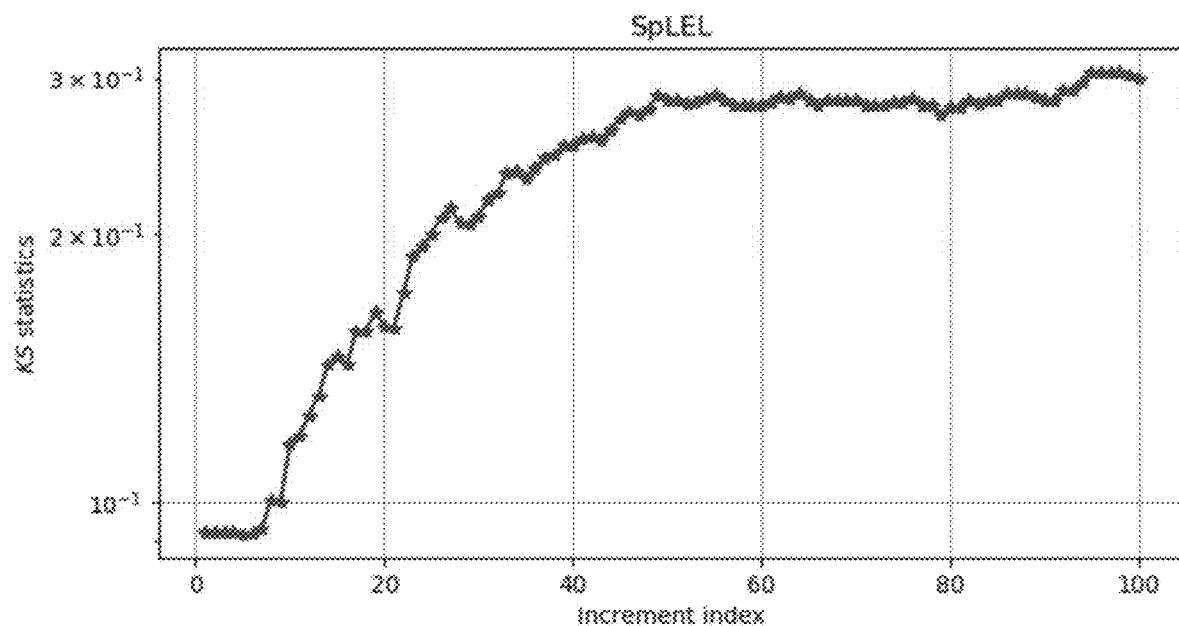
FIGS. 36 and 37 show variations of test statistics for two features sets in the signal quality quantification study.
Figure 37:
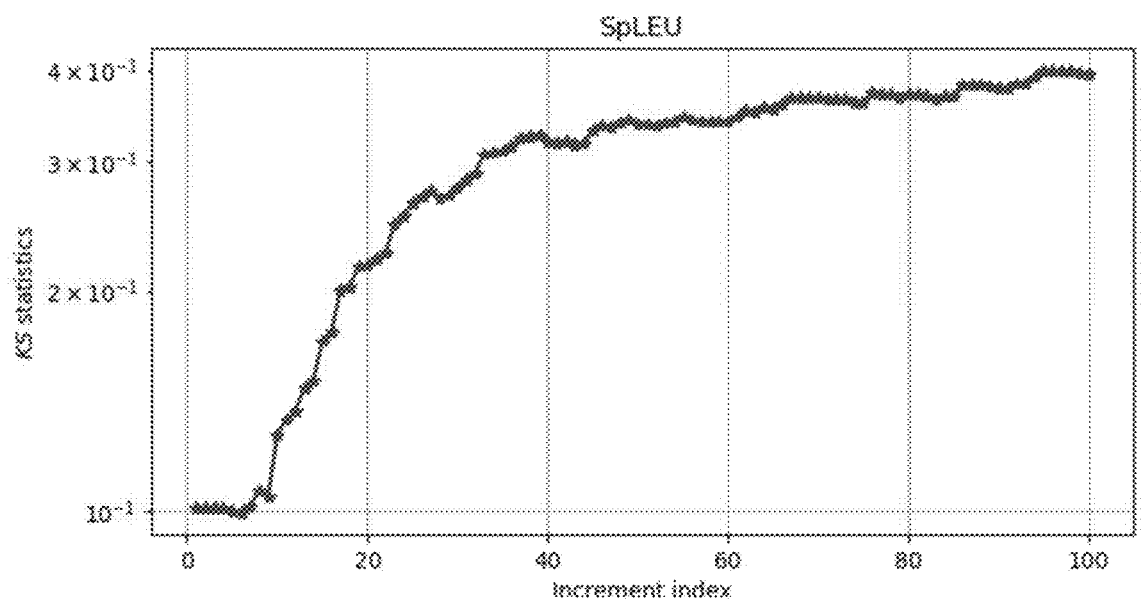

FIGS. 36 and 37 show variations of the test statistics for two of the features sets (namely, SpLEL and SpLEU) as the candidate thresholds are incremented. At every index, the candidate threshold is incremented by 0.1. Per FIGS. 36 and 37, a larger value indicates that distributions of that specific feature in the anomalous PPG signals (second group) deviate from the distribution in the first group with non-anomalous signals.

Per FIGS. 36 and 37, it is observed that at increment index of about 40, corresponding to quality scores of [4.2, 4.2, 5.1], the deviation plateaus. The observation may indicate that the two populations are so different that increasing the threshold further does not affect the test statistics. A similar analysis had been performed for all selected features; among those features that indicate such trends, the lowest values were selected as thresholds. It should be noted that as the candidate threshold value increases, the number of signals in group ii decreases, which in turn decreases the power of the test. The reported thresholds from the analysis may be tuned to achieve a target pass rate. Example threshold values are listed in Table 10.

TABLE 10

| Signal Quality Test | Threshold | Acceptance Rate |
|---|---|---|
| Powerline interference (test #1) | 486.6 | 97.7% |
| High-Frequency noise (test #2) | 0.05273 | 97.4% |

TABLE 10-continued

| Signal Quality Test | Threshold | Acceptance Rate |
|---|---|---|
| Both biopotential tests (tests #) and #2) | Must pass both | 95.3% |
| PPG jump percentage (test #3) | 3.7 | 94.3% |
| PPG railed percentage (test #4) | 3.7 | 94.3% |
| PPG railed window (test #5) | 4.6 | 94.3% |
| Three PPG Tests (test #3, 84, and #5) | Must poss all three | 92.6% |
| SQA (tests #1, #2, #3, #4, ond #5) | Must pass oll five | 89.6% |
| Powerline interference (test #1) | 486.6 | 97.7% |
| High se (test #2) | 0.05273 | 97.4% |
| Bio bior #1 and #2) | Must pass both | 95.3% |
| PPG. est #3) | 3.7 | 94.3% |
| PPG r test #4) | 3.7 | 94.39% |
| PPG rai st #5) | 4.6 | 94.3% |
| Three PPG Te 3. 84, and #5) | Must pass all three | 92.6% |
| SOA (tests #1 3. #4. and #5) | Must pass all five | 89.6% |

| Signal Quality Test | Threshold | Acceptance Rate |
|---|---|---|
| Powerline interference (test #1) | 486.6 | 97.7% |
| High-Frequency noise (test #2) | 0.05273 | 97.4% |
| Bio biopotential tests (tests #1 and #2) | Must pass both | 95.3% |
| PPG jump percentage (test #3) | 3.7 | 94.3% |
| PPG railed percentage (test #4) | 3.7 | 94.3% |
| PPG railed window (test #5) | 4.6 | 94.3% |
| Three PPG Tests (tests #3, #4, and #5) | Must pass all three | 92.6% |
| SQA (tests #1, #2, #3, #4, and #5) | Must pass all five | 89.6% |

Signal Quality Assessment for Signal Acceptance/Rejection

In some embodiments, the signal quality assessment operation of module 130 is configured to determine whether a signal is rejected or may proceed to subsequent analysis.

In some embodiments, the signal quality assessment operation of module 130 is configured to reject an acquired data set if any channel of the patient fails the powerline interference score analysis. In some embodiments, the signal quality assessment operation of module 130 is configured to reject an acquired data set if any channel of the patient fails the high-frequency noise score analysis. In some embodiments, the signal quality assessment operation 1 of module 30 is configured to reject an acquired data set if either acquired PPG signal fails "percentage outlier" assessment. In some embodiments, the signal quality assessment operation of module 130 is configured to reject an acquired data set if either acquired PPG signal fails "percentage railed" assessment. In some embodiments, the signal quality assessment operation of module 130 is configured to reject an acquired data set if either acquired PPG signal fails "Maximum railed window" assessment. In some embodiments, the signal quality assessment operation of module 130 is configured to pass an acquired data set for subsequent analysis if assessed evaluations are passed, including for example the powerline interference score analysis, the high-frequency noise score analysis, the "percentage outlier" assessment, the "percentage railed" assessment, and the "Maximum railed window" assessment.

Example Computing Device

FIG. 38 shows an exemplary computing environment in which example embodiments of the analysis system 114 and aspects thereof may be implemented in, e.g., a device or devices, among others, including the signal quality assessment operation of module 130.

The computing device environment is only one example of a suitable computing environment and is not intended to suggest any limitation as to the scope of use or functionality.

Numerous other general-purpose or special purpose computing devices environments or configurations may be used. Examples of well-known computing devices, environments, and/or configurations that may be suitable for use include, but are not limited to, personal computers, server computers, handheld or laptop devices, mobile phones, smartphones, smart watches and other wearable devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 38, an exemplary system for implementing aspects described herein includes a computing device, such as computing device 3800. In its most basic configuration, computing device 3800 typically includes at least one processing unit 3802 and memory 3804. Depending on the exact configuration and type of computing device, memory 3804 may be volatile (such as random-access memory (RAM)), non-volatile (such as read-only memory (ROM), flash memory, etc.), or some combination of the two. This most basic configuration is illustrated in FIG. 38 by dashed line 3806.

Computing device 3800 may have additional features/functionality. For example, computing device 3800 may include additional storage (removable and/or non-removable) including, but not limited to, magnetic or optical disks or tape. Such additional storage is illustrated in FIG. 38 by removable storage 3808 and non-removable storage 3810.

Computing device 3800 typically includes a variety of computer readable media. Computer readable media can be any available media that can be accessed by the device 3800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 3804, removable storage 3808, and non-removable storage 3810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by computing device 3800. Any such computer storage media may be part of computing device 3800.

Computing device 3800 may contain communication connection(s) 3812 that allow the device to communicate with other devices. Computing device 3800 may also have input device(s) 3814 such as a keyboard, mouse, pen, voice input device, touch input device, etc., singly or in combination. Output device(s) 3816 such as a display, speakers, printer, vibratory mechanism, etc. may also be included singly or in combination. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although example implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, and wearable devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Further examples of processing that may be used with the exemplified method and system are described in: U.S. Pat. No. 9,289,150, entitled "Non-invasive Method and System for Characterizing Cardiovascular Systems"; U.S. Pat. No. 9,655,536, entitled "Non-invasive Method and System for Characterizing Cardiovascular Systems"; U.S. Pat. No. 9,968,275, entitled "Non-invasive Method and System for Characterizing Cardiovascular Systems"; U.S. Pat. No. 8,923,958, entitled "System and Method for Evaluating an Electrophysiological Signal"; U.S. Pat. No. 9,408,543, entitled "Non-invasive Method and System for Characterizing Cardiovascular Systems and All-Cause Mortality and Sudden Cardiac Death Risk"; U.S. Pat. No. 9,955,883, entitled "Non-invasive Method and System for Characterizing Cardiovascular Systems and All-Cause Mortality and Sudden Cardiac Death Risk"; U.S. Pat. No. 9,737,229, entitled "Noninvasive Electrocardiographic method for Estimating Mammalian Cardiac Chamber Size and Mechanical Function"; U.S. Pat. No. 10,039,468, entitled "Noninvasive Electrocardiographic method for Estimating Mammalian Cardiac Chamber Size and Mechanical Function"; U.S. Pat. No. 9,597,021, entitled "Noninvasive Method for Estimating Glucose, Glycosylated Hemoglobin and Other Blood Constituents"; U.S. Pat. No. 9,968,265, entitled "Method and System for Characterizing Cardiovascular Systems From Single Channel Data"; U.S. Pat. No. 9,910,964, entitled "Methods and Systems Using Mathematical Analysis and Machine Learning to Diagnose Disease"; U.S. Pat. No. 10,672,518, entitled "Methods and Systems Using Mathematical Analysis and Machine Learning to Diagnose Disease"; U.S. Pat. No. 10,566,091, entitled "Methods and Systems Using Mathematical Analysis and Machine Learning to Diagnose Disease"; U.S. Pat. No. 10,566,092, entitled "Methods and Systems Using Mathematical Analysis and Machine Learning to Diagnose Disease"; U.S. Patent Publication No. 2020/0335217, entitled "Methods and Systems Using Mathematical Analysis and Machine Learning to Diagnose Disease"; U.S. Pat. No. 10,542,897, entitled "Method and Apparatus for Wide-Band Phase Gradient Signal Acquisition"; U.S. Patent Publication No. 2020/0229724, entitled "Method and Apparatus for Wide-Band Phase Gradient Signal Acquisition"; PCT Publication No. 2017/033164, entitled "Method and Apparatus for Wide-Band Phase Gradient Signal Acquisition"; U.S. Pat. No. 10,362,950, entitled "Non-invasive Method and System for Measuring Myocardial Ischemia, Stenosis Identification, Localization and Fractional Flow Reserve Estimation"; PCT Publication No. WO2017/221221, entitled "Non-invasive Method and System for Measuring Myocardial Ischemia, Stenosis Identification, Localization and Fractional Flow Reserve Estimation"; U.S. Pat. No. 10,292,596, entitled "Method and System for Visualization of Heart Tissue at Risk"; U.S. Pat. No. 10,806,349, entitled "Method and Cloud Platform System for Analysis and Visualization of Heart Tissue at Risk"; U.S. Patent Publication No. 2019/0214137, entitled "Method and System to Assess Disease Using Phase Space Volumetric Objects"; PCT Patent Publication No. WO2019/130272, entitled "Method and System to Assess Disease Using Phase Space Volumetric Objects"; U.S. Patent Publication No. 2018/0249960, entitled "Method and System for Wide-band Phase Gradient Signal Acquisition"; PCT Publication No. WO2018/158749, entitled "Method and System for Wide-band Phase Gradient Signal Acquisition"; U.S. Patent Publication No. US2019/0117164, entitled "Methods and Systems of De-Noising Magnetic-Field Based Sensor Data of Electrophysiological Signals"; PCT Publication No. WO2019/077414, entitled "Methods and Systems of De-Noising Magnetic-Field Based Sensor Data of Electrophysiological Signals"; U.S. Patent Publication No. 2019/0200893, entitled "Method and System to Assess Disease Using Phase Space Tomography and Machine Learning"; PCT Patent Publication No. WO2019/130273, entitled "Method and System to Assess Disease Using Phase Space Tomography and Machine Learning"; U.S. Patent Publication No. 2019/0384757, entitled "Methods and Systems to Quantify and Remove Asynchronous Noise in Biophysical Signals"; PCT Publication No. WO2019/244043, entitled "Methods and Systems to Quantify and Remove Asynchronous Noise in Biophysical Signals"; U.S. Patent Publication No. 2020/0211713, entitled "Method and System to Characterize Disease Using Parametric Features of a Volumetric Object and Machine Learning"; PCT Publication No. WO2020/136569, entitled "Method and System to Characterize Disease Using Parametric Features of a Volumetric Object and Machine Learning"; U.S. Patent Publication No. 2019/0365265, entitled "Method and System to Assess Pulmonary Hypertension Using Phase Space Tomography and Machine Learning"; PCT Publication No. WO2019/234587, entitled "Method and System to Assess Pulmonary Hypertension Using Phase Space Tomography and Machine Learning"; U.S. Patent Publication No. 2020/0205739, entitled "Method and System for Automated Quantification of Signal Quality"; PCT Publication No. WO2020/136570, entitled "Method and System for Automated Quantification of Signal Quality"; U.S. Patent Publication No. 2020/0205745, entitled "Method and System to Configure and Use Neural Network To Assess Medical Disease"; PCT Publication No. WO2020/136571, entitled "Method and System to Configure and Use Neural Network To Assess Medical Disease"; U.S. patent application Ser. No. 16/831,264, entitled "Method and System to Assess Disease Using Dynamical Analysis of Biophysical Signals"; PCT Application No. PCT/IB2020/052889, entitled "Method and System to Assess Disease Using Dynamical Analysis of Biophysical Signals"; U.S. patent application Ser. No. 16/831,380, entitled "Method and System to Assess Disease Using Dynamical Analysis of Cardiac and Photoplethysmographic Signals"; PCT Application No. PCT/IB2020/052890, entitled "Method and System to Assess Disease Using Dynamical Analysis of Cardiac and Photoplethysmographic Signals"; U.S. Patent Publication No. 2019/0026430, entitled "Discovering Novel Features to Use in Machine Learning Techniques, such as Machine Learning Techniques for Diagnosing Medical Conditions"; U.S. Patent Publication No. 2019/0026431, entitled "Discovering Genomes to Use in Machine Learning Techniques", each of which is hereby incorporated by reference herein in its entirety.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; the number or type of embodiments described in the specification.

While the methods and systems have been described in connection with certain embodiments and specific examples, it is not intended that the scope be limited to the particular embodiments set forth, as the embodiments herein are intended in all respects to be illustrative rather than restrictive.

The methods, systems and processes described herein may be used generate stenosis and FFR outputs for use in connection with procedures such as the placement of vascular stents within a vessel such as an artery of a living (e.g., human) subject, and other interventional and surgical system or processes. In one embodiment, the methods, systems and processes described herein can be configured to use the FFR/stenosis outputs to determine and/or modify, intra operation, a number of stents to be placed in a living (e.g., human), including their optimal location of deployment within a given vessel, among others.

Examples of other biophysical signals that may be analyzed in whole, or in part, using the example methods and systems include, but are not limited to, an electrocardiogram (ECG) data set, an electroencephalogram (EEG) data set, a gamma synchrony signal data set; a respiratory function signal data set; a pulse oximetry signal data set; a perfusion data signal data set; a quasi-periodic biological signal data set; a fetal ECG data set; a blood pressure signal; a cardiac magnetic field data set, and a heart rate signal data set.

The example analysis can be used in the diagnosis and treatment of cardiac-related pathologies and conditions and/or neurological-related pathologies and conditions, such assessment can be applied to the diagnosis and treatment (including, surgical, minimally invasive, and/or pharmacologic treatment) of any pathologies or conditions in which a biophysical signal is involved in any relevant system of a living body. One example in the cardiac context is the diagnosis of CAD, and other diseases and conditions disclosed herein and its treatment by any number of therapies, alone or in combination, such as the placement of a stent in a coronary artery, performance of an atherectomy, angioplasty, prescription of drug therapy, and/or the prescription of exercise, nutritional and other lifestyle changes, etc. Other cardiac-related pathologies or conditions that may be diagnosed include, e.g., arrhythmia, congestive heart failure, valve failure, pulmonary hypertension (e.g., pulmonary arterial hypertension, pulmonary hypertension due to left heart disease, pulmonary hypertension due to lung disease, pulmonary hypertension due to chronic blood clots, and pulmonary hypertension due to other disease such as blood or other disorders), as well as other cardiac-related pathologies, conditions and/or diseases. Non-limiting examples of neurological-related diseases, pathologies or conditions that may be diagnosed include, e.g., epilepsy, schizophrenia, Parkinson's Disease, Alzheimer's Disease (and all other forms of dementia), autism spectrum (including Asperger syndrome), attention deficit hyperactivity disorder, Huntington's Disease, muscular dystrophy, depression, bipolar disorder, brain/spinal cord tumors (malignant and benign), movement disorders, cognitive impairment, speech impairment, various psychoses, brain/spinal cord/nerve injury, chronic traumatic encephalopathy, cluster headaches, migraine headaches, neuropathy (in its various forms, including peripheral neuropathy), phantom limb/pain, chronic fatigue syndrome, acute and/or chronic pain (including back pain, failed back surgery syndrome, etc.), dyskinesia, anxiety disorders, conditions caused by infections or foreign agents (e.g., Lyme disease, encephalitis, rabies), narcolepsy and other sleep disorders, post-traumatic stress disorder, neurological conditions/effects related to stroke, aneurysms, hemorrhagic injury, etc., tinnitus and other hearing-related diseases/conditions and vision-related diseases/conditions.

The patents, applications and publications as listed below and throughout this document are hereby incorporated by reference in their entirety herein.

[1] S. Thalkar, "Various techniques for removal of power line interference from ECG signal," *Int. J. Sci. Eng. Res.*, vol. 4, no. 12, pp. 12-23, 2013.

[2] J. W. Cooley and J. W. Tukey, "An Algorithm for the Machine Calculation of Complex Fourier Series," *Math. Comput.*, vol. 19, no. 90, pp. 297-301, 1965.

[3] S. Das and M. Chakraborty, "Comparison of Power Spectral Density (PSD) of Normal and Abnormal ECGs," *Int. J. Comput. Appl.—IJCA*, vol. 2, no. 3, pp. 10-14, 2011.

[4] L. G. Tereshchenko and M. E. Josephson, "Frequency content and characteristics of ventricular conduction," in *Journal of Electrocardiology*, 2015, vol. 48, no. 6, pp. 933-937.

[5] N. V. Thakor, "From Holter Monitors to Automatic Defibrillators: Developments in Ambulatory Arrhythmia Monitoring," *IEEE Trans. Biomed. Eng.*, vol. BME-31, no. 12, pp. 770-778, 1984.

[6] N. A. Parks, M. A. Gannon, S. M. Long, and M. E. Young, "Bootstrap signal-to-noise confidence intervals: An objective method for subject exclusion and quality control in ERP studies," *Front. Hum. Neurosci.*, vol. 10, no. FEB2016, p. 50, February 2016.

[7] C. Levkov, G. Mihov, R. Ivanov, I. Daskalov, I. Christov, and I. Dotsinsky, "Removal of power-line interference from the ECG: a review of the subtraction procedure," *Biomed. Eng. Online*, vol. 4, p. 50, August 2005.

[8] P. Kligfield et al., "Standardization and Interpretation of the Electrocardiogram.," *J. Am. Coll. Cardiol.*, vol. 49, no. 10, pp. 1109-1127, 2007.

[9] S. Abboud, "High-frequency electrocardiogram analysis of the entire QRS in the diagnosis and assessment of coronary artery disease," *Prog. Cardiovasc. Dis.*, vol. 35, no. 5, pp. 311-328, March 1993.

[10] J. O. Choi, S. A. Chang, S. J. Park, S. C. Lee, and S. W. Park, "Improved detection of ischemic heart disease by combining high-frequency electrocardiogram analysis with exercise stress echocardiography," *Korean Circ. J.*, vol. 43, no. 10, pp. 674-680, 2013.

[11] H. Qayyum, M. Majid, S. M. Anwar, and B. Khan, "Facial Expression Recognition Using Stationary Wavelet Transform Features," *Math. Probl. Eng.*, vol. 2017, no. 1, 2017.

[12] J. Allen, "Photoplethysmography and its application in clinical physiological measurement," *Physiological Measurement*, vol. 28, no. 3. 1 Mar. 2007.

[13] F. J. Massey, "The Kolmogorov-Smirnov Test for Goodness of Fit," *J. Am. Stat. Assoc.*, vol. 46, no. 253, pp. 68-78, 1951.

[14] FDA, "Proposed Regulatory Framework for Modifications to AI/ML-Based SaMD," 2019.

What is claimed is:

1. A method for rejecting an acquired measurement used for non-invasively assessing a disease state or abnormal condition of a subject, the method comprising:

obtaining, by instrument measurement system, a biophysical signal data set of the subject associated with a photoplethysmographic signal or a cardiac signal, wherein the biophysical signal data set is acquired from the subject with a cardiac measurement equipment of the instrument measurement system, wherein the biophysical signal data set comprises two or more channels of an acquired biopotential signal data set acquired by a first set of probes of the instrument measurement system associated with the cardiac signal or two or more channels of an acquired optical signal data set associated with the photoplethysmographic signal acquired by a second set of probes of the instrument measurement system;

determining, by the one or more processors and/or remotely by one or more cloud-based services or systems, one or more values associated with a heart cycle variability parameter using the obtained cardiac signal and/or the photoplethysmographic signal of the biophysical-signal data set; and rejecting, by one or more cloud-based services or systems, any analyses of the biophysical signal data set by the one or more cloud-based services or systems, when the one or more values associated with the heart cycle variability parameter exceeds a predefined variability threshold, wherein the rejection generates a notification to be presented at the cardiac measurement equipment or a remote terminal, wherein the biophysical-signal data set is used to assess feature values in a model configured to non-invasively estimate presence of an expected disease state or condition, and wherein an estimated value is subsequently outputted for use in a diagnosis of the expected disease state or condition or to direct treatment of the expected disease state or condition.

2. The method of claim 1, wherein the rejection of the biophysical signal data set triggers a reacquisition of a replacement biophysical signal data set from the subject with the cardiac measurement equipment.

3. The method of claim 1, wherein the step of determining the one or more values associated with the heart cycle variability parameter comprises:
  determining, by the one or more processors, a template-signal vector data set representing quasi-periodic signal pattern of the subject from a plurality of detected quasiperiodic cycles detected in the biophysical-signal data set; and
  applying, by the one or more processors, the template-signal vector data set to two or more of the plurality of detected quasiperiodic cycles to determine a residue, the one or more values associated with the heart cycle variability parameter being generated from the determined residue.

4. The method of claim 1, wherein the one or more values associated with a heart cycle variability parameter, and predefined variability threshold, are each a cycle variability score defined as an average of difference between a template-signal vector data set and two or more of a plurality of detected quasiperiodic cycles.

5. The method of claim 1, wherein the biophysical signal data set comprises three or more channels of acquired biopotential signals, and wherein the one or more values associated with the heart cycle variability parameter are generated as a respective score for a given channel normalized by a sum of scores of two or more channels of the acquired biopotential signals.

6. The method of claim 1, wherein the biophysical signal data set comprises two or more channels of an acquired biopotential signal data set or two or more channels of an acquired optical signal data set associated with the photoplethysmographic signal, including a first signal and a second signal, wherein the one or more values associated with the heart cycle variability parameter are determined as a volume-associated value of a phase space model of a residue generated between a template-signal vector data set and the first signal and the second signal.

7. The method of claim 6, wherein the phase space model is a triangulation point-cloud model generated from a difference between the template-signal vector data set and, at least, the first signal and the second signal.

8. The method of claim 1, wherein the one or more values associated with the heart cycle variability parameter are distribution-associated values of a difference between a template-signal vector data set and two or more of a plurality of detected quasiperiodic cycles.

9. The method of claim 1, wherein the biophysical signal data set comprises two or more channels of acquired biopotential signals, and wherein the one or more values associated with the heart cycle variability parameter are generated for each of the two or more channels of the acquired biopotential signals.

10. The method of claim 1, wherein the biophysical signal data set comprises two or more channels of a acquired optical signal data set associated with the photoplethysmographic signal or the cardiac signal, and wherein the one or more values associated with the heart cycle variability parameter are generated for each of two or more channels of acquired biopotential signals.

11. The method of claim 1, further comprising:
  causing, by the one or more processors and/or remotely by the one or more cloud-based services or systems, a notification message associated with the rejection to be transmitted to the cardiac measurement equipment or a remote terminal.

12. The method of claim 1, further comprising:
  determining, by the one or more processors and/or remotely by the one or more cloud-based services or systems, one or more synchronicity dynamical propert(ies) between a first biophysical signal data set associated with saturation of oxygenated and/or deoxygenated hemoglobin and a second biophysical signal data set associated with the cardiac signal; and
  determining, by the one or more processors and/or remotely by the one or more cloud-based services or systems, an estimated value for presence of a disease state based on the determined one or more synchronicity dynamical propert(ies).

13. The method of claim 1, further comprising:
  determining, by the one or more processors and/or remotely by the one or more cloud-based services or systems, one or more signal quality parameters of obtained first and second biophysical-signal data sets, wherein at least one of the one or more signal quality parameters is selected from group consisting of powerline interference parameter associated with powerline noise contamination, a high-frequency noise parameter associated with high frequency noise contamination, a noise burst parameter associated with high frequency noise burst contamination, an abrupt movement parameter associated with abrupt movement contamination, and an asynchronous noise parameter associated with skeletal muscle contamination.

14. The method of claim 13, wherein the step to determine the one or more signal quality parameters comprises:
  calculating one or more biopotential noise scores of the biophysical signal data set,
  wherein the one or more biopotential noise scores comprises a score value associated with biopotential powerline interference or a score value associated with biopotential high-frequency noise.

15. The method of claim 13, wherein the step to determine the one or more signal quality parameters comprises:
  calculating one or more PPG noise scores of the biophysical signal data set, wherein the one or more PPG noise scores comprises at least one of:
  a score value associated with a frequency of PPG signal jumps and dropouts;
  a score value associated with a frequency of PPG signal that is clipped or railing, and
  a score value associated with a duration of the PPG signal that is clipped or railing.

16. The method of claim 1, wherein the disease state includes significant coronary artery disease or abnormal left ventricular end-diastolic pressure.

17. A system comprising:
  a processor; and
  a memory having instructions stored therein, wherein execution of the instructions by the processor, cause the processor to:
    obtain a biophysical signal data set of a subject associated with a photoplethysmographic signal or a cardiac signal, wherein the biophysical signal data set is acquired from the subject with a cardiac measurement equipment of an instrument measurement system, wherein the biophysical signal data set comprises two or more channels of an acquired biopotential signal data set associated with the cardiac signal acquired by a first set of probes of the instrument measurement system, or two or more channels of an acquired optical signal data set associated with the photoplethysmographic signal acquired by a second set of probes of the instrument measurement system;

determine one or more values associated with a heart cycle variability parameter using the obtained cardiac signal and/or the photoplethysmographic signal of the biophysical-signal data set; and reject the biophysical signal data set by one or more cloud-based services or systems, when the one or more values associated with the heart cycle variability parameter exceeds a predefined variability threshold, wherein the rejection generates a notification to be presented cardiac measurement equipment or a remote terminal, wherein the biophysical-signal data set is used to assess feature values in a model configured to non-invasively estimate presence of an expected disease state or condition, and wherein an estimated value is subsequently outputted for use in a diagnosis of the expected disease state or condition or to direct treatment of the expected disease state or condition.

18. A computer readable medium having instructions stored therein, wherein execution of the instructions by a processor, cause the processor to:

obtain a biophysical signal data set of a subject associated with a photoplethysmographic signal or a cardiac signal, wherein the biophysical signal data set is acquired from the subject with a cardiac measurement equipment of an instrument measurement system and wherein the biophysical signal data set comprises two or more channels of an acquired biopotential signal data set associated with the cardiac signal acquired by a first set of probes of the instrument measurement system, or two or more channels of an acquired optical signal data set associated with the photoplethysmographic signal acquired by a second set of probes of the instrument measurement system;

determine one or more values associated with a heart cycle variability parameter using the obtained cardiac signal and/or the photoplethysmographic signal of the biophysical-signal data set; and reject the biophysical signal data set by one or more cloud-based services or systems when the one or more values associated with a heart cycle variability exceeds a predefined variability threshold, wherein the rejection generates a notification to be presented cardiac measurement equipment or a remote terminal, wherein the biophysical-signal data set is used to assess feature values in a model configured to non-invasively estimate presence of an expected disease state or condition, and wherein an estimated value is subsequently outputted for use in a diagnosis of the expected disease state or condition or to direct treatment of the expected disease state or condition.

* * * * *